United States Patent
Andersen et al.

(10) Patent No.: US 11,635,803 B2
(45) Date of Patent: Apr. 25, 2023

(54) INDUSTRIAL SAFETY SYSTEMS AND/OR METHODS FOR CREATING AND PASSIVELY DETECTING CHANGES IN ELECTRICAL FIELDS

(71) Applicant: Guardian Glass, LLC, Auburn Hills, MI (US)

(72) Inventors: Ryan Andersen, Auburn Hills, MI (US); Okan Agbuga, Berlin (DE); Xuequn Hu, Northville, MI (US); Robert G. Rogers, Auburn Hills, MI (US)

(73) Assignee: GUARDIAN GLASS, LLC, Auburn Hills, MI (US)

( * ) Notice: Subject to any disclaimer, the term of this patent is extended or adjusted under 35 U.S.C. 154(b) by 0 days.

(21) Appl. No.: 17/835,058

(22) Filed: Jun. 8, 2022

(65) Prior Publication Data
US 2022/0326762 A1  Oct. 13, 2022

Related U.S. Application Data

(63) Continuation of application No. 17/783,279, filed as application No. PCT/IB2022/051845 on Mar. 2, 2022.
(Continued)

(51) Int. Cl.
*G06F 3/01* (2006.01)
*G06F 3/0346* (2013.01)
(Continued)

(52) U.S. Cl.
CPC .............. *G06F 3/011* (2013.01); *G01D 5/24* (2013.01); *G06F 3/0346* (2013.01); *G06T 19/006* (2013.01)

(58) Field of Classification Search
CPC ...... G06F 3/046; G06F 3/0416; G06F 3/0488; G06F 2203/04103
See application file for complete search history.

(56) References Cited

U.S. PATENT DOCUMENTS

| 4,150,974 A | 4/1979 | Kemlo |
| 6,597,238 B1 * | 7/2003 | Matsumoto .......... H04B 17/318 375/317 |

(Continued)

FOREIGN PATENT DOCUMENTS

| AT | 512650 | 10/2013 |
| CN | 109801290 | 5/2019 |

(Continued)

OTHER PUBLICATIONS

Mathieu Le Goc et al., "A Low-cost Transparent Electric Field Sensor for 3D Interaction on Mobile Devices", Apr. 2014, 6 pages.
(Continued)

*Primary Examiner* — William Lu

(57) ABSTRACT

A detection system has an interface including a substrate supporting a conductive coating. Electrodes are provided to the substrate. A multiplexer provides current to the electrodes. A demultiplexer receives voltages from electrodes and provides corresponding signals to a controller. The controller receives these signals and determines therefrom an operation performed in connection with the interface by applying an algorithmic approach. Static interaction is recognizable, and machine learning can be used for gesture recognition and/or identification of other interaction types. The technology can be used in a broad array of applications, e.g., where it is desirable to sense interactions with a defined region such as, for example, in the case of touches, gestures, hovers, and/or the like.

30 Claims, 56 Drawing Sheets

Related U.S. Application Data

(60) Provisional application No. 63/291,076, filed on Dec. 17, 2021, provisional application No. 63/272,101, filed on Oct. 26, 2021.

(51) Int. Cl.
*G06T 19/00* (2011.01)
*G01D 5/24* (2006.01)

(56) References Cited

U.S. PATENT DOCUMENTS

| | | | |
|---|---|---|---|
| 7,031,807 B2 | 4/2006 | Heiligensetzer et al. | |
| 7,560,938 B2 | 7/2009 | Van Berkel et al. | |
| 8,058,993 B2 | 11/2011 | Hammerschmidt et al. | |
| 8,093,483 B2 | 1/2012 | Dancer | |
| 8,289,170 B2 | 10/2012 | Pryor et al. | |
| 8,336,432 B1 | 12/2012 | Butler | |
| 8,472,120 B2 | 6/2013 | Border et al. | |
| 8,477,425 B2 | 7/2013 | Border et al. | |
| 8,478,371 B2 | 7/2013 | Coggill | |
| 8,482,859 B2 | 7/2013 | Border et al. | |
| 8,488,246 B2 | 7/2013 | Border et al. | |
| 8,710,979 B2 | 4/2014 | Frederick | |
| 8,740,865 B2 | 6/2014 | Krystek et al. | |
| 8,766,910 B2 | 7/2014 | Grivna | |
| 8,779,782 B2 | 7/2014 | Aubry et al. | |
| 8,788,220 B2 | 7/2014 | Soles et al. | |
| 8,810,390 B2 | 8/2014 | Frederick | |
| 8,814,691 B2 | 8/2014 | Haddick et al. | |
| 9,097,890 B2 | 8/2015 | Miller et al. | |
| 9,097,891 B2 | 8/2015 | Border et al. | |
| 9,128,281 B2 | 9/2015 | Osterhout et al. | |
| 9,129,295 B2 | 9/2015 | Border et al. | |
| 9,134,534 B2 | 9/2015 | Border et al. | |
| 9,182,596 B2 | 11/2015 | Border et al. | |
| 9,223,134 B2 | 12/2015 | Miller et al. | |
| 9,229,227 B2 | 1/2016 | Border et al. | |
| 9,341,843 B2 | 5/2016 | Border et al. | |
| 9,366,862 B2 | 6/2016 | Haddick et al. | |
| 9,665,725 B2* | 5/2017 | Curtis | G06F 21/604 |
| 9,804,712 B2 | 10/2017 | Fergusson et al. | |
| 9,823,752 B2 | 11/2017 | Bromer | |
| 10,120,512 B2 | 6/2018 | Tang et al. | |
| 10,183,680 B2 | 1/2019 | Lim et al. | |
| 10,198,710 B1 | 2/2019 | Hahn et al. | |
| 10,199,022 B1 | 2/2019 | Greenlee | |
| 10,228,801 B2 | 3/2019 | Robucc et al. | |
| 10,311,259 B2 | 6/2019 | Otis et al. | |
| 10,353,526 B1 | 7/2019 | Sample et al. | |
| 10,395,630 B1 | 8/2019 | Greenlee | |
| 10,461,587 B2 | 10/2019 | Sieber | |
| 10,528,185 B2 | 1/2020 | Hu et al. | |
| 10,558,776 B2 | 2/2020 | Anderson et al. | |
| 10,592,049 B2 | 3/2020 | Forlines et al. | |
| 10,592,050 B2 | 3/2020 | Forlines et al. | |
| 10,666,252 B2 | 5/2020 | Schupp et al. | |
| 10,747,303 B2 | 8/2020 | Moseley | |
| 10,769,955 B2 | 9/2020 | Frederick et al. | |
| 10,791,884 B2 | 10/2020 | Starkey et al. | |
| 10,901,551 B2 | 1/2021 | Heim | |
| 11,027,429 B2 | 6/2021 | Matsumoto et al. | |
| 11,068,116 B2* | 7/2021 | Parker | G06F 16/2237 |
| 11,182,035 B2 | 11/2021 | Jiang | |
| 11,199,936 B2* | 12/2021 | Yoon | G06F 3/0416 |
| 2005/0151541 A1* | 7/2005 | Brinz | G01N 27/4162 |
| | | | 324/438 |
| 2005/0281320 A1* | 12/2005 | Neugebauer | H04B 1/707 |
| | | | 375/141 |
| 2007/0078354 A1* | 4/2007 | Holland | A61B 5/318 |
| | | | 600/509 |
| 2008/0238433 A1 | 10/2008 | Joutsenoja et al. | |
| 2010/0220064 A1* | 9/2010 | Griffin | G06F 3/0418 |
| | | | 345/173 |
| 2010/0277417 A1* | 11/2010 | Sarasmo | G06F 3/045 |
| | | | 345/173 |
| 2011/0115717 A1* | 5/2011 | Hable | G06F 3/04184 |
| | | | 345/173 |
| 2011/0169781 A1* | 7/2011 | Goertz | G06F 3/0425 |
| | | | 345/175 |
| 2011/0288605 A1* | 11/2011 | Kaib | A61B 5/7221 |
| | | | 607/5 |
| 2012/0235887 A1 | 9/2012 | Border et al. | |
| 2012/0242698 A1 | 9/2012 | Haddick et al. | |
| 2012/0327004 A1 | 12/2012 | Mikladal | |
| 2013/0241890 A1* | 9/2013 | Sharma | G06F 3/0426 |
| | | | 345/175 |
| 2013/0257790 A1* | 10/2013 | Chen | G06F 3/044 |
| | | | 345/174 |
| 2013/0339418 A1* | 12/2013 | Nikitin | H03H 21/0001 |
| | | | 708/819 |
| 2014/0073861 A1* | 3/2014 | Rodriguez-Llorente | |
| | | | A61B 5/7264 |
| | | | 600/301 |
| 2014/0073872 A1* | 3/2014 | Rodriguez-Llorente | |
| | | | A61B 5/7203 |
| | | | 600/301 |
| 2014/0073964 A1* | 3/2014 | Rodriguez-Llorente | |
| | | | A61B 5/0205 |
| | | | 600/479 |
| 2014/0232516 A1 | 8/2014 | Stivoric et al. | |
| 2014/0240242 A1 | 8/2014 | Kawalkar | |
| 2014/0354583 A1* | 12/2014 | Tokutake | G06F 3/0488 |
| | | | 345/174 |
| 2014/0365009 A1* | 12/2014 | Wettels | B25J 19/023 |
| | | | 700/258 |
| 2015/0091594 A1* | 4/2015 | Hamilton | G01R 1/07 |
| | | | 324/754.21 |
| 2015/0301577 A1* | 10/2015 | Leigh | G06F 3/041 |
| | | | 345/174 |
| 2016/0103500 A1 | 4/2016 | Hussey et al. | |
| 2016/0180701 A1 | 6/2016 | Golliher | |
| 2016/0187654 A1 | 6/2016 | Border et al. | |
| 2016/0209961 A1 | 7/2016 | Ahn | |
| 2016/0216794 A1* | 7/2016 | Yoon | G06F 3/04166 |
| 2017/0090640 A1 | 3/2017 | Roberts et al. | |
| 2017/0139527 A1* | 5/2017 | Nathan | G06V 10/26 |
| 2018/0168508 A1 | 6/2018 | Biel et al. | |
| 2018/0188922 A1* | 7/2018 | Dorfner | G06F 3/0445 |
| 2018/0260069 A1* | 9/2018 | Suzuki | G06F 3/0412 |
| 2018/0288386 A1* | 10/2018 | Lazarow | G02B 27/017 |
| 2018/0329532 A1 | 11/2018 | Noguchi | |
| 2019/0069786 A1 | 3/2019 | Perez-Camargo et al. | |
| 2019/0196626 A1 | 6/2019 | Takahashi et al. | |
| 2019/0227667 A1* | 7/2019 | Harrison | G06F 3/046 |
| 2019/0287311 A1* | 9/2019 | Bhatnagar | G06F 3/017 |
| 2020/0192089 A1 | 6/2020 | Haddick et al. | |
| 2022/0035017 A1 | 2/2022 | Ette | |
| 2022/0082412 A1 | 3/2022 | Roziere et al. | |
| 2022/0148547 A1 | 5/2022 | Caswell | |

FOREIGN PATENT DOCUMENTS

| | | |
|---|---|---|
| DE | 202005015210 | 3/2006 |
| DE | 102011121370 | 7/2016 |
| DE | 102013021387 | 9/2019 |
| EP | 3040598 | 7/2016 |
| JP | 6754110 | 9/2020 |
| WO | 2007/093914 | 8/2007 |
| WO | 2021/160858 | 8/2021 |

OTHER PUBLICATIONS

Marina Ivasic-Kos et al., "Human Detection in Thermal Imaging Using YOLO", Apr. 2019, 6 pages.

Samsung—What is the Air Gesture feature and how do I use the Air Gusture feature?, Sep. 25, 2020, 3 pages. https://www.samsung.com/hk_en/support/mobile-devices/what-is-the-air-gesture-feature-and-how-do-i-use-the-air-gesture-feature/.

(56) References Cited

OTHER PUBLICATIONS

Panasonic Industry—Infrared Array Sensor Grid—Eye, Surface Mount Type AMG88xx (High Performance Type), electronically retrieved Sep. 22, 2022, 9 pages. https://industral.panasonic.com/cdbs/www-data/pdf/ADI8000/ADI8000C66.pdf.
Panasonic—Grid-Eye AMG8834Eval Evaluation Kit, electronically retrieved Sep. 22, 2022, 2 pages. https://na.industrial.panasonic.com/products/sensors/evaluation-kits/lineup/grid-eyer-amg8834eval-evaluation-kit.
Panasonic—Wireless Connectivity Bluetooth Low Energy, PAN1740 Series, ENW-89846A1KF, electronically retrieved Sep. 22, 2022, 2 pages. https://na.industrial.panasonic.com/products/wireless-connectivity/bluetooth/lineup/bluetooth-low-energy/series/90874/model/90884.
Microchip—ATSAMD21G18, electronically retrieved Sep. 22, 2022, 9 pages. https://www.microchip.com/en-us/product/ATsamd21g18.
Panasonic—Grid-Eye Narrow Angle Type, electronically retrieved Sep. 22, 2022, 2 pages. https://na.industrial.panasonic.com/products/sensors/sensors-automotive-industrial-applications/lineup/grid-eye-infrared-array-sensor/series/70504.
DreamVu—Obstacle Detection, electronically retrieved Sep. 22, 2022, 3 pages. https://dreamvu.com/obstacle-detection/.
DreamVu—People Tracking, electronically retrieved Sep. 22, 2022, 3 pages. https://dreamvu.com/people-tracking/.
DreamVu—Vision Intelligence, electronically retrieved Sep. 22, 2022, 3 pages. https://dreamvu.com/vision-intelligence-software/.
VisAI Labs—Unlock the Power of Edge AI & Computer Vision, electronically retrieved Sep. 22, 2022, 2 pages. https://visailabs.com/.
VisAI Labs—Top 3 Technical Problems in Human/People Detection Solutions, electronically retrieved Sep. 22, 2022, 2 pages. https://visailabs.com/top-3-technical-problems-in-human-people-detection-solutions/.
DreamVu—DreamVu Products, electronically retrieved Sep. 22, 2022, 1 page. https://store.sundance.com/product-category/dreamvy/.
DreamVu—5 Reasons why Dimensioning and Weighing are MVPs of Warehouses, electronically retrieved Sep. 22, 2022, 18 pages. https://vmeasure.ai/wp-content/uploads/Whitepaper_5-reasons-why-dimentioning-and-weighing-are-MVPs-of-warehouses.pdf.
U.S. Appl. No. 17/835,103, filed Jun. 8, 2022; Agbuga et al.
U.S. Appl. No. 17/783,279, filed Jun. 8, 2022; Andersen et al.
International Search Report and Written Opinion dated May 27, 2022 issued in related International Application No. PCT/IB2022/051845, 38 pages.
Invitation to Pay dated May 3, 2022 issued in related International Application No. PCT/IB2022/051845, 17 pages.
Carmen Bachiller Martin et al., "Study of the Interference Affecting the Performance of the Theremin," International Journal of Antennas and Propagation, vol. 2012, Article ID 348151, Feb. 2012, 10 pages.
Terry Fritz, "ThereminVision-II Instruction Manual", Version 1.02; as early as Jan. 2004, 37 pages.
Notice of allowance received for U.S. Appl. No. 17/835,103, dated Dec. 29, 2022, 13 pages.
Rybski P. et al., "Sensor Fusion for Human Safety in Industrial Workcells", IEEE/RSJ International Conference on Intelligent Robots and Systems, Oct. 7-12, 2012, pp. 3612-3619.

\* cited by examiner

| ELECTRODE MEASUREMENTS | | | | | | | |
|---|---|---|---|---|---|---|---|
| Measurement-01 | Measurement-02 | Measurement-03 | Measurement-04 | Measurement-05 | Measurement-06 | Measurement-07 | Measurement-08 |
| 1513.64 | 1467.69 | 1470.19 | 1359.42 | 1306.04 | 1255.20 | 1376.16 | 1317.86 |
| Measurement-09 | Measurement-10 | Measurement-11 | Measurement-12 | Measurement-13 | Measurement-14 | Measurement-15 | Measurement-16 |
| 1397.24 | 1388.98 | 835.87 | 889.95 | 935.81 | 1027.09 | 839.75 | 922.82 |
| dV-01 | dV-02 | dV-03 | dV-04 | dV-05 | dV-06 | dV-07 | dV-08 |
| 1733.22 | 1733.19 | 1688.57 | 1600.38 | 1464.52 | 1409.93 | 1469.32 | 1421.43 |
| dV-09 | dV-10 | dV-11 | dV-12 | dV-13 | dV-14 | dV-15 | dV-16 |
| 1465.28 | 1460.93 | 978.29 | 999.38 | 1114.87 | 1149.91 | 1017.94 | 1044.89 |
| AVR-01 | AVR-02 | AVR-03 | AVR-04 | AVR-05 | AVR-06 | AVR-07 | AVR-08 |
| | | | | | | | |
| AVR-09 | | | | | | | |
| | | | | | | | |
| AHR-01 | AHR-02 | AHR-03 | AHR-04 | AHR-05 | | | |

CONFIGURATION
- System
- Device
- Acquisition
- Open Connection
- RealTime DataAcq
- Point Color
- Stabilization Values (Snap Data) (Read Data)   Off / On   LightGray
- Processing
- Calibration
- Handeye
- Communication
- Preferences Electrodes | EIT Visualization | Log Memory 74.8 MB

Fig. 20A

INDUSTRIAL SAFETY SYSTEMS AND/OR METHODS FOR CREATING AND PASSIVELY DETECTING CHANGES IN ELECTRICAL FIELDS

CROSS-REFERENCE TO RELATED APPLICATION

This application is a continuation of U.S. application Ser. No. 17/783,279 filed Jun. 8, 2022, which is the U.S. national phase of International Application No. PCT/IB2022/051845 filed Mar. 2, 2022, which designated the U.S. and claims priority to each of U.S. application Ser. Nos. 63/156,033 filed Mar. 3, 2021; 63/272,101 filed Oct. 26, 2021; and 63/291,076 filed Dec. 17, 2021, the entire contents of each of which are hereby incorporated herein by reference.

TECHNICAL FIELD

Certain example embodiments of this invention relate to systems and/or methods that include electrical field sensing technology. More particularly, certain example embodiments of this invention relate to systems and/or methods that leverage electrical impedance tomography (EIT), electrical capacitive (ECT) tomography, electrical field tomography (EFT), and/or other electrical field sensing technologies, e.g., for use in connection with a variety of applications including, for example, electronic devices, automated guided vehicles (AGVs), robots, furniture, guarded spaces, architectural/sensing walls and windows; vending machines, and/or other machines/devices/articles.

BACKGROUND AND SUMMARY

For millennia, much of the human experience has been mediated through the five sense perceptions of seeing, hearing, touching or feeling, tasting, and smelling. Indeed, early humans must have valued the ability to see and hear to help keep themselves safe from predators, while modern humans no doubt rely on their ability to smell to help take ameliorative action when their food is burning in the oven.

From a technology perspective, there is an ongoing effort to build immersive environments that engage multiple senses. Some of the more apparent desires include building virtual reality (VR) and augmented reality (AR) environments. But even more seemingly commonplace technologies also seek to engage the senses in interesting integrative ways. Consider, for example, that a smartphone includes a touchscreen display, which itself engages the both the visual and touch senses. Touch interactions might cause haptic (additional touch-related) feedback, as well as sound effects (which involves auditory cues).

Touch-sensitive displays are used in a variety of different devices and for a variety of different uses. Touch-sensitive displays are, for example, used as the primary (or sometimes sole) means of interacting with mobile phones and tablet computing devices. Automated teller machines (ATMs), airport and railway check-in kiosks, laptops, video game systems, vehicle and instrument control panels, and other devices also frequently include touch-sensitive displays. Some smart televisions are equipped with touch-sensitive functionality.

There has been a good deal of research into touch-sensitive functionality, which is perhaps not so surprising given the breadth of devices in which such functionality has been deployed. Nonetheless, those skilled in the art continue to seek out new ways to make larger, more accurate, and more affordable touch-sensitive systems that operate more quickly. Size and speed are both issues/challenges. Oftentimes, there is a tradeoff between the speed at which a touch sensing related function can be detected and determined, and the accuracy associated with the detection. Scaling up to larger and larger touch sensing surfaces can exacerbate these issues, as it may be necessary to include more and more hardware to obtain a desired level of accuracy—and this can, in turn, require longer and longer to perform touch detection related operations. There are concomitant desires to enable advanced touch-related features such as, for example, multi-touch input, gesture-related operations, interactivity based on hover-inclusive actions, etc., which can sometimes require more complicated hardware- and/or software-inclusive signal processing systems.

While technologists continue to build devices and systems that create immersive experiences for interacting humans by engaging the sense receptors in interesting ways, there at the same time is a push to build into devices and systems human-like senses. Computer vision presents an analog to human vision and has been used in camera, optical character recognition (OCR), health diagnostic, and other technologies. Voice recognition, text-to-speech, another other technologies present an analog to human hearing. And mechanical, piezoelectric, and/or other pressure sensing technologies in machines provide an analog to human touch.

The technical field of sensor fusion takes outputs from these and/or other technologies and uses them to accomplish tasks. For example, a robot vacuum might "see" dirt to be sucked up, "feel" a table leg that it runs into, etc. As another example, video game system might have some vestibular sense of its orientation in real three-dimensional space, "hear" voice commands and provide related or unrelated auditory feedback, "see" where a player is looking and provide related or unrelated visual cues, provide tactile feedback in the form of haptics based on external inputs and/or in-game events, etc.

Certain example embodiments relate to these and/or other fields of technology. More particularly, the inventors have realized that electrical tomography related techniques can be leveraged to provide multiple different kinds of sensing technologies, potentially in the same application or device. For instance, certain example embodiments relate to touch-sensitive systems and/or methods that leverage electrical tomography related techniques including electrical impedance tomography (EIT), electrical capacitive tomography (ECT), and electrical field tomography (EFT), techniques, e.g., to provide large interfaces that provide improved accuracy and shorter processing times in connection with touch sensing related functionality. In a touch-sensitive system, for example, electrical tomography related techniques can be leveraged to detect touch and hover related operations that can augment or replace computer-mediated senses of vision, touch, and/or the like. More concretely, certain example embodiments can "see" when a gesture is made, "predict" when a touch will occur, "feel" where and/or when a touch occurs, etc.

More broadly, certain example embodiments are imbued with the ability to "see," "predict," and "feel" potential human or other interactions, and understand them in a manner relevant for the particular application to which those example embodiments are adapted. Such applications may include, for example, industrial safety system related applications, office system related applications, public or other information display systems, and/or the like.

Certain example embodiments advantageously are operable to sense human presence, and/or the presence of other objects that affect an electrical field. These other objects may include, for example, contaminants such as metal components or even liquids that carry a charge, pests, vehicles or other machinery (including potential runaway equipment), boxes, metallic particles, solid waste, etc. Certain example embodiments advantageously are operable to sense identifications of stored energy, such as stored electrical, pneumatic pressure, or hydraulic pressure.

Certain example embodiments advantageous incorporate hardware architectures and/or software algorithms that lead to fast data processing and decision making abilities, high accuracy, etc.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which:

FIGS. 20A-20B provide information about how voltage-related measurements can be used in connection with the discrete loop algorithmic approach set forth herein, in accordance with certain example embodiments;

DETAILED DESCRIPTION

Figure 1:
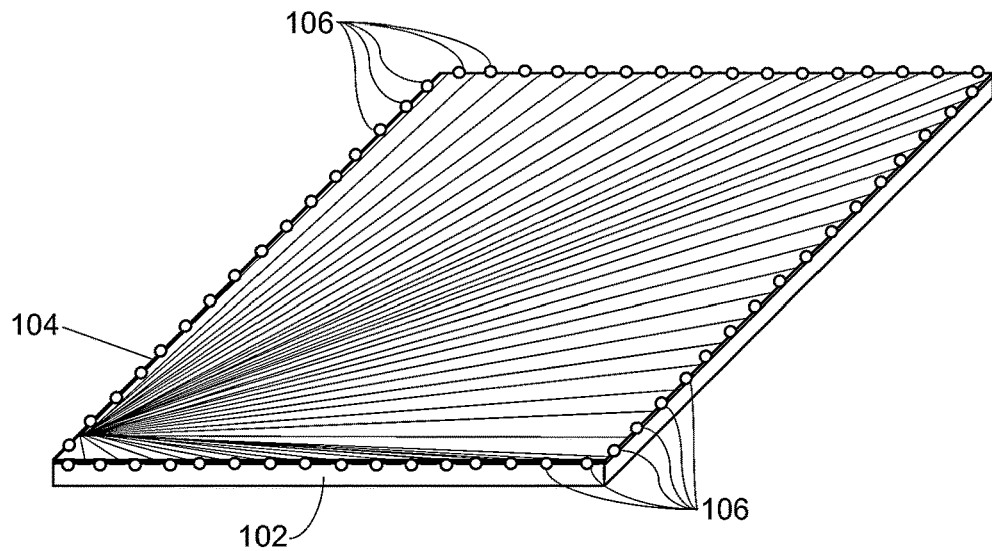
FIG. 1 is a schematic view showing how data can be acquired for different applications including, for example, touch-sensitive related applications.

Certain example embodiments of this invention relate to systems and/or methods that leverage electrical tomography related techniques, including electrical impedance tomography (EIT), electrical field tomography (EFT), and electrical capacitive tomography (ECT) related techniques. The electrical tomographic related techniques of certain example embodiments enable advanced functionality such as, for example, human sensing, gesture detection, multi-touch interactivity, hover-related functionality, etc. This advanced technology advantageously can be used to help a computer-based system "see," "predict," and "feel" aspects of its environment, similar to how a human would use sense receptors.

In general, EIT is a technique that enables visualization of the spatial distribution of electrical impedance (or conductivity) inside an object, such as human body. An EIT-enabled device typically uses voltage measurements on the object's surface when the electric current passes through the volume, as initial data for an "image reconstruction" (e.g., of the electrical field). Both fast and effective reconstruction algorithms, and high accuracy of electrical measurements, are helpful for EIT-enabled systems. As the measurements in EIT-enabled systems can be made rather quickly, high processing speed of the measured information enables visualization of many processes substantially in real time.

The EFT approach examines the interaction of a high-frequency electric field with inhomogeneous conductive medium, without contact with the electrodes. Unlike an EIT-enabled approach, an EFT-enabled approach does not require an electric current to be injected into the medium from the outside. The interaction is accompanied by high frequency redistribution of free charges inside the medium, which leads to small and regular phase shifts of the field in the area surrounding an object. This type of phenomenon is referred to as Maxwell-Wagner relaxation. Measuring the perturbations of the field using a set of electrodes (e.g., which may be placed around the object) enables the reconstruction of the internal structure of the medium. The electrical field can be used for imaging of dielectric (non-conducting) objects in a similar manner, as in an ECT-enabled approach.

In electrical tomographic approaches described herein, in general, data is acquired, processed, and classified. Thereafter, a decision about an interaction (e.g., a touch sensing related interaction in the case of a touch detection system) can be made. In the acquisition phase, data is gathered using electrodes. Signals from the electrodes are digitized using an analog-digital converter (ADC). Acquired data is filtered using a multiplexer to enable detections (e.g., individual and multiple touch-point detections in a touch detection system). The filtered data is stored, clustered, and calibrated. This may be done first to generate machine learning (ML) models relevant to touch sensing related interactions, and later to enable classification based on those models. For example, ML models may be generated to determine what gesture is made, when and where a hover operation takes place, when and where a touch operation takes place, etc., which may be useful in a variety of different applications, including touch-sensitive applications, industrial safety applications, etc. A decision about the type, time, and location of interaction can be reached based on the generated ML models. As will become clearer from the description below, certain example embodiments can use the same or similar techniques to implement Z-direction sensing, e.g., for hover and/or human detection related features.

FIG. 1 is a schematic view showing how data can be acquired for different applications including, for example, touch-sensitive and hover related applications. As shown in FIG. 1, a substrate 102 supports a conductive coating 104. The substrate 102 may be formed from glass, plastic, or some other material. Depending on the application, the substrate 102 may be formed from a transparent material. The conductive coating 104 may be a single or multilayer coating with a sheet resistance suitable for touch- and hover-related applications. The conductive coating 104 may comprise or consist of, for example, a single layer including ITO, a layer stack comprising ITO with a protective film (e.g., a silicon-inclusive layer such as, for example, silicon oxide, silicon nitride, silicon oxynitride, etc.), and/or the like. Silver-based layer stacks also may be used in connection with the conductive coating 104. The conductive coating 104 is blanket coated across the surface of the substrate 102. In certain example embodiments, patterning of conductive coating 104 is not needed, e.g., because of the processing approaches described herein. It is noted, however, that edge deletion or the like nonetheless may be performed even though patterning into discrete electrodes or the like may not be.

Composite materials may be used for the conductive coating 104 formed on the substrate 102. For example, co-sputtering may be used to deposit a composite material coating with different sheet resistances and capacitances suitable for the electrical tomographic technique used and response performance desired. In this regard, co-sputtering of titanium, silicon, aluminum, and/or other materials may be carried out to form a nitrided and/or oxided layer. A composite layer comprising titanium nitride and silicon nitride may be used in certain example embodiments. Each of these materials contributes layer resistance and reactance respectively. For example, different compositions of the TixN:SiyN (e.g., x, y percentages) and layer thickness affect sheet resistance and reactance. An alloy target with $N_2$ reactive sputtering may be used in certain example embodiments, e.g., to achieve a sheet resistance of 500-30,000 ohms per square, which may be desirable in certain EIT related embodiments. Test results by the assignee have shown that a sheet resistance of 4,000-9,000 ohms per square is an optimized range that helps to achieve a high signal-to-noise ratio in connection with certain example embodiments of the technology disclosed herein. In different example embodiments, conductive paints, conductive films, and/or other materials may be used.

In addition to being compatible with regular shapes such as squares, rectangles, and the like, the techniques disclosed herein are compatible with a wide variety of substrate geometries. That is, the production of an electrical field on and/or in the substrate is not dependent on the substrate geometry and can be characterized and measured as it is formed based on the electrodes applied thereto (e.g., the electrodes provided thereon and/or therein). As a result, the substrate itself may be in any shape needed or desired for the end-application including, for example, a regular or irregular shape which may be rectilinear or non-rectilinear. The substrates may be flat or be curved. In different example embodiments, one or more portions of the substrates may be flat and one or more other portions of the substrates may be curved. The electrodes create an electrical field that is in whole or in part characterized and measured, e.g., using the techniques set forth below in greater detail.

In a similar manner, the substrate may include recesses, through-holes, projections, or other features. This may be desirable, for example, in a tabletop application where it is desirable to have holes for accommodating table legs; card tables where it is desirable to have player tracker modules accessible via the glass or other substrate but where it is desirable to have openings to accommodate chips and card shufflers; museum map displays where there may be interactive geographies including mountains and valleys that can be explored; and a host of other applications; etc. Handles and/or the like also may be provided for some applications and can be considered a form of projection from a surface. Again, the ability to accommodate such features is possible because the electrodes create an electrical field that is in whole or in part characterized and measured, e.g., using the techniques set forth below in greater detail, based on electrode placement irrespective of the substrate "topography" (which may include the presence/absence of some or all of through-holes, recesses, projections, and/or other top- or under-surface features).

As alluded to above, by virtue of the substrate and/or features provided thereon or therein, the substrate may be two-dimensional or three-dimensional in nature. The techniques disclosed herein may work with either arrangement.

The ability to use any geometry and any topography is advantageous because it creates flexibility for the end application. Other technologies, including other touch technologies, are not compatible in the same blanket way. For instance, with projected capacitive (p-cap) touch technology, the complexity of conductive wires/mesh for non-rectilinear geometries typically will be prohibitively high. Imagine, for example, that there are grids of wires or a conductive mesh needed to connect every line to a controller. With a complex shape, it will be very difficult if not impossible to do that, especially where space is at a premium. The same issue arises with holes in the structure: There will be wires or mesh portions that will end up being cut because of the hole, thereby disconnecting the wires or mesh from the controller. An attempt to bypass the hole could be very complicated. The complexity increases for more complicated geometries and topographies. With surface capacitive (s-cap) technologies, the calculations for determining touch location are based on resistivity measurements taken from each corner in a rectilinear shape. For a complex shape, the equations become quite complex and are specific to each shape. This makes s-cap technology difficult to use, especially in connection with a variety of different geometries and topographies. The same difficulties arise with holes, making calculations especially complex in that the electric field in the material will be complex and discontinuous.

In the FIG. 1 example, electrodes 106 are disposed around the edges of the substrate 102. These electrodes 106 are evenly spaced in the FIG. 1 example, and 64 total electrodes are shown for purposes of illustration. It will be appreciated that the number of electrodes 106 may be varied based on substrate size, substrate geometry and/or topography, among other factors. It will be appreciated that many fewer electrodes may be provided in different example embodiments. For instance, in some sensing applications, a single pair of electrodes may be used. For data acquisition, in one form and as will be described in greater detail below, two adjacent electrodes are excited with a signal. The voltage is measured between every other adjacent electrode pair. In this approach, 3,904 total measurements are taken. Further details of this approach are provided below. In the meantime, it will be appreciated that the number of measurements taken is equal to $n \times (n-3)$, where n is equal to the number of electrodes 106 around the substrate 102. In the FIG. 1 example, the lines between electrodes show the connections for one electrode pair only.

Figure 2A:
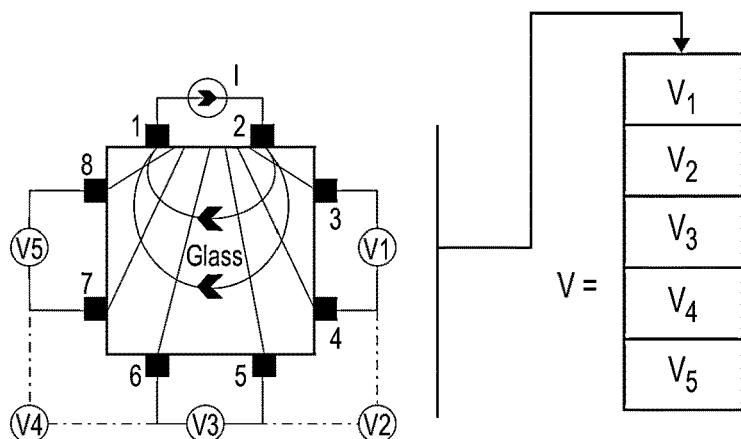
FIGS. 2A-2B show how the four-pole adjacent measurement approach can work in connection in a simplified eight-electrode system.
Figure 2B:
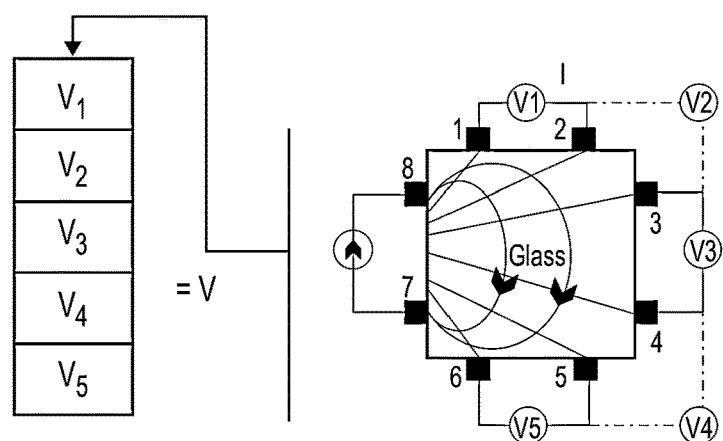

The approach to current injection and voltage measurement summarized in the immediately preceding paragraph is known as the four-pole adjacent measurement approach. FIGS. 2A-2B show how the four-pole adjacent measurement approach can work in connection in a simplified eight-electrode system. As shown in FIG. 2A, a small AC current is injected into a pair of electrodes, which in this case includes electrodes 1 and 2. An electrical field is created by this current injection. The voltage differences induced at the surface are measured for each other adjacent electrode pair. This includes the voltage differences for electrodes 3-4, 4-5, 5-6, 6-7, 7-8, etc.). The voltage measurements are stored in an array, matrix, or other structure. In the FIG. 2A example, the array V has storage locations $v_1$, $v_2$, etc., for the different respective voltage measurements.

After the loop in FIG. 2A is completed, the loop of FIG. 2B is performed. That is, in FIG. 2B, a small AC current is injected into another pair of electrodes, which in this case includes electrodes 7 and 8). A different electrical field is generated. Now, the voltage differences induced at the surface are measured for each other adjacent electrode pair. This includes the voltage differences for electrodes 1-2, 2-3, 3-4, 4-5, 5-6, etc. The voltage measurement is not performed at the pair electrode where the current is injected in order to help reduce the noise related to contact impedances. The same procedure is followed for all of the electrodes, which provides sufficient information to reconstruct an "image" of the electrical field across the substrate. In the FIG. 2A-2B example, and based on the formula above, there will be 40 measurements (i.e., 8×(8−3)=8×5=40) taken in total. These measurements help with the reconstruction of all or a part of the electrical field.

This example approach relies on surface conductivity. It will be appreciated that in-body conductivity may be measured and subsequently used in different example embodiments. In cases where in-body conductivity is used, conductive material may be embedded in a substrate or other surface. For example, conductive articles may be co-extruded or otherwise included in the body of a complex shape as an integral part thereof. In other cases, a mating component may be mounted on an exterior component, and this mating component may have a conductive coating formed thereon. Individually, the mating component in essence functions in accordance with surface conductivity related techniques such as those described above. However, because it is mated "below" or "under" an outer component, the overall field for the joined pieces in essence functions as an in-body measurement. The mating component may be sized, shaped, and arranged (e.g., contoured) to complement or otherwise match a profile of an outer component. The mating component and the outer component may be spaced apart from one another or they may joined together such that they share a plane of contact.

In certain example embodiments, a diffuse or "rough" substrate surface and/or surface with a diffuser may be provided. For example, an acid-etched glass or other surface with a conductive coating thereon can be used to enable touch sensing related functions using the technology disclosed herein. As another example, a chrome plated matte finished automotive trim surface can enable touch sensing related functions using the technology disclosed herein. Other diffuse or roughened surfaces may be used in other applications, in different example embodiments.

Figure 3:
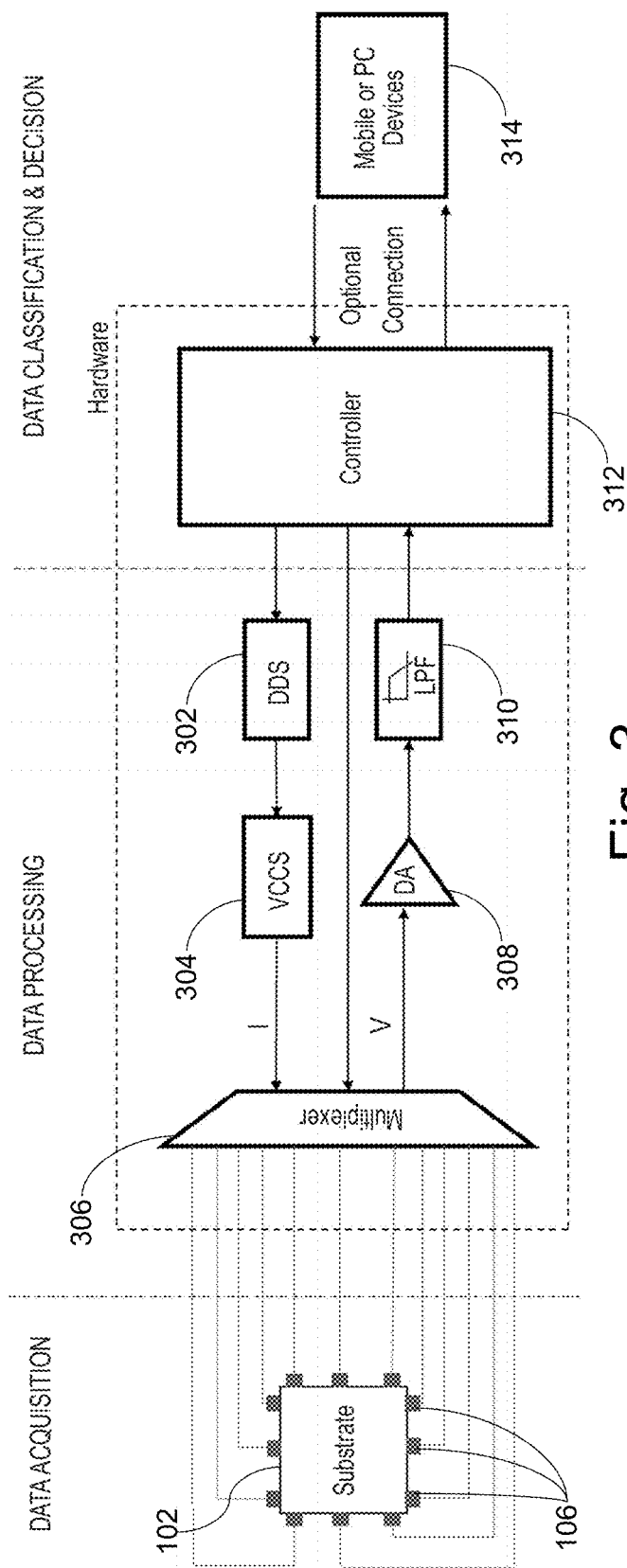
FIG. 3 is a schematic view of control electronics that may be used for processing data gathered for different applications including, for example, touch-sensitive related applications.

FIG. 3 is a schematic view of control electronics that may be used for processing data gathered for different applications including, for example, touch-sensitive related applications, using an EIT-type approach. In FIG. 3, a direct digital system (DDS) module 302 generates a voltage for a voltage controlled current source (VCCS) 304. The VCCS 304 converts the voltage to a current, which is then injected into the electrodes 106 disposed around the substrate 102, using a multiplexer 306.

After the current is injected into a pair of electrodes 106, the voltage developed across the remaining electrodes 106 can be measured using the approach described above in connection with FIGS. 2A-2B. The multiplexer 306 is used to help perform this measurement simultaneously. A differential amplifier (DA) 308 is used in making the measurements. A low-pass filter (LPF) 310 removes noise in the voltages received. Typically, the LPF 310 will be implemented in hardware. A controller 312 controls switching between current injection and voltage measurement.

The controller 312 also transfers the measured, filtered data to an off-board mobile, PC, or other electronic device 314. The connection between the controller 312 and the electronic device 314 may be a wired or wireless connection. In the case of the latter, a Wi-Fi, Bluetooth, or other wireless communication protocol may be used. The device 314 enables the user to "see" or "feel" a reconstructed "image" of the electrical field created by the current injection by processing the measured voltages. The device 314 also helps perform interaction detection (such as touch-position detection) using an application running thereon. In certain example embodiments, the controller 312 may perform functions that otherwise would be performed by the PC, making the PC an optional component in different example embodiments.

Figure 4:
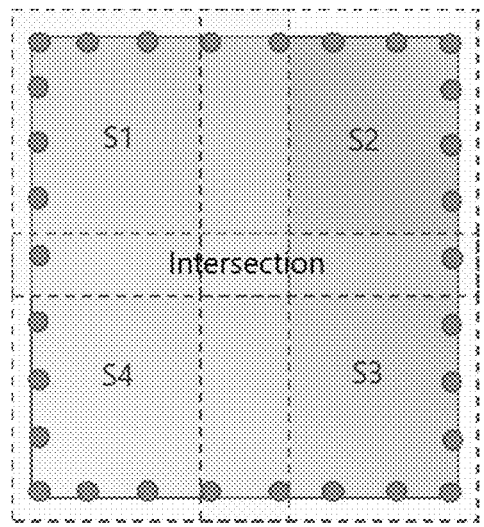
FIG. 4 is a schematic of a substrate being notionally segmented into different regions, which may help in performing accurate interaction processing in connection with large substrates.

FIG. 4 is a schematic of a substrate being notionally segmented into different regions, which may help in performing accurate interaction processing in connection with large substrates (e.g., large glass substrates). In the FIG. 4 example, four overlapping segments (S1, S2, S3, and S4) are shown. More or fewer segments may be provided based on the size of the substrate, accuracy desired, etc. As before, the electrodes are placed at the periphery of the substrate (e.g., glass) surface. Each of the electrodes is connected to each channel of the multiplexer. This approach allows for parallel processing of the different regions. And because each electrode is connected separately to different channels of the multiplexer, the signals generated by the interaction (e.g., touch, gesture, hover, etc.) can easily be filtered to locate a region in which the interaction occurred, as the potential difference in that particular region will be greatest in the region in which the interaction occurred, at least in an EIT-based technology environment. Moreover, each electrode may be connected to multiplexers for task management (e.g., to apply current or measure voltage). In certain example embodiments, each region may be handled with its own separate processing core, e.g., operating separately from the other operations taking place in connection with the other processing cores.

Figure 5:
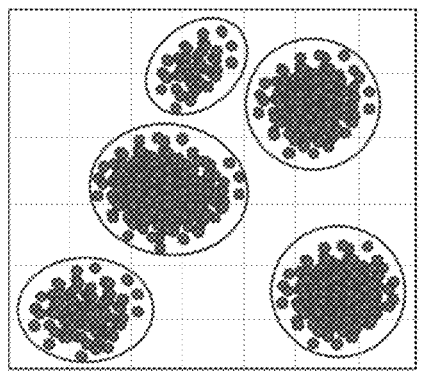
FIG. 5 is a schematic view showing how clusters of data points can be machine-learned to correspond to interactive touch or other interaction locations on the interface.

In the classification phase, the measured, filtered data may be processed using machine learning (ML) algorithms for high-accuracy, no-touch, single-touch, multi-touch, gesture, hover, air gesture, and/or other interaction identification. A simple calibration process on the sensing surface (e.g., glass) may be used for each of these and/or other potential interaction types. In certain example embodiments, a different machine-learned model may be developed for each different interaction type. This approach has been found to be very accurate in terms of recognizing interaction types and locations. It also has been found to increase the sensitivity and reduce variations caused by the fabrication process (such as, for example, local non-uniformities in the conductive layer in terms of composition, sheet resistance, etc.) while also potentially helping to account for issues like different substrate sizes and/or shapes (including rectilinear or non-rectilinear shapes, bent substrates, etc.), surface features (such as holes, projections, etc.), and/or the like. The X and Y positions can be identified based on multi-regression models or the like, and these models can be used to support real-time tracking. That is, multi-regression models can be used for individual touch or other interaction locations, and multi-regression models can be used to track individual touch or other interaction locations over time for the purposes of gesture identification and the like as discussed below. FIG. 5 is a schematic view showing how clusters of data points can be machine-learned to correspond to interactive touch or other interaction locations on the interface.

Figure 6:
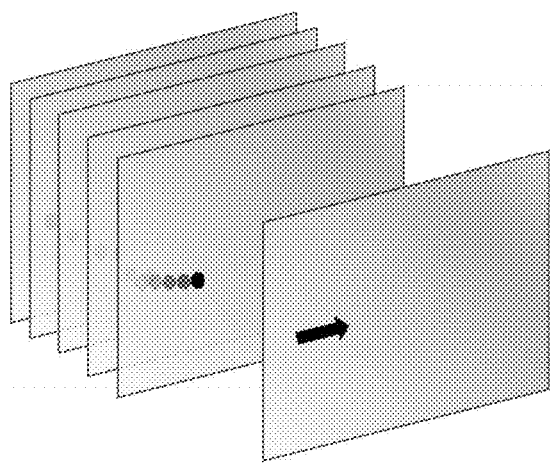
FIG. 6 is a schematic view of how a series of collected points can be collected in frames and subsequently mapped to a swipe-right gesture.

ML algorithms also can be used for gesture identification. Gestures that can be modelled and subsequently recognized include, for example, swipe right, swipe left, swipe up, swipe down, encircle, and/or other gestures. To gather data used in developing models, and to subsequently recognize gestures based on trained models, interactions (such as touch interactions, hover interactions, and/or the like) are collected as a series of frames. The set of frames is processed continuously for real-time reconstruction and recognition of gestures. FIG. 6 is a schematic view of how a series of collected points can be collected in frames and subsequently mapped to a swipe-right gesture, which may be performed on the substrate or as an "air gesture" in proximity to the substrate. Different example embodiments may collect, for example, x, y, z, and t information without capturing full frames per se.

Figure 7:
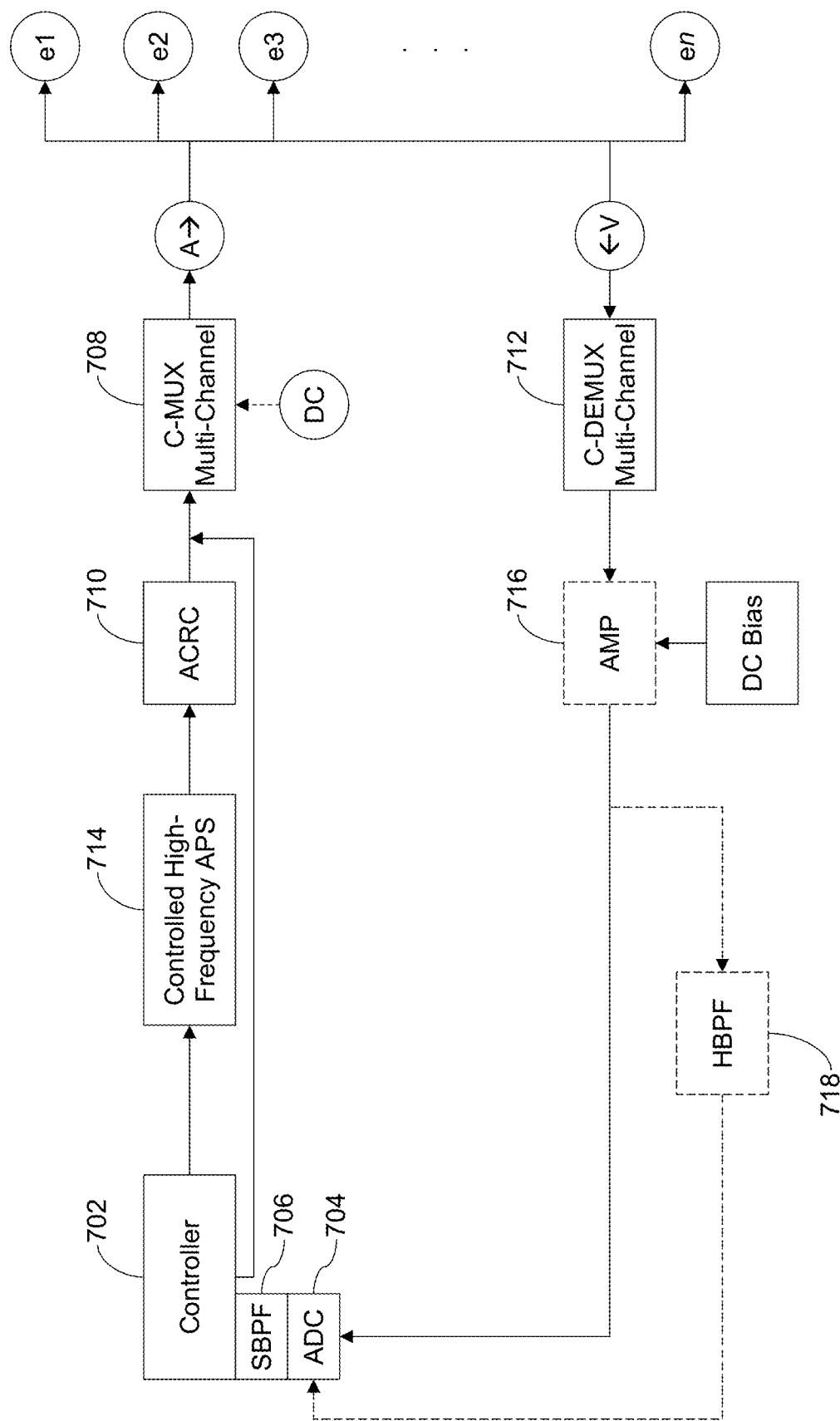
FIG. 7 is a schematic view of control electronics that may be used for electrical tomography mediated operations in accordance with certain example embodiments.

FIG. 7 is a schematic view of control electronics that may be used for electrical tomography mediated operations in accordance with certain example embodiments. In essence, FIG. 7 provides the hardware for an electrical tomography mediated interaction detection system for use with an interface comprising a conductive surface (e.g., a substrate having a conductive surface such as a coating thereon) and a plurality of electrodes provided around edges of the substrate, e.g., as shown in FIG. 1. In certain example embodiments, the electrodes may be arranged in a regular pattern around each side of the substrate, optionally with the electrodes being spaced equidistantly from one another. In certain example embodiments, the electrodes may be arranged in pairs on opposing sides of the substrate with the pairs forming rows and columns across the substrate. In certain example embodiments, one electrode may be provided for a given surface area. For instance, in certain example embodiments, one electrode (or more electrodes) may be provided for each 100-500 $cm^2$ of the substrate's surface area (e.g., with an example of one electrode per 300 $cm^2$ of the substrate's surface area). This dimensionality has been found to provide good accuracy for large-scale interfaces, including interfaces having 65" or 67" or larger diagonals. Of course, the electrode-surface area "density" can be adjusted upwardly or downwardly within or outside of this range, e.g., to impact accuracy.

The FIG. 7 system includes a controller 702, which may be a micro-control board or embedded micro-controller running software, firmware, and/or the like. The controller 702 may be configured to run individual high-speed algorithms, filtering operations, and application-level operations. Point tracking can be performed and simple gestures can be resolved at the controller level via algorithms Example algorithms are set forth in greater detail below.

With respect to the controller 702, an integrated ADC 704 and/or software bandpass filter (SBPF) 706 can be provided so as to reduce the need for additional hardware units and thereby both speed-up and simplify the overall hardware architecture. The controller 702 may be configured to perform at least some tasks in parallel (e.g., through multi-threaded processing, e.g., with a multi-core processor). These parallelizable tasks may include some or all of, for example, current injection, analog-to-digital conversion via the ADC 704, filtering via the SBPF 706, point collection and/or gesture recognition, etc.

The controller 702 is connected to a controlled high-precision multi-channel multiplexer 708. An adjustable current regulator circuit (ACRC) 710 also is connected to the controller 702 and the multiplexer 708. The ACRC 710 is operable in one of several modes, and it may, for example, be thought of as being the main driver for application of the adaptable current on the conductive surface. In other words, the ACRC 710 is configured to control the amperage of the current that the multiplexer 708 is configured to provide to the electrodes. In this regard, in a first mode, for example, the ACRC 710 dynamically adjusts the amperage of the current such that the amperage is increased until current leakage between multiplexer channels exceeds a threshold level and then is reduced such that the current leakage between multiplexer channels is less than the threshold level. This gradual or graduated approach is advantageous because it enables a high current to pass through the multiplexer 708, which can lead to good electrical field creation and in turn enable high detection accuracy by avoiding excess noise creation, cross-channel leakage that could negatively impact electrical field creation, etc.

In this first mode of operation, the ACRC 710 is configured to start increasing the amperage from a baseline level. This baseline level may be preprogrammed (e.g., 20 mA) in certain example embodiments. In certain example embodiments, the baseline level may be based on the amperage actually provided to the multiplexer 708 prior to a touch sensing detection system restart. The amperage increases in the first mode may be made in continuous or stepwise increments. The increments may, for example, be related to (e.g., equal to, some multiple of, etc.) the threshold level, a level of current leakage detectability, and/or the like. In certain example embodiments, a threshold level of 5 mA or lower may be possible. For a substrate having a 65" or 67" diagonal, 30 mA may be appropriate for current injection. Larger values may be used for larger surface areas, for example.

In certain example embodiments, the ACRC 710 may be dynamic in the sense that current leakage could be monitored for during detection and/or other operations, accuracy could be checked, noise in the returned voltage could be monitored, etc. In this regard, in certain example embodiments, if current leakage creeps upwardly or too much noise is returned in the measured voltages, the current provided via the multiplexer 708 may be reduced. Similarly, if accuracy drops, current can be increased. These determinations may be made via the controller 702 based on continual feedback through the overall architectural loop being described.

In certain example embodiments, the ACRC 710 may be controlled directly by the controller 702 based on the injected active-current and measured voltages. Machine learning can be used for ACRC 710 adjustment. That is, ML algorithms can help decide how much current to apply to surface of the interface, e.g., based on characteristics like dimensions/size of the interface, surface material, sheet resistance, etc. Moreover, the controller 702 may in certain example embodiments adjust the ACRC 710 based on dynamically acquired SNR levels. Initial parameters may be set during a training period, and they may be adapted in a real-time process based on the existing characteristics as the real types ("IS") can show differences to trained ("SHOULD") types. Thus, in certain example embodiments, the ACRC 710 provides the ability to regulate current on surface automatically, either through the ML approach or a more programmatic or rules-based step-up/step-down procedure when leakage is detected.

The ACRC 710 may be additionally or alternatively operable in a second mode in which the ACRC 710 causes the multiplexer (e.g., multiplexer channels) to provide a constant (e.g., static, or held and non-adjusting) amperage. The constant amperage in certain example embodiments may be pre-programmed based on known characteristics of the touch detection system. These known characteristics may include, for example, substrate size and sheet resistance characteristics (such as the known sheet resistance of the conductive coating blanket coated on the substrate). In certain example embodiments, the constant amperage may be the last level provided when operating in the first mode.

The ACRC 710 has parallel outputs to the multiplexer 708, e.g., with each channel being a low drop-out channel providing up to 500 mA output in certain example embodiments. The outputs can be parallelized to provide so that current is provided in parallel to the multiplexer 708 and, potentially, in parallel to the electrodes, in certain example embodiments. The algorithmic approaches described below may be modified to account for this parallelized operations, as would be understood with those skilled in the art. The use of multi-core processors or the like also may be used in certain example embodiments to facilitate processing. By providing parallelized current outputs, faster overall processing speeds may be realized. In certain example embodiments, different amperages may be provided over different channels of the multiplexer 708.

The FIG. 7 example system shows a demultiplexer 712, separate from the multiplexer 708, which is configured to receive voltages from electrodes and provide corresponding signals to the controller 702 (e.g., via a direct connection to the controller 702 or components thereof such as the ADC 704, SBPF 706, etc.). In certain example embodiments, a direct connection between the controller 702 and the demultiplexer 712 is not needed. The controller 702 thus is further configured to receive the signals from the demultiplexer 712 and determine therefrom an operation performed in connection with the interface (e.g., a touch, gesture, hover, or other interaction performed in connection with the interface). Different voltages may be provided over different channels of the demultiplexer 712, e.g., based on the disturbance to the field. Although the FIG. 7 example has a multiplexer 708 that is separate from the demultiplexer 712, it will be appreciated that certain example embodiments may use a single plexer for both multiplexing and demultiplexing related operations.

In certain example embodiments, an analog power supply (APS) 714 may be interposed between the controller 702 and the ACRC 710. The APS 714 is configured to provide power to the ACRC 710, e.g., via a direct digital synthesizer (DDS) for higher voltage output. In certain example embodiments, DDS need not be implemented. It will be appreciated that AC current and voltage is being applied on the surface of the interface (not counting the DC bias), whereas DC voltage may be for the multiplexer 708 and demultiplexer 712. In certain example embodiments, a DC bias may be applied to an amplifier that receives voltages from the demultiplexer, e.g., as shown in FIG. 7 when amplifiers and/or other hardware is used.

In certain example embodiments, the demultiplexer 712 and the controller 702 may be directly connected to one another. Thus, for example, the path between the demultiplexer 712 and the controller 702 may lack amplifiers and/or hardware bandpass filters and/or other hardware elements. This may be possible because of the low noise (and thus the high signal-to-noise ratio or SNR) provided by the demultiplexer 712. In certain example embodiments, noise in the signals provided by the demultiplexer 712 to the controller 702 is less than 5%. In such instances, the controller 702 may be configured to filter noise in the signals from the demultiplexer 712 using software (such as including the SBPF 706 or simple thresholding), if necessary. That is, because the noise is so low, it simply may be ignored in certain example embodiments. This may be advantageous because more potentially useful data may be retained and the data may be obtained faster, e.g., compared to approaches that implement amplifiers and hardware bandpass filters and/or the like. Having fewer components can simplify the overall design. In other words, the controller 702 may have a software bandpass filter 706 integrated therein, with the SBPF 706 being configured to operate on the signals provided by the demultiplexer 712 if and when needed. Example measurements taken using the hardware approach described herein are discussed in greater detail below in connection with FIGS. 20A-22.

Leakage can be caused by having many multiplexer channels. In this regard, if the input current exceeds or comes very close to the maximum that can be handled on the channels, then the exceeded current is not homogeneously distributed between the other channels. This can cause a problem (e.g., a low SNR) during the reading of the voltage measurements from the electrode pairs because other electrodes can improperly behave as injectors during the measurements despite the intention to have them not perform as such and to limit the injectors to a different pair of electrodes.

Wiring and multiplexer and demultiplexer design may be used to help address current leakage issues. The wiring used to connect the controller to the multiplexer and demultiplexer may be highly isolated against the noise. The resistance of the wire can help drive the isolation and, thus, the wire thickness, material used, homogeneity of the material, etc., may help reduce noise via the wiring.

The multiplexer and demultiplexer design can help to reduce the amount of leakage by smart control of channels and inspecting measurements when leakage occurs. In certain example embodiments, there is a direct connection from the controller to each channel of the multiplexer for current injection. The current is applied and, in parallel, all channels are measured. The main channel in the multiplexer should have the total current if there is no leakage. When the main channel has less current than the main stream (e.g., 30 mA) or any of the other channel has a current over the tolerance, then in certain example embodiments that level is recorded as the maximum current injection level for the later use. Similar wiring may be provided for the demultiplexer, e.g., in embodiments where the multiplexer and demultiplexer are separate from one another.

Referring once again to FIG. 7, in certain example embodiments, an amplifier 716 and/or hardware bandpass filter (HBPF) 718 may be interposed between the demultiplexer 712 and the controller 702. This may be useful when there is a low SNR. The amplifier 716 can be used such that measured voltages can be amplified with proposed gain control. An optional HBPF 718 may be used so as to filter measured voltages in specific band-ranges, e.g., using low-pass and/or high-pass filters. Where a homogeneous current distribution is not possible (as there is high noise in measurements) and/or current cannot be increased because of hardware limitations, inclusion of the HBPF 718 also may be desirable. Both the amplifier 716 and the HBPF 718 are optional, as indicated by the dashed lines. By omitting these elements, voltage measurement acquisition speed can be increased and the hardware implementation can be simplified.

Using algorithms such as those discussed in greater detail below, the controller 702 can receive input from the demultiplexer 712 to identify an interaction location for an operation (e.g., touch, hover, gesture, and/or other operations) performed in connection with the interface, distinguish between different operations performed in connection with the interface, run a machine-learned algorithm to identify operations (such as gesture operations) performed in connection with the interface, recognize other operations performed in connection with the interface, and/or the like.

In the approach outlined in FIG. 7, an advanced or highly performant computer is not needed to handle static and gesture-related interactions. This is possible because the electrical field for the entire substrate need not be recreated. Instead, compatible algorithms can be used for high-speed identification of touch-related interactions (including multi-touch and gesture related input). Moreover, performance requirements can be decreased because ML-related techniques need not be used at the level of understanding a single interaction (e.g., touch) point and instead can be used for understanding a collection of interactions (e.g., touch points), e.g., for gesture- and/or other related functionality.

Several example compatible algorithmic approaches to processing voltage-related signals will now be described. It will be appreciated that these example algorithmic approaches may be used together with or separate from the above-described example hardware configurations. That is, the signals from the example hardware arrangement in FIG. 7 may be used in connection with any one or more of the below-described algorithms, or the algorithms described below can process data obtained from other hardware implementations. That is, the algorithmic approaches may be hardware independent. Example modifications to the algorithms are set forth below, but it will be appreciated that these algorithms may be modified to serve different purposes.

The algorithms may be implemented as computer-executable instructions stored in a memory (e.g., a RAM, ROM, HDD, SSD, memory card, firmware, and/or the like). At least one processor may be configured to perform these computer-executable instructions. The processor may be a general purpose processor, a part of the controller 702 in FIG. 7, an ASIC, and/or the like.

Although the use of one or more multiplexers and/or demultiplexers is described above, it will be appreciated that different example embodiments may not need any such hardware. That is, in some instances, electrodes may be directly (or at least more directly) connected to a controller in some instances. This arrangement may be possible especially where there are fewer total electrodes. For example, in a system where the desired resolution is low, few electrodes may be provided, and input/output signals may be provided from a controller without any intervening multiplexers. In a system where there are, for example, two electrodes designed to detected proximity/hover and touch, the use of multiplexers may be omitted. This may be useful for a robot skin sensor or other piece of machinery that otherwise simply detects human presence and/or touch and reacts accordingly.

Example Single and Dual Four-Loop Algorithm

A first example algorithmic approach may be thought of as a four-loop algorithm. As will be appreciated from the description that follows, the four-loop algorithm may be single or dual directional. The dual directionality may be useful for larger surfaces and/or high-accuracy applications. The algorithmic approach as a whole may be thought of as being based on a four-pole reading and be similar to the approach set forth above.

Figure 8:
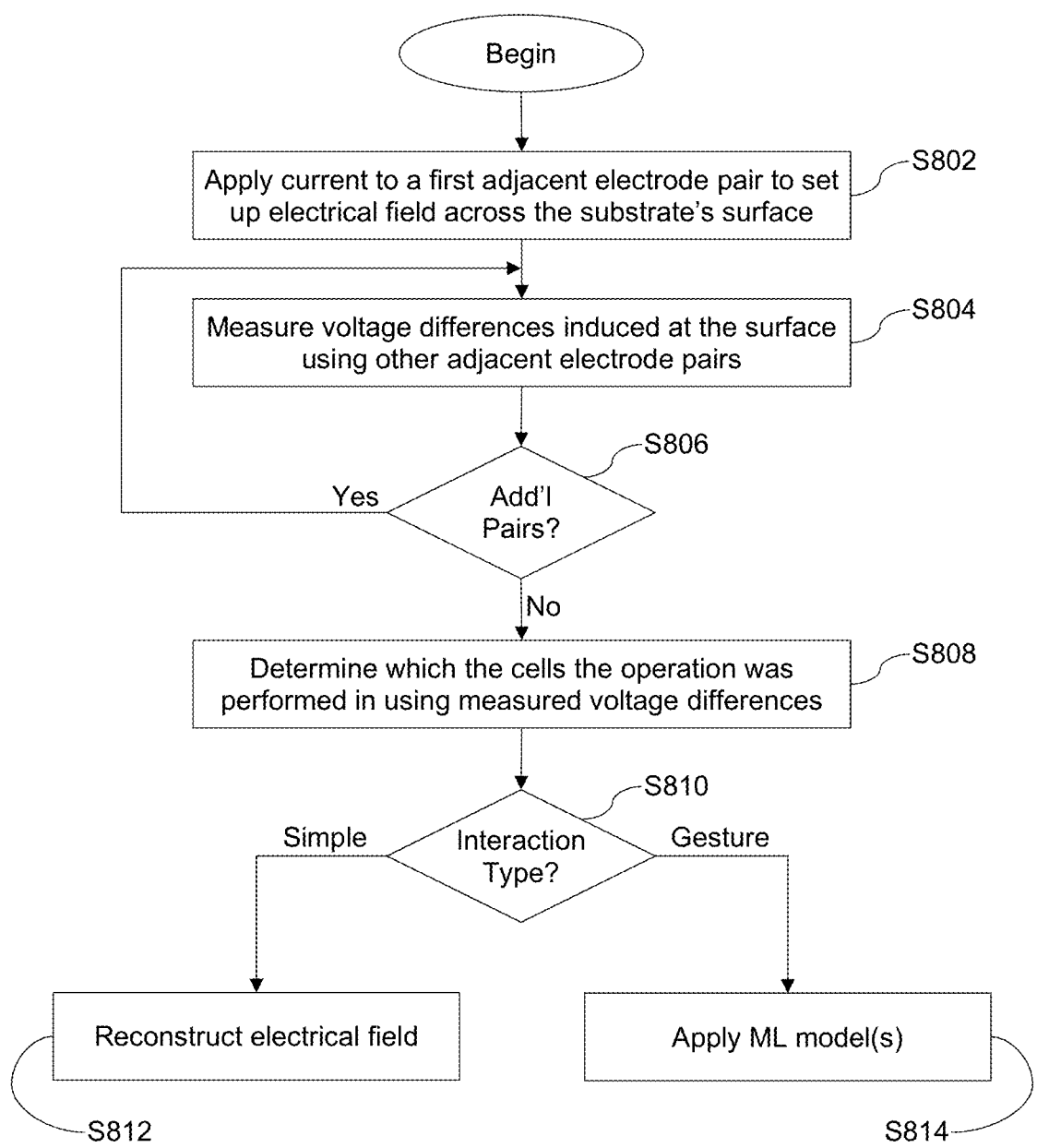
FIG. 8 is a flowchart showing a first algorithmic approach (the "four-loop" algorithm) for identifying an interaction (such as a touch-related interaction) in connection with an interface, in accordance with certain example embodiments.
Figure 9:
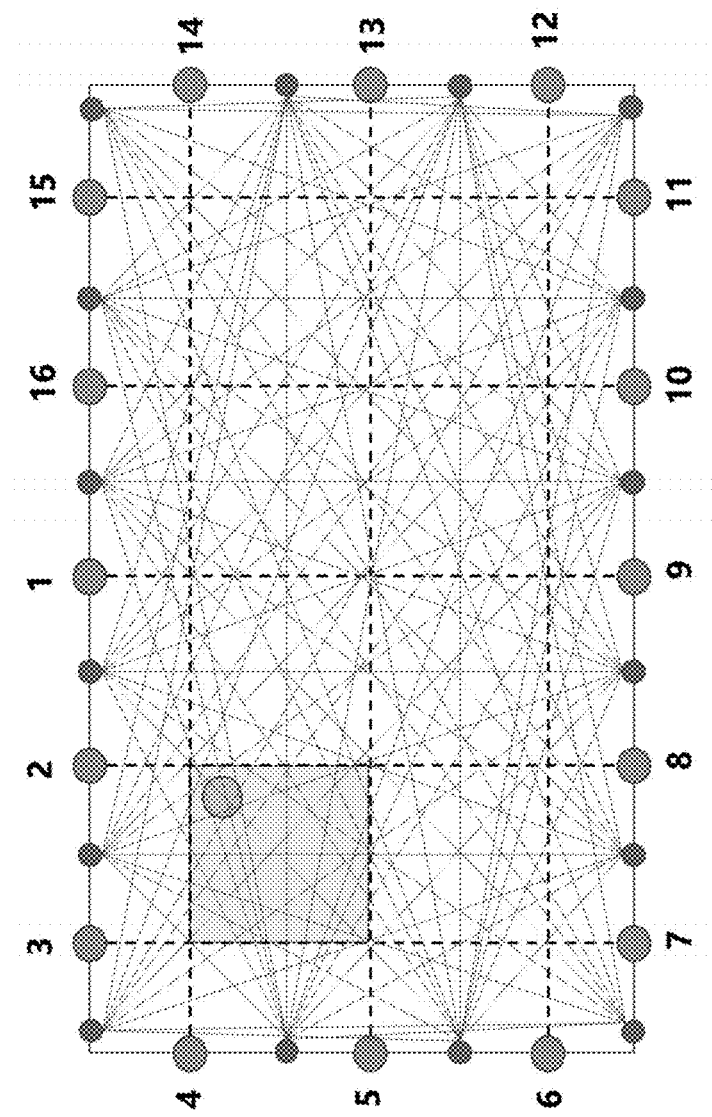
FIG. 9 is a representation of how the FIG. 8 flowchart may operate in a first phase, in accordance with certain example embodiments.

With respect to the four-loop algorithm, FIG. 8 is a flowchart showing a first algorithmic approach for identifying an interaction (such as a touch-related interaction, Z-coordinate location for hover detection, etc.) in connection with an interface, in accordance with certain example embodiments; and FIG. 9 is a representation of how the FIG. 8 flowchart may operate in a first phase, in accordance with certain example embodiments. The FIG. 9 example includes 16 electrodes disposed around the periphery of a substrate that supports a conductive coating. In the FIG. 9 example, the electrodes are disposed equidistantly around all four edges of the substrate. The smaller circles between the numbered electrodes are the assumed locations of the measurements (which applies in this drawing and the other similar drawings discussed in greater detail below).

The FIG. 8 approach helps characterize an operation performed in connection with an interface shown schematically in FIG. 9. The characterization of the interaction may include a type of interaction with the interface and a location therefor. Valid interaction types include static touch, multi-touch input, various gestures, hover operations, and/or the like. In the case of single and multi-touch inputs, the locations may be X and Y coordinates relative to the substrate. In the case of gestures, the characterization may further include gesture type, start and stop locations for the gesture, vector magnitudes and/or directions, etc.

It is noted that a collection of adjacent electrode pairs is defined such that each said electrode is a part of two different adjacent electrode pairs in the collection. In the FIG. 9 arrangement, the interface is divided into rows and columns of cells, with the cells being defined by lines between opposing electrodes. Depending on the arrangement, the number of cells in each row may equal one more than the number of electrodes extending in a horizontal direction, and the number of cells extending in each column may equal one more than the number of electrodes extending in a vertical direction. It is noted that the "lines" are notional in the sense that opposing electrodes are not directly wired together, that the conductive coating is not patterned, etc.

As shown in step S802, a current is applied to a first adjacent electrode pair to set up an electrical field across a surface of the substrate. In step S804, voltage differences induced at the surface are measured using at least some of the adjacent electrode pairs. That is, in certain example embodiments, the voltage differences induced at the surface are measured using each adjacent electrode pair (i) other than the first adjacent electrode pair and (ii) other than the two adjacent electrode pairs involving the electrodes in the first adjacent electrode pair. The voltages may be voltage drops measured along the lines indicated schematically in FIG. 9. Steps S802 and S804 are repeated for each of the adjacent electrode pairs in the collection, e.g., as informed by the decision made at step S806. The values obtained in step S804 may be stored to a lookup table or the like (and this storage location may be used in the algorithmic descriptions that follow when data obtained from electrodes is stored), e.g., so that a MIN function can be used to determine the largest function drop efficiently using this or other appropriate data structure.

In step S808, a determination is made as to which one of the cells the operation was performed. This determination is made based on the measured voltage differences. To facilitate this determination, the voltage differences measured in step S804 may be stored to a lookup table or other structure (e.g., managed by the controller 702). This determination may include, for example, selecting the measurements with the largest voltage differences, and determining that the cell bounded by the electrodes used to generate the selected measurements is the cell in which the operation was performed. With regard to the former, the total number of measurements used in the first step will be the number of electrodes multiplied by (the number of electrodes—3). The measurements are compared to each other to find largest voltage drops, and the largest voltage drops may be selected for follow-up. For example, a determination may be made as to whether the voltage drop is at least as large as a threshold level. This thresholding approach may be advantageous because it can help ignore spurious signals caused by, for example, electromagnetic interference (EMI), improper or unexpected hovers, passers-by, etc.

A calculation is performed using the measured voltage differences related to the determined cell to characterize the operation. As indicated in step S810, the operation is characterized as being one of a static interaction and a gesture input. It is noted that a determination also may be made as to whether multi-touch input has been provided. The calculation performed to characterize the operation includes a reconstruction of the electrical field in the determined cell using a subset of the electrodes, provided that the operation is a static interaction, as indicated in step S812. On the other hand, the calculation performed to characterize the operation includes collecting information for a plurality of perturbations to the interface and using a machine-learned model in connection with the collected information, provided that the operation is a gesture input, as indicated in step S814.

In step S812, a reconstruction of the electrical field is created for a portion of the interface or a "cell" of the interface. It is not necessary to reconstruct the electrical field for the entire substrate. In certain example embodiments, reconstructions of the field proximate to other cells are not created. Instead, as noted above, a subset of the electrodes may be used in this reconstruction. The subset of electrodes used in the reconstruction may include at least four electrodes provided in pairs in a common horizontal and/or vertical alignment(s) that bound(s) the determined cell. For instance, where the touch is provided in the area of the central circle in FIG. 9, the 2-8 and 3-7 vertical electrode pairs may be used in recreating the electrical field for a portion for the interface, the 4-14 and 5-13 horizontal electrode pairs may be used in recreating the electrical field for a portion for the interface, or all of these pairs may be used. In general, the subset may include at least four electrodes provided in a first common alignment that bounds the determined cell in a first direction and at least four other electrodes provided in a second common alignment that bounds the determined cell in a second common direction orthogonal to the first common direction. In certain example embodiments, the subset of electrodes used in the reconstruction may further include additional electrodes aligned in pairs adjacent to the electrode pairs that bound the determined cell. Thus, in keeping with this FIG. 9 example, when only vertical electrode pairs are used, the 1-9, 2-8, and 3-7 vertical electrode pairs may be used in the reconstruction.

Figure 10:
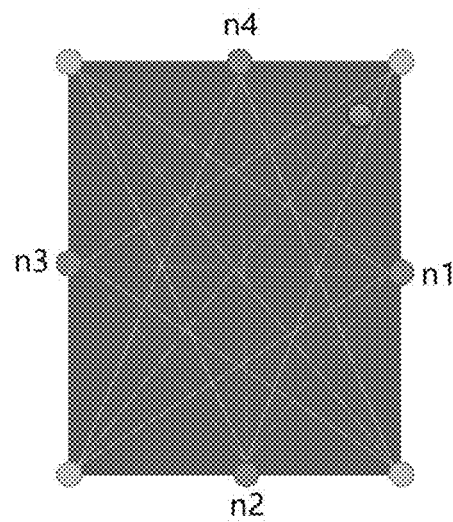
FIG. 10 is a representation of how the FIG. 8 flowchart may operate in a second phase, in accordance with certain example embodiments.

The calculation performed to characterize the operation may include a finite element method (FEM) approach. The FEM approach may, for example, implement a center of gravity, momentum, and/or min-triangle calculation, provided that the operation is a static interaction. An FEM approach may be implemented at an algorithmic level and need not be presented as a part of a visualization in certain example embodiments. In certain example embodiments, this reconstruction is created only for a portion of the interface. Then, image processing techniques can be applied to more precisely determine the location of the simple touch-related interaction. For instance, FIG. 10 is a representation of how the FIG. 8 flowchart may operate in a second phase, in accordance with certain example embodiments. More specifically, FIG. 10 shows a min-triangle approach to determining the touch location. These techniques may be used in lieu of a machine-learned model in the event that the operation is a static interaction. In FIG. 10, the circles in the corners are intended to indicate electrode locations, whereas the circles in the centers of the edges are the assumed locations where the measurements are taken. In certain example embodiments, specified electrodes and respective voltage measurements are used in connection with a center of gravity (COG) algorithm to identify the best fitting touch triangle and touch region with repeated measurements. That is, as will be appreciated from FIG. 10, the connecting lines divide the surface into a series of triangles, and the touch location can be determined with reference to the created triangles. From an electrical perspective, the touch interaction on the surface generates the largest voltage drop on the closest electrode, and the voltage also drops on other electrodes in the cell regions. The COG algorithm in certain example embodiments uses these relative voltage drops between electrodes to define the touch region and distances to electrodes which, in turn, can be used to determine a location for the touch interaction.

In contrast with this approach for simple, static interaction detection, gesture detection may involve the use of machine-learned models. The models may be trained based on different interaction types such that different gestures are associated with different models. The training data may include a series of touch coordinates being provided. To define a gesture, a collection of static interaction points may be collected over time. The time for collection may be bounded by a detection of a touch-off event and/or a predetermined time period elapsing. That is, a gesture may be defined as all touches received until no touch is detected for a predetermined time period and/or until a timer reaches a predetermined timing. With respect to the former, the approach described in connection with step S812 may be used to collect data for a plurality of detections. This information may be stored to a buffer. Timestamp information may be associated with the positions. When no more points are detected for a predetermined amount of time, or when there is a predetermined time gap between subsequent detections, the gesture may be considered complete. With regard to the latter, most gestures may be completed within 1-5 seconds, depending on the size of the substrate, the complexity of the gesture, and/or the like. Thus, this timing may be used to determine when a gesture is likely completed. Once the training data is received, different models may be developed for different gesture types. In use, the information for a plurality of perturbations may be matched to one of a plurality of these machine-learned models to determine the gesture type.

Simply stated, in certain example embodiments, in use, information for a collection of perturbations may be obtained, the information for the collection of perturbations may be matched to a machine-learned model, and a gesture input provided to the interface may be recognized based on the matching. The information about the collected perturbations may be stored in a buffer or other storage medium, and the matching may be performed using the buffer. The buffer may be wiped after a touch-off event is detected and/or the matching is complete.

One approach to using machine learned models may include defining an XLD contour region in connection with the information for the collection of perturbations. An "IS" model may be generated in connection with the defined XLD contour region. The "IS" model may be compared to a plurality of trained XLD "SHOULD" contour models. Training of models can be done artificially similar to optical character recognition (OCR) techniques and/or directly on the surface (e.g., via Surface Based Training on Real Objects). A determination may be made as to whether there is a match to a trained XLD contour model based on the comparison. Although XLD contour models are described here and elsewhere, it will be appreciated that other image segmentation, region-based contour models, and/or other technologies may be used in different example embodiments.

It will be appreciated that current may be provided basically continuously throughout the FIG. 8 process. Moreover, it will be appreciated that steps S802 through S806 are performed continuously during static interaction detection. In certain example embodiments, steps S802 through S806 may be run while steps S812 and/or S814 are executing.

As noted above, the processing loop may be unidirectional or bidirectional. For the former, step S802 through S806 may be performed unidirectionally in a loop around the substrate. That is, the processing may sequentially consider electrodes 1-2, 2-3, 3-4, etc. For the latter, step S802 through S806 may be performed bidirectionally around the substrate in a first loop and in a second loop that is the inverse of the first loop. That is, the processing may consider electrodes 1-2 and 16-15 at the same time in a first iteration, then consider electrodes 2-3 and 15-14 at the same time in a second iteration, etc. It will be appreciated that unidirectional and bidirectional processing here (and in the algorithmic approaches described below) may or may not define a specific order of activating electrode pairs. In certain example embodiments, the unidirectionality simply refers to activating each pair in the system so that current is applied to one electrode and voltage is received from the other, whereas the bidirectionality refers to activating each pair in the system so that current is applied each electrode in the pair and voltage correspondingly is received from each electrode in the pair. In other cases where ordering does matter, a starting electrode pair may be selected, and the electrodes may be activated in a defined order in relation thereto (e.g., clockwise or counter-clockwise therefrom).

Example Divider Loop Algorithm

A second example algorithmic approach may be thought of as a divider loop algorithm. As above, the divider loop algorithm may be single or dual directional. The divider loop algorithm is advantageous in that it can be used for initial interactivity detection and also subsequent interaction position tracking.

Figure 12:
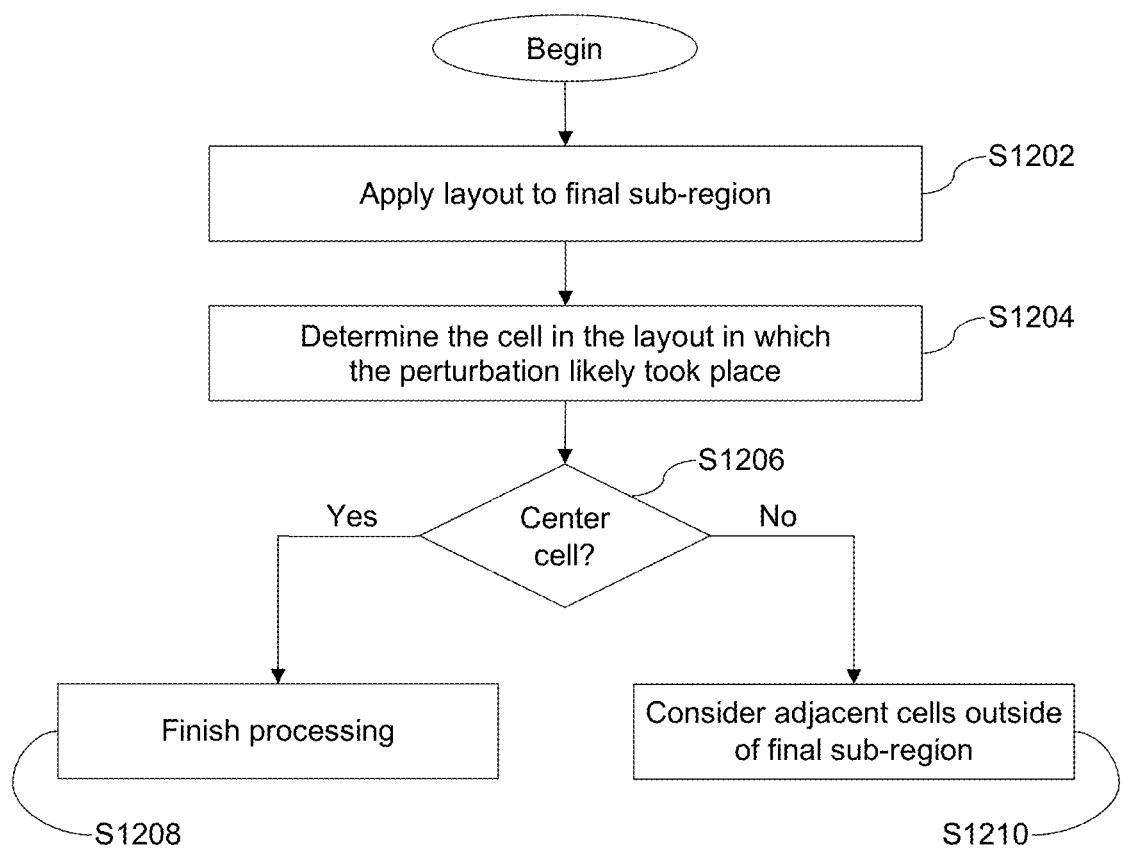
FIG. 12 is a flowchart showing how an interaction identified using the FIG. 11 technique can be more precisely identified and/or characterized, in accordance with certain example embodiments.
Figure 11:
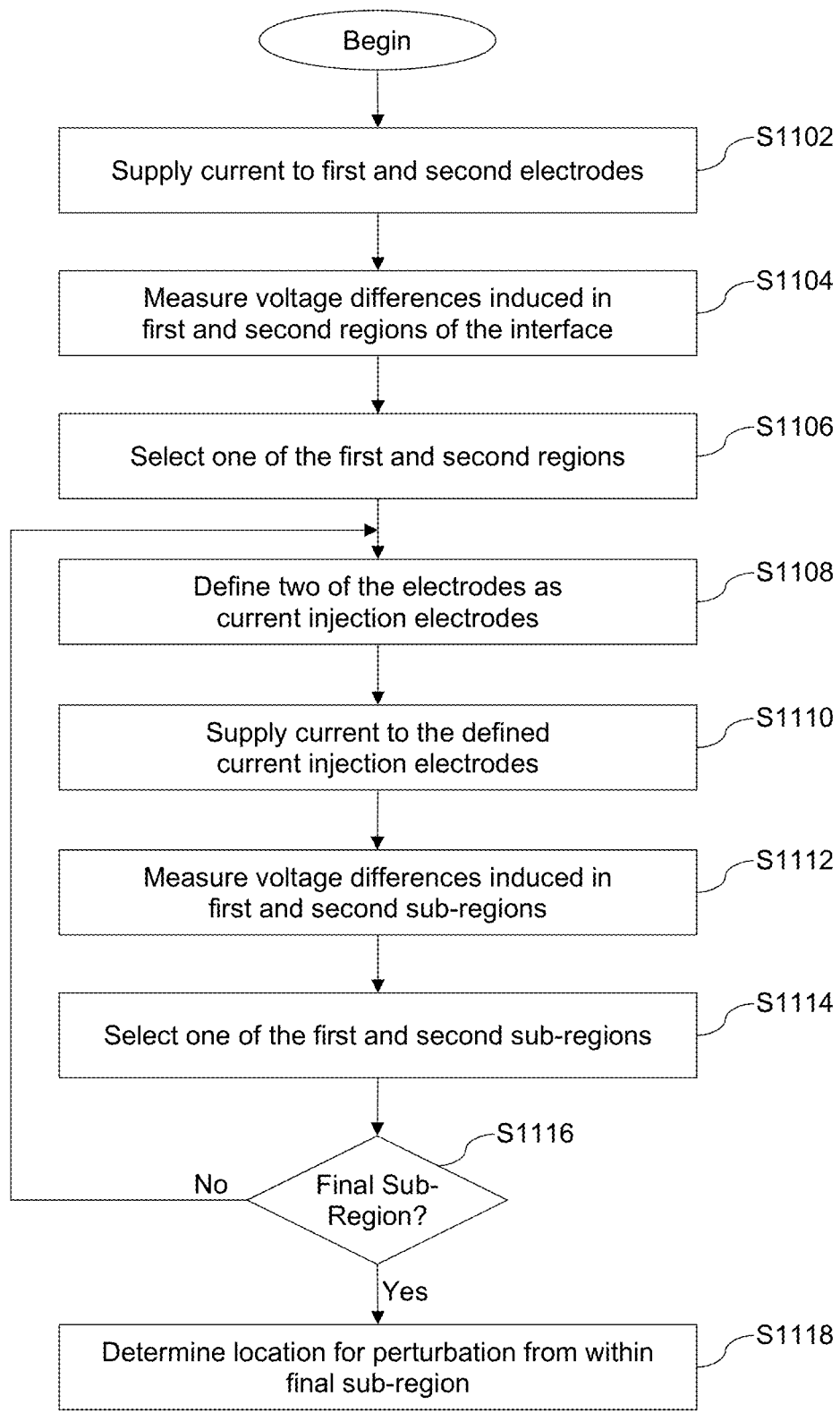
FIG. 11 is a flowchart showing a second algorithmic approach (the "divider loop" algorithm) for identifying an interaction (such as a touch-related interaction) in connection with an interface, in accordance with certain example embodiments.

FIG. 11 is a flowchart showing a second algorithmic approach for identifying an interaction (such as a touch-related interaction) in connection with an interface, in accordance with certain example embodiments; FIG. 12 is a flowchart showing how an interaction identified using the FIG. 11 technique can be more precisely identified and/or characterized, in accordance with certain example embodiments; and FIG. 13 is a representation of how the FIG. 11 flowchart may operate in a first phase, in accordance with certain example embodiments.

Figure 13:
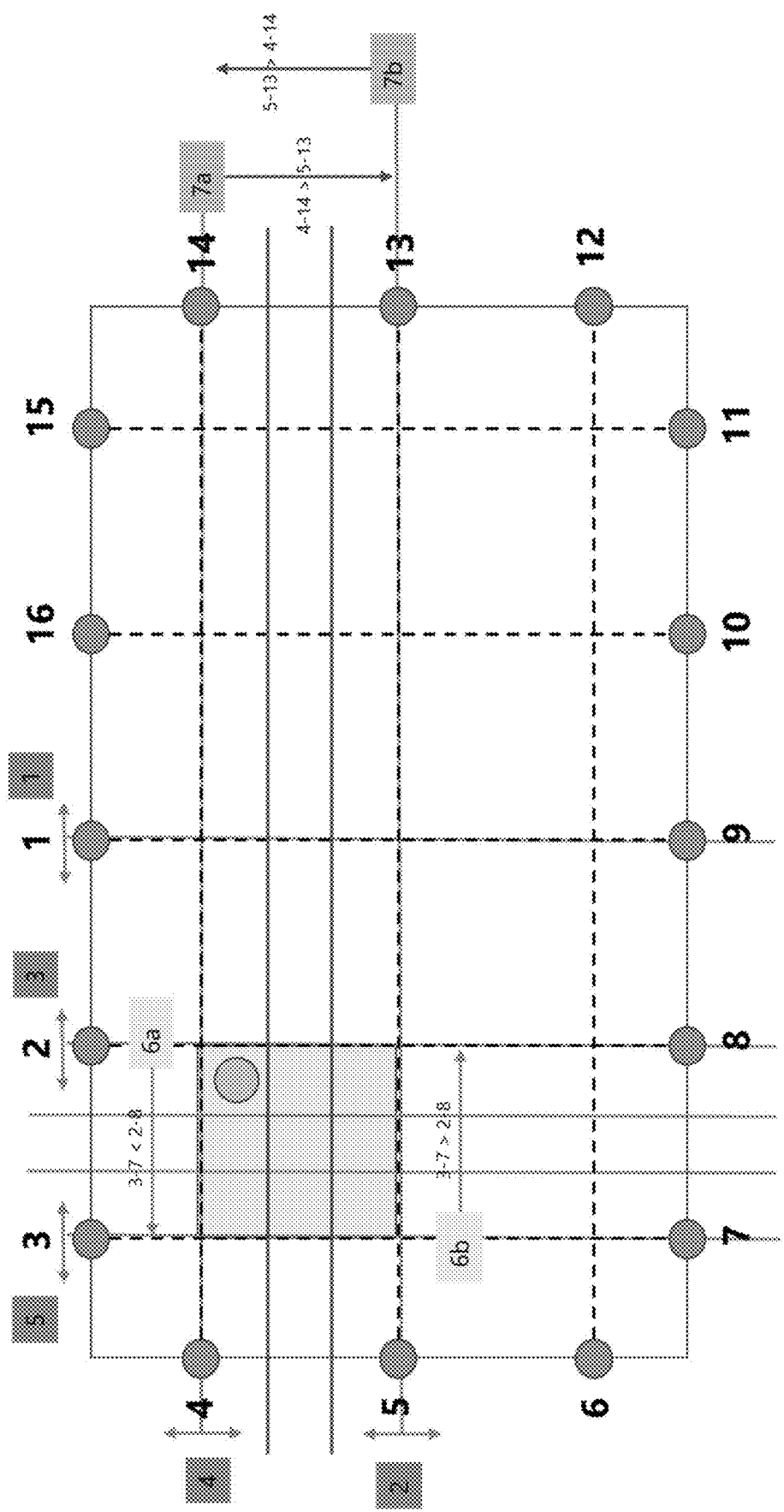
FIG. 13 is a representation of how the FIG. 11 flowchart may operate in a first phase, in accordance with certain example embodiments.

Similar to the four-loop algorithmic approach described in detail above, the FIG. 11 approach helps characterize an operation performed in connection with an interface shown as schematically in FIG. 13. The electrodes may be continuously active during the FIG. 11 process, in certain example embodiments.

Also similar to the above, in FIG. 13, the interface comprises a substrate supporting a conductive coating and a plurality of electrodes applied around edges of the substrate. In step S1102, current is supplied to first and second electrodes from the plurality of electrodes. Here, the first and second electrodes are on opposing edges of the substrates such that a first "notional" line connecting the first and second electrodes defines first and second regions of the interface. The voltage differences induced in the first and second regions of the interface as a result of the current supply are measured in step S1104. The measurements may be practiced using four electrodes in certain example embodiments.

In step S1106, one of the first and second regions of the interface is selected based on the measurements taken in step S1104. Depending on the electrode placement, the first and second regions of the interface may be of substantially equal size. The selection may be based on which one of the first and second regions has the larger voltage drop. That is, in certain example embodiments, the region associated with the larger voltage drop will be selected. That said, in certain example embodiments, a determination may be made as to whether the measured voltage differences are at least substantially equal to one another. For instance, a determination may be made as to whether the measured voltage differences differ from one another by no more than a threshold amount. If the two measured voltage differences are within this threshold, a determination may be made that a touch-related event is unlikely to have occurred. In this case, the process can be aborted.

Now, in step S1108, two of the electrodes from the plurality of electrodes are defined as being current injection electrodes. The current injection electrodes used here are different from the first and second electrodes and are different from any previously defined current injection electrodes. Moreover, a second notional line connecting the current injection electrodes defines first and second sub-regions within the selected region and within any other previously selected sub-regions. Similar to the above, depending on the electrode placement, the first and second sub-regions may be of substantially equal size. This may be true of the first and second sub-regions within each repetition of the loop defined in FIG. 11. Current is supplied to the defined current injection electrodes in step S1110, and voltage differences induced in the first and second sub-regions as a result of step S1110 are measured in step S1112. As above, the measurements may be practiced using four electrodes in certain example embodiments.

In step S1114, one of the first and second sub-regions is selected based on the measurements taken in step S1112. As above, the selection here may be based on which one of the first and second sub-regions has the larger voltage drop. That is, in certain example embodiments, the sub-region associated with the larger voltage drop will be selected. And as will be appreciated from the loop in FIG. 11, this selection may be made with each repetition.

Steps S1108 through S1114 are repeated until a final sub-region of a predetermined size is selected, e.g., as determined in step S1116. The predetermined size may be set in advance in certain example embodiments. In certain example embodiments, the predetermined size may represent a sub-region bounded by two directly adjacent electrodes on each side. That is the case in the FIG. 13 example, where the final sub-region is bounded by pairs of adjacent electrodes including electrodes 2-3 and 5-13 for top and bottom borders and electrodes 2-8 and 3-7 for the left and right borders.

A determination of a location for a perturbation to the interface is made from within the final sub-region in step S1118. This may be practiced using an image processing technique such as, for example, a center of gravity, momentum, min-triangle calculation, or the like, as noted above. The approach outlined in FIG. 12 also may be used in certain example embodiments. That is, as shown in FIG. 12, the final sub-region may be notionally divided into a grid comprising a predetermined layout of cells in step S1202. The predetermined layout may be selected from a plurality of different possible predetermined layouts pre-stored and accessibly by the controller 702 for example. The more cells, the more accurate the detection may be. The layout may be a grid comprising rows and columns, a honey-comb like arrangement, and/or the like. For grid and grid-like approaches, cells may be oriented in different numbers of rows and columns. For instance, 3×3, 4×4, 5×5, and/or other arrangements of cells (which may or may not have the same number of rows and columns in different example embodiments) may be used. The number of cells may be increased based on coating conductivity improvements, addition of electrodes, etc. The location for the perturbation may be determined with reference to this predetermined and applied layout of cells.

As noted in step S1204, the determination of the location for the perturbation is performed with respect to one of the cells in the predetermined layout in which the perturbation was likely to have occurred. In this regard, consideration may be given to whether the likely location was in a center cell (see step S1206). Processing may be ended if the cell likely was the center cell (see step S1208). Additional consideration may be given to one cell adjacent thereto provided that the cell in which the operation likely was performed is not in the predetermined layout's center or corners, or multiple cells adjacent thereto provided that the cell in which the operation likely was performed is in one of the predetermined layout's corners (see step S1210). In the latter case, the one or more cells adjacent to the cell in which the perturbation was likely to have occurred may be outside of the final sub-region. In certain example embodiments, if the determined cell is on an edge (such as but not limited to a corner), then additional cells (including cells outside of the sub-region) may be considered. For instance, in certain example embodiments, if a predicted cell is at a side edge, then an additional evaluation method such as a (bi-cubic) neighbor comparison of voltage drops may be used to identify the cell more accurately. Thus, it will be appreciated that certain example embodiments may perform more accurate cell identification based on extended analysis in the case of border cell identification.

To help determine which cell the perturbation likely took place in, measured voltages may be compared to baseline or other data associated with each of the cells in the predetermined layout. That is, each cell in each possible final sub-region can be pre-characterized to have an associated voltage-related measurement usable in determining when a touch-related event is likely to have occurred with respect to that respective cell. The pre-characterization may be performed using machine learning, using a manual calibration, and/or the like. A machine learning approach will continue to learn/train as new touch detection values come in to the system. Clustering can be used, e.g., based on the user forcing a result that is close to previously-trained data, etc. Larger clusters imply lower accuracy, so cluster size may be linked to the size and/or position of the user interface elements, substrate size, etc. The overall machine learning approach may be quite dynamic. Another example of dynamic training may involve scripted calibration. In a scripted calibration, the user may be asked to perform a number of tasks. These tasks may involve instructions to touch specific locations for specific amounts of time, draw specific shapes in specific areas, and/or combinations thereof (e.g., touch in a first location for a first amount of time, move to a second location for a second amount of time, etc.). The scripts may be stored to a computer readable storage medium and accessed by the controller. The controller may, for example, retrieve these scripts and control lighting and/or speakers to describe where/how to perform the scripted interactions. In certain example embodiments, scripts may be updated (e.g., when updated via a network connection to a remote system, through downloads, by replacement of components, etc.). In certain example embodiments, an authorized user may be able to dynamically train the system to recognize more locations and/or gestures through dynamic training. For instance, in certain example embodiments, a user may custom-program user interface components and train the system to expect interactions in different places. Masks can be dynamically optimized to make more accurate decisions in certain example embodiments. A more static manual calibration that does not update over time also may be used. A more static approach may involve, for example, accessing pre-stored information and ensuring that the system is pre-calibrated based on known characteristics of the interface itself, the expected interactions, etc. By understanding characteristics of the substrate, it is possible to define regions of X-Y values using a more static rules-based approach. It will be appreciated that static and/or dynamic approaches may be used for point detection and/or gesture detection (the latter of which may be implemented as a collection of point detection operations, as described herein). Static approaches may be particularly well-suited for simple gestures related to interactions used for turning a light on/off or otherwise simply flipping a switch or using a simulated analog controller to dim lights, adjust volume on a speaker, control temperature in a room or vehicle, etc. Dynamic approaches may be better for more complicated approaches such as, for example, handwriting recognition, etc.

As alluded to above, different masks may be defined for different areas of the interface, and a determination as to which mask applies to a given final sub-region may be based on the distance to electrodes. In this regard, and for example, the farther the touches are from the electrodes, the higher the ratio should be. Comparisons to a voltage threshold also may be made, e.g., to weed out potentially spurious signals. The voltages used in pre-characterization and subsequent matching may be those bounding the respective final sub-region. That is, in the FIG. 13 example, electrodes 2-5, 7-8, and 13-14 may be used in the pre-characterization and pattern matching, e.g., so that each cell in the 3×3 layout is pre-characterized. In use, the voltage drops for electrodes bounding the final sub-region may be measured, measured voltage drop ratios for adjacent electrode pairs may be calculated, and a cell selection may be made based on the calculated ratios. Thus, in certain example embodiments, voltage drop ratios for the respective electrodes may be considered such that the cell selection is made by matching measured voltage drop ratios to the pre-characterizations. In certain example embodiments, drop ratios may be defined in percentage terms, e.g., based on the voltage drop by touch—reference voltage without touch.

The operation of FIG. 13 will now be described and will help further illuminate aspects of this example approach. In FIG. 13, the interface is notionally divided in half, using a "line" between electrodes 1 and 9. Because the touch is on the left side of the interface as indicated by the circle, the voltage drop to the left half is larger than the right half. In the next iteration, the left half of the interface is notionally divided in half using a horizontal line "connecting" electrodes 5 and 13. The touch location is above this line, so the next sub-region for comparison is to the left of the 1-9 line and above the 5-13 line as determined by the voltage drop above the line being greater than the voltage drop below the line.

This current sub-region is divided in half using the line "connecting" electrodes 2 and 8. The touch location is to the left of this line, as determined by the voltage drop above the line being greater than the voltage drop below the line. This current sub-region is roughly divided in half using the line "connecting" electrodes 4 and 14. The touch location is below this line. This current sub-region is roughly divided in half using the line "connecting" electrodes 3 and 7. The touch location is below this line.

At this point in the operation, adjacent electrodes bound a final sub-region. That is, electrode pair 2-8 is directly adjacent to electrode pair 3-7, and electrode pair 4-14 is directly adjacent to electrode pair 5-13. Checks may be performed to confirm this final sub-region. Once the final sub-region is reached, a 3×3 grid is applied, and the voltage measurements from at least these bound electrodes (electrodes 3-5 and 7-8) are considered. These measurements are compared to the pre-characterization data, and the final touch position is determined to be within the upper-right cell.

It will be appreciated that in certain example embodiments, subsequent divisions are perpendicular to one another. Using the language above, the first line and the second line for a first repetition are perpendicular to one another, and the current injection electrodes are selected in successive repetitions so that perpendicular second lines are defined in the successive repetitions. Different example embodiments may use different partition methodologies. For example, divisions in a vertical direction may be repeated until an active column is determined and then divisions in a horizontal direction may be repeated until an active row is determined, or vice versa.

Figure 14A:
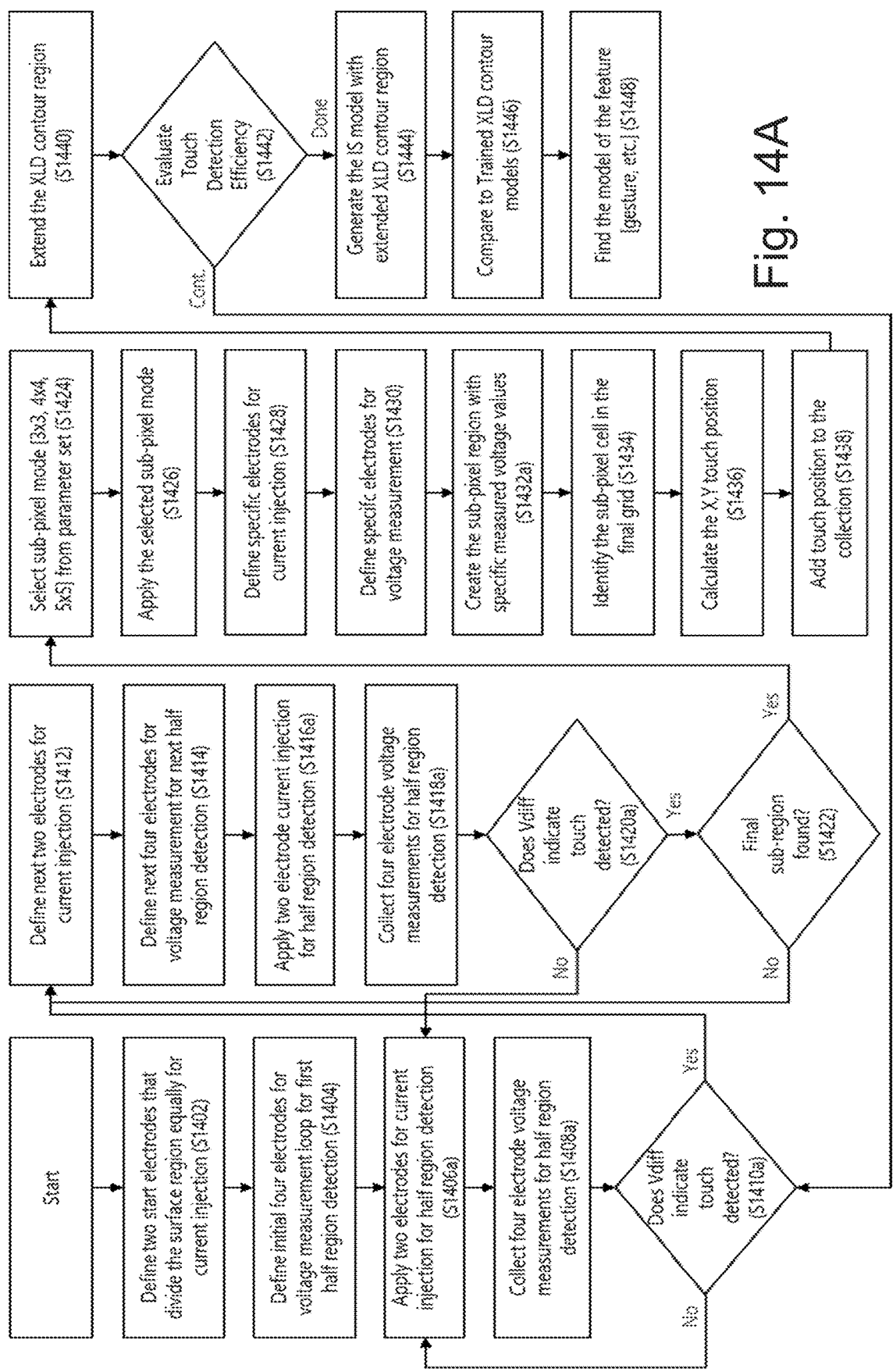
FIG. 14A is a flowchart showing more detail regarding a unidirectional processing loop applied using the FIG. 11 example approach, in accordance with certain example embodiments.
Figure 14B:
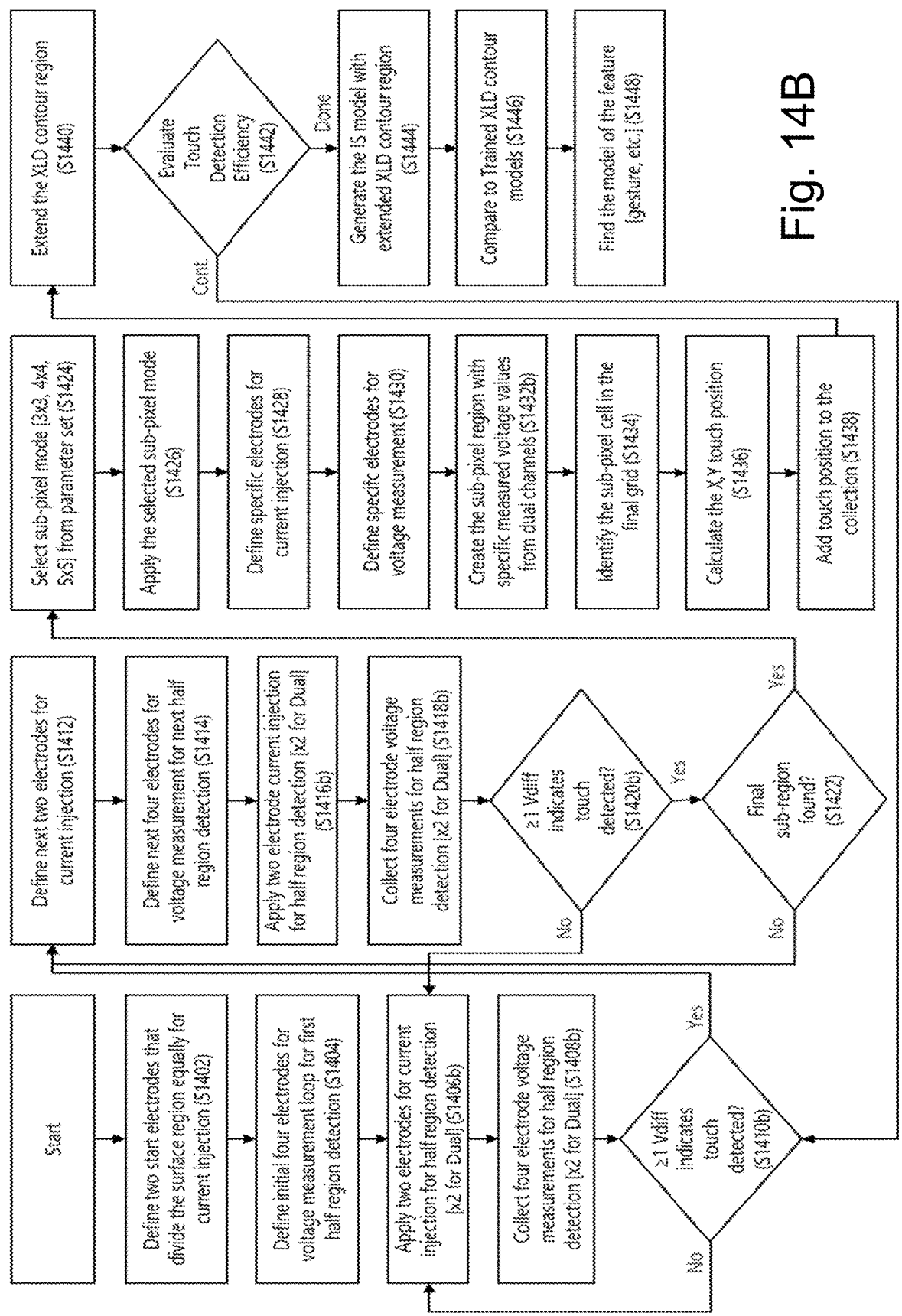
FIG. 14B is a flowchart showing more detail regarding a bidirectional processing loop applied using the FIG. 11 example approach, in accordance with certain example embodiments.

FIGS. 14A-14B are flowcharts showing the end-to-end process in more detail. That is, FIGS. 14A-14B are flowcharts showing more detail regarding unidirectional and bidirectional processing loops applied using the FIG. 11 example approach, in accordance with certain example embodiments. The processes start by defining two start electrodes that divide the surface region equally for current injection (step S1402). An initial four electrodes are defined for a voltage measurement loop for the first half-region detection (step S1404). Two electrodes are applied for current injection for half-region detection. This is done once for the unidirectional loop (step S1406a) and twice for the bidirectional loop (step S1406b). The electrode voltage measurements are collected (step S1408a and S1408b). As indicated in FIG. 14A, if the voltage differential is not indicative of a touch detection as determined in step S1410a, then the process returns to step S1406a. Similarly, as indicated in FIG. 14B, if one or more voltage differentials is/are not indicative of a touch detection as determined in step S1410b, then the process returns to step S1406b.

However, if this is not the case, then the next two electrodes for current injection are defined in step S1412. The next four electrodes for voltage measurement for the next half-region detection are defined in step S1414. Current injection is applied for two electrodes the next half-region detection (steps S1416a and S1416b). The four electrode voltage measurements are collected (steps 1418a and S1418b). As indicated in FIG. 14A, if the voltage differential is not indicative of a touch detection as determined in step S1420a, then the process returns to step S1406a. Similarly, as indicated in FIG. 14B, if one or more voltage differentials is/are not indicative of a touch detection as determined in step S1420b, then the process returns to step S1406b.

A determination is made in step S1422 as to whether a final sub-region has been found. If it has not, then the processes return to step S1412. If so, then a sub-pixel mode is selected in step S1424. The sub-pixel mode pertains to the predetermined layout applied to the final sub-region, which is applied in step S1426. The specific electrodes for current injection are defined in step S1428, and the specific electrodes for voltage measurement are defined in step S1430. The electrical field sub-pixel region is created using the voltages measured in step S1432 (see steps 1432a and S1432b). The sub-pixel in the final grid is identified in step S1434. The touch position (e.g., in X-Y coordinates) is calculated in step S1436. It will be appreciated that the cell in the final grid is related to the X-Y position of the interaction. The X-Y position may be calculated based on the surface conductivity, known cell sizes, etc. The electrode pairs may be thought as being used "as normal" for some EIT-related technologies, e.g., in the sense that the electrical field in the final sub-pixel region is being recreated and analyzed to determine the X-Y position of the interaction.

If gesture recognition is enabled, then the touch position is added to a collection of touch positions in step S1438. The XLD contour region is extended in step S1440. In step S1442, the efficiency of the touch point detection is evaluated to determine whether more touch detection points should be collected (in which case the process returns to step S1410a in the case of FIG. 14A or step S1410b in the case of FIG. 14B), or not (in which case the process continues to step S1444). In this regard, step S1422 helps both in error checking (e.g., a touch detection cannot be resolved because the voltage difference is below a threshold) and in handling pauses or "gaps" in input. A pause in input may occur when a person holds a finger steady at one position for a time, and a gap may occur when a person does not provide input for a short period of time (e.g., because the person temporarily moved a finger off of the substrate while making a complicated shape, etc.) but then "continues" providing touch input after this short time period. For error checking, the system may check for null values in the X-Y position determination and return to step S1422 accordingly. For pause and gap considerations, the system may consider timestamps associated with inputs. This enables additional touch locations to be gathered, which can be used in gesture recognition. If there are no new touch locations streaming in, then an IS model is generated with the extended XLD contour region in step S1444. Comparisons are performed with trained XLD contour models in step S1446. The gesture or other interaction type is determined based on this information in step S1448.

The approach described above may be used for single touch, multi-touch, and/or hover-related operations. The ML-related techniques described above may be applied to data gathered using this technique so as to enable gesture-related functionality, as well.

Similar to the four-loop algorithmic approach described above, in certain example embodiments, the current may be supplied unidirectionally or bidirectionally between the first and second electrodes/current injection electrodes.

Figure 15:
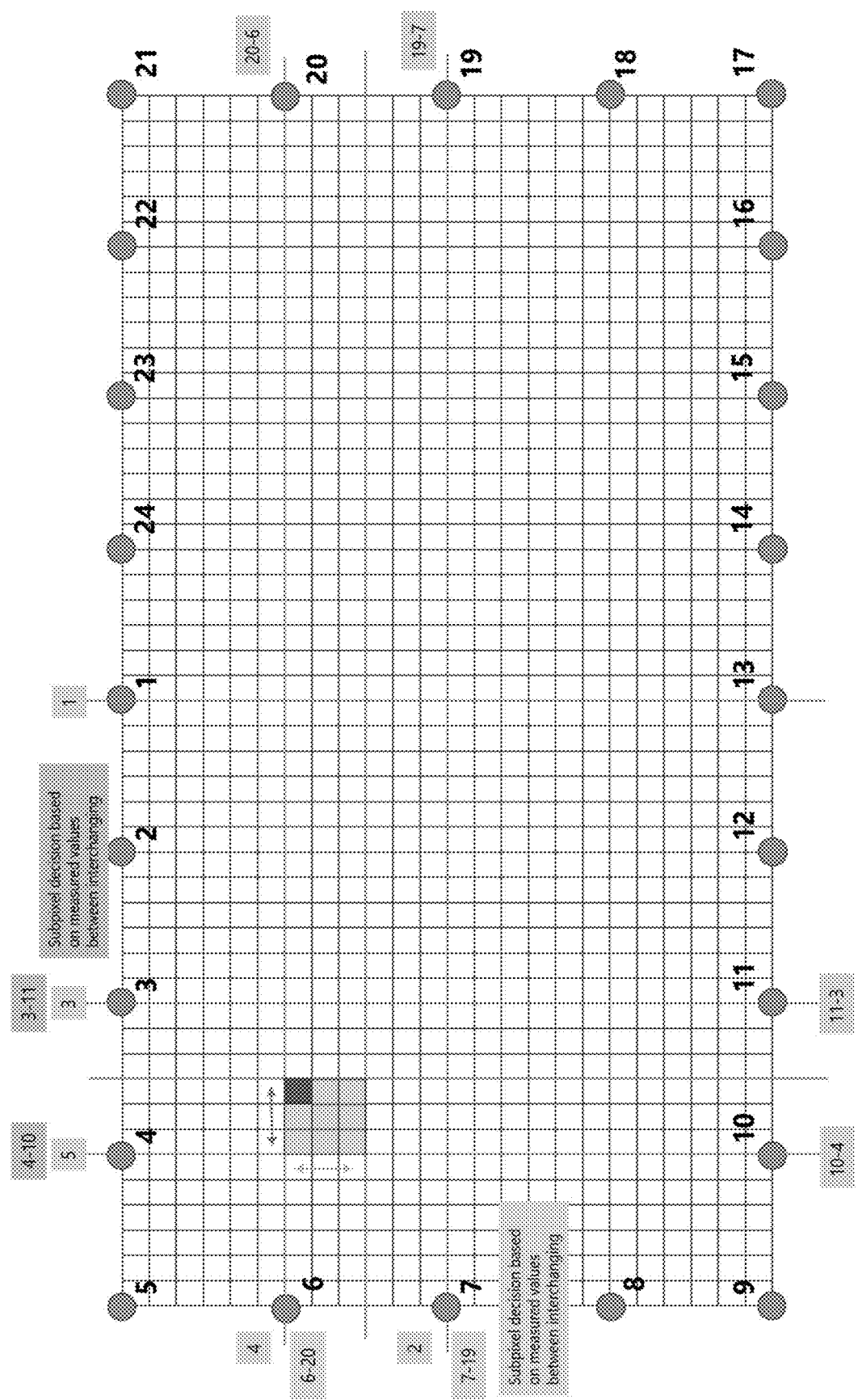
FIG. 15 is a representation similar to FIG. 13, except that additional electrodes have been applied for increased accuracy, in accordance with certain example embodiments.

FIG. 15 is a representation similar to FIG. 13, except that additional electrodes have been applied for increased accuracy, in accordance with certain example embodiments. Specifically, 24 electrodes are used with the divider loop in the FIG. 15 example. The increased number of electrodes increase the resolution more than existing methods (e.g., measurement points with a classical 4-pole approach is 24*21=504, whereas the number of measurement points with the divider loop is 1,152 when 3×3 sub-pixeling is used). FIG. 15 also demonstrates that sub-pixeling may be performed in several stages, e.g., when a "final" sub-region is still large. In this regard, as discussed above, a final region may be divided into 3×3, 4×4, or 5×5 cells for example. However, when the region is large and/or there is a desire for higher resolution, it may not be feasible to move to larger sizes (such as, for example, 6×6, which would be the size of the final sub-region shown in FIG. 15). As a result, certain example embodiments may further divide the sub-region defined between adjacent electrodes into smaller areas before applying a mask. In the FIG. 15 example, the region defined by the 3-11, 4-10, 6-20, and 7-19 electrode pairs is further divided into four areas to which a 3×3 mask may be applied. That is, this example may be thought of as potentially including two 3×3 grids by two 3×3 grids, for a total of four sub-pixel areas within the "final" sub-region. It will be appreciated that the number of sub-pixel areas in the "final" sub-region may be preset in certain example embodiments (e.g., based on the size of the substrate, position of the electrodes, desired resolution, mask characteristics, and/or the like). Thus, having four areas within the "final" sub-region is just an example, and different example embodiments may include more or fewer areas.

To determine which of these four areas the mask is to be applied, the divider loop algorithmic approach may be used again using a subset of the electrodes relevant to the determined area. Doing so may indicate that the upper-right area is the area in which the mask should be applied. Then, the process may proceed as described above. In the FIG. 15 example, the "final" sub-region is divided into four areas, with vertical and horizontal divisions in the center thereof. To determine whether the mask is to be applied to one of the two upper quadrants or one of the two lower quadrants, drop values are compared for the 6-20 and 7-19 electrode pairs. Similarly, to determine whether the mask is to be applied to one of the two left quadrants or one of the two right quadrants, drop values are compared for the 3-11 and 4-10 electrode pairs. In certain example embodiments, the drop value measurements may be taken at the electrodes closer to the "final" sub-region and current may be injected at the electrodes farther from the "final" sub-region. In the FIG. 15 example, this would involve measuring voltage drop values at electrodes 6 and 7 based on current injection from electrodes 20 and 19 in order to determine whether the mask is to be applied to an upper or lower quadrant, and measuring voltage drop values at electrodes 3 and 4 based on current injection from electrodes 11 and 10 in order to determine whether the mask is to be applied to a left or right quadrant. In certain example embodiments, measurements may be taken in one direction to determine an area within the "final" sub-region, and measurements may be taken in the other direction to determine the cell within the grid applied to that area. In certain example embodiments, measurements may be taken in both directions (e.g., based on injections at electrodes 6 and 7 and measurements at electrodes 20 and 19, and injections at electrodes 20 and 19 and measurements at electrodes 6 and 7, for the horizontal division, etc.). This "interchanging" referenced in FIG. 15 may be helpful, for example, as a "double-check" of drop values to improve accuracy in the detection, which may be especially valuable for large interfaces. Cell identification may be performed in the manner discussed herein, e.g., once an area within the "final" sub-region is identified. Although certain example embodiments refer to "applying" a grid to an area of the "final" sub-region, it will be appreciated that this description more broadly refers to the approach of further identifying which area(s) is/are to be inspected. Thus, the grid may be "applied" to each area, but the approach more generally selects one or more of the areas and then identifies a cell in which a touch likely occurred based on that identification.

Example Discrete Loop Algorithm

A third example algorithmic approach may be thought of as a discrete loop algorithm. As above, the discrete loop algorithm may be single or dual directional.

Figure 16:
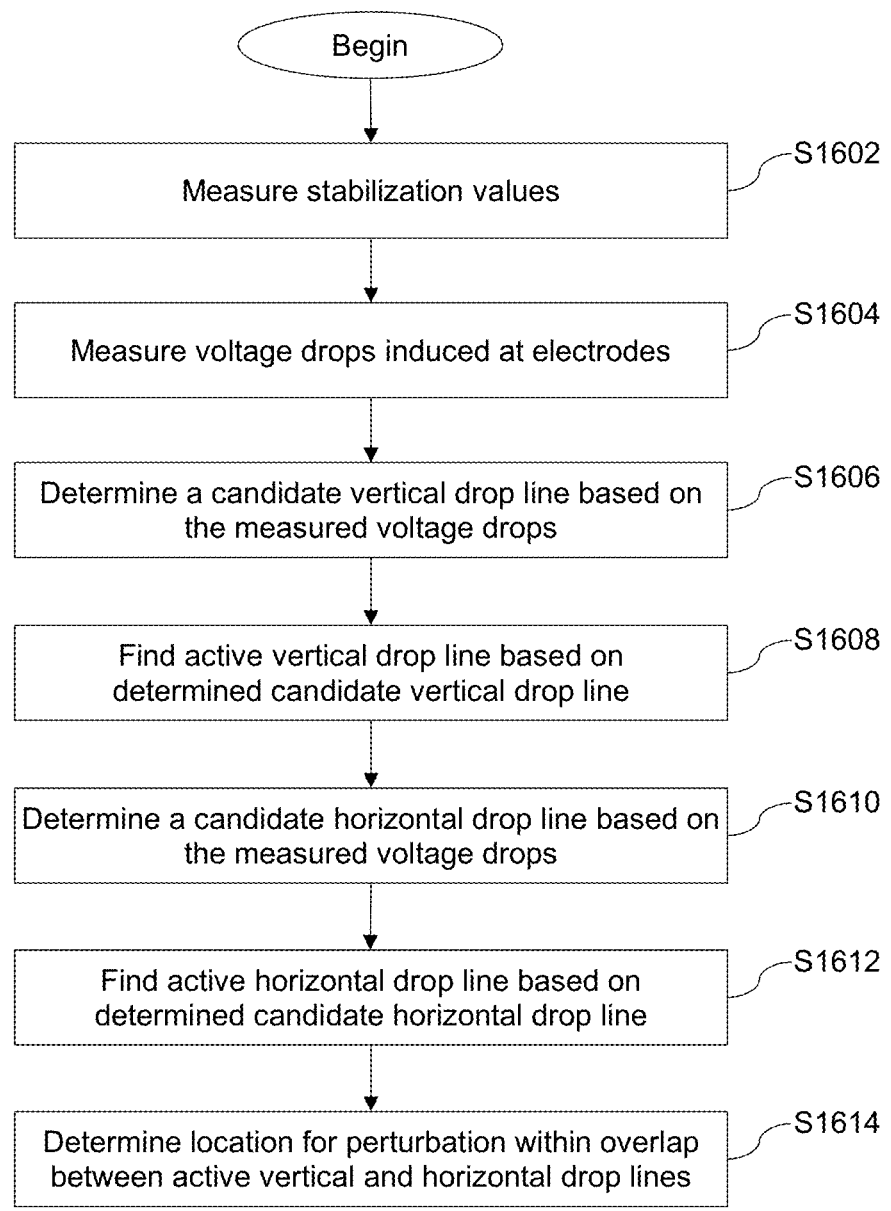
FIG. 16 is a flowchart showing a third algorithmic approach (the "discreet loop" algorithm) for identifying an interaction (such as a touch-related interaction) in connection with an interface, in accordance with certain example embodiments.
Figure 17:
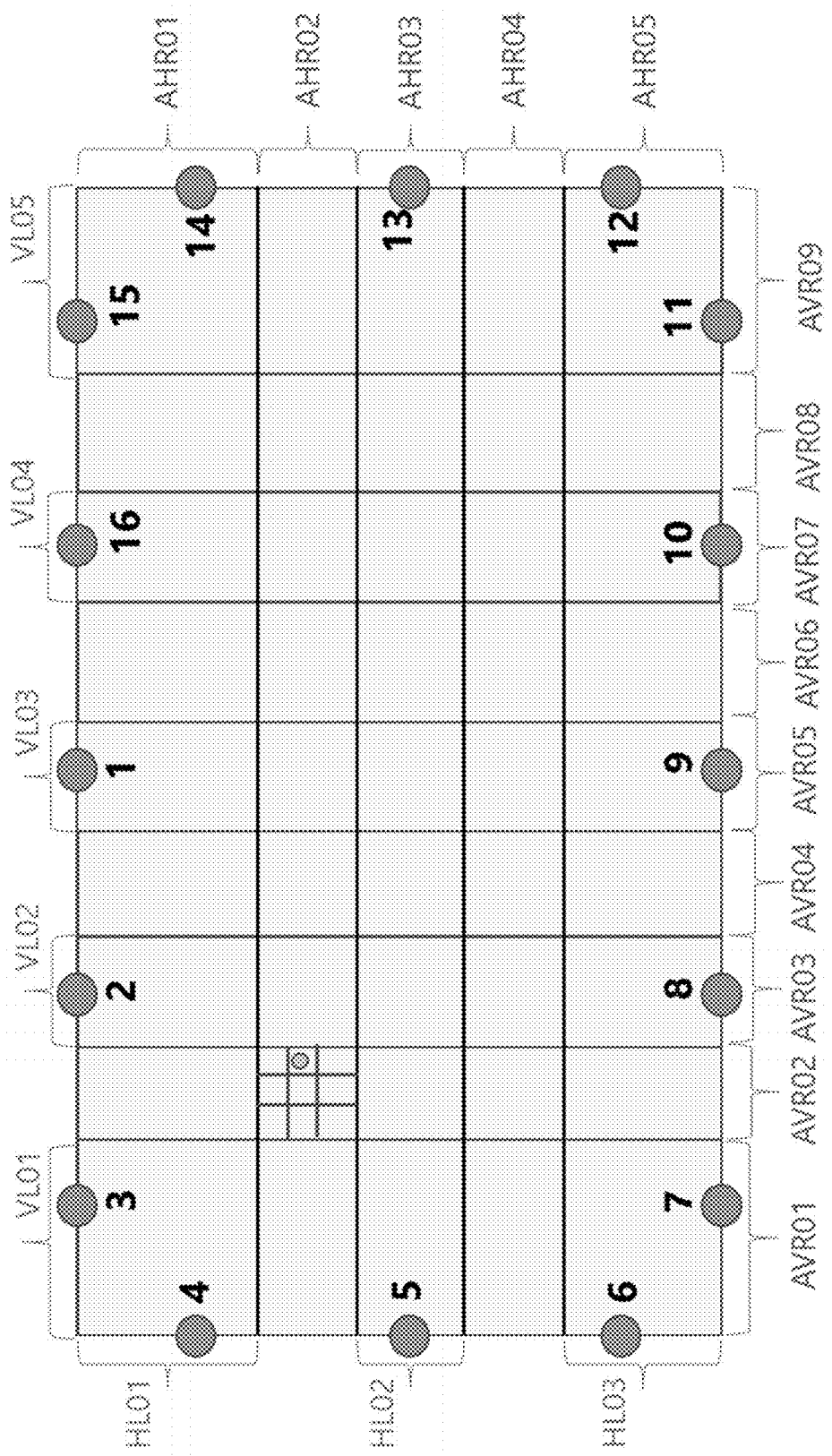
FIG. 17 is a representation of how the FIG. 16 flowchart may operate in a first phase, in accordance with certain example embodiments.

FIG. 16 is a flowchart showing a third algorithmic approach for identifying an interaction (such as a touch-related interaction) in connection with an interface, in accordance with certain example embodiments; and FIG. 17 is a representation of how the FIG. 16 flowchart may operate in a first phase, in accordance with certain example embodiments. Similar to the four-loop algorithmic approach described in detail above, the FIG. 16 approach helps characterize an operation performed in connection with a touch-sensitive interface shown as schematically in FIG. 17. The electrodes may be continuously active during the FIG. 16 process, in certain example embodiments.

Also similar to the above, in FIG. 17, the interface comprises a substrate supporting a conductive coating and a plurality of electrodes applied around edges of the substrate. Here, however, as shown in FIG. 17, opposing pairs of the electrodes form a plurality of spaced apart horizontal regions and a plurality of spaced apart vertical regions. In certain example embodiments, the pairs of electrodes forming the horizontal regions may be substantially vertically centered in the respective horizontal regions, and/or the pairs of electrodes forming the vertical regions may be substantially horizontally centered in the respective vertical regions.

In step S1602, stabilization values are measured or calculated for each of the horizontal regions and for each of the vertical regions. These stabilization or baseline voltages are values that may be measured in the absence of operations provided to the touch-sensitive interface. That is, stabilization or baseline voltages may be measured when the substrate is not touched. The stabilization values may be averages taken over a predefined time period (e.g., voltages measured over 5 seconds, 10 seconds, or the like). This may help ensure that any built-up charge is dissipated, temporary EMI or other effects are accounted for, etc. In certain example embodiments, the stabilization values may be preset prior to installation, measured once upon installation, measured upon each system start or restart, etc. In certain example embodiments the stabilization values may be retrieved from a last time that measurements were taken. The stabilization values may be associated with different electrodes, and the stabilization values may in some instances vary from electrode-to-electrode. For example, variation is possible based on size of the substrate, electrode placement (relative to each other and/or the coating), damage to the substrate and/or coating, differences in the coating caused by variations therein, etc. The stabilization values may be thought of as providing a sort of background correction and reduce noise reduction (relevant to SNR optimization) in certain example embodiments.

In step S1604, voltage drops induced at each of the electrodes are measured. In certain example embodiments, the measuring of the voltage drops may include subtraction of the stabilization values for the respective vertical and horizontal regions. Thus, the definition of the active vertical and horizontal regions discussed in greater detail below may take into account baseline voltages set for the respective vertical and horizontal regions.

A determination is then made in step S1606 as to which vertical region is associated with the largest measured voltage drop in a vertical direction. This "candidate vertical drop line" is then checked to determine whether it is actually the active vertical region, whether the active vertical region is adjacent thereto, or whether it is likely that there is no actual perturbation to the interface.

Thus, in step S1608, the active vertical drop line is found based on the determined candidate vertical drop line. In greater detail, the determined vertical region is defined as an active vertical region, provided that a difference(s) in voltage drops between the determined vertical region and the vertical region(s) adjacent thereto is/are within a first threshold. Otherwise, when there are two vertical regions adjacent to the determined vertical region (meaning that the candidate vertical drop line is not at a leftmost or rightmost edge), one of the two areas between the determined vertical region and the vertical regions adjacent thereto is defined as the active vertical region. In this case, the one of these two areas between the determined vertical region and the vertical regions adjacent thereto is defined as the active vertical region based on which of these differences in second voltage drops is outside of the first threshold. Specifically, there will be "movement" in the direction of the area having the larger voltage drop. On the other hand, when there is only one vertical region adjacent to the determined vertical region (meaning that the candidate vertical drop line is in fact at a leftmost or rightmost edge), the area between the determined vertical region and one vertical region adjacent thereto is defined as the active vertical region.

A check may be made to determine whether a vertical drop line is found. If no drop line has been found, the process may return to step S1604. In this manner, the system simply waits for another possible perturbation event.

If it is determined that a likely touch event took place, basically the same operations may be performed in the horizontal direction. That is, in step S1610, a candidate horizontal drop line is determined based on the measured voltage drops. In this regard, a determination is made as to which horizontal region is associated with the largest measured voltage drop in a horizontal direction.

In step S1612, the active horizontal drop line is found based on the determined candidate horizontal drop line. Similar to the above, the determined horizontal region is defined as an active horizontal region, provided that a difference(s) in voltage drops between the determined horizontal region and the horizontal region(s) adjacent thereto is/are within a second threshold. Otherwise, when there are two horizontal regions adjacent to the determined horizontal region (meaning that the candidate horizontal drop line is not at the uppermost or lower-most horizontal line), one of the two areas between the determined horizontal region and the horizontal regions adjacent thereto is defined as the active horizontal region. In this case, the one of the two areas between the determined horizontal region and the horizontal regions adjacent thereto is defined as the active horizontal region based on which of these differences in first voltage drops is outside of the second threshold. On the other hand, when there is only one horizontal region adjacent (meaning that the candidate horizontal drop line is in fact at the uppermost or lower-most horizontal line) to the determined horizontal region, the area between the determined horizontal region and one horizontal region adjacent thereto as the active horizontal region.

The FIG. 16 flowchart shows the active vertical region being determined prior to the active horizontal region. However, in different example embodiments, this order may be reversed. Also, although "horizontal" and "vertical" are used here and elsewhere, it is to be understood that both here and elsewhere perfectly arranged tables in precise rectangular rows and columns need not be used. That is, terms like "horizontal", "vertical", "table", "grid", "cell", and the like are to be understood to enable any suitable arrangement, including rectangular tables with rectangular cells, arrangements with a tessellation of honeycomb-like or other cells, etc.

It is noted that the first and second thresholds in the FIG. 16 example approach may be the same or different from one another. These threshold parameter may be calculated based on extracted static values during steady-state reference measurements when the stabilization values are measured. They may be determined or at least influenced in part by substrate size, conductivity, total number of electrodes, placement of electrodes (such as distance between), etc. In certain example embodiments, the thresholds may be calculated based on touch and non-touch events. That is, the non-touch measurements may provide stabilization values as detailed above. Touches will produce voltage, and the differences may provide threshold.

In step S1614, a location for a perturbation to the interface is defined from within an area of overlap between the defined active horizontal region and the active vertical region. As with step S1118 above, this may be practiced using an image processing technique such as, for example, a center of gravity, momentum, min-triangle calculation, or the like. Additionally, the approach outlined in FIG. 12 may be used in certain example embodiments.

As mentioned, this discrete loop approach may be implemented in a unidirectional or bidirectional manner With respect to the former, current may be applied to the electrodes in a unidirectional loop around the substrate, e.g., where the loop includes a first phase in which current is applied to the electrodes forming the vertical regions and a second phase in which current is applied to the electrodes forming the horizontal regions. With respect to the latter, current may be applied to the electrodes bidirectionally around the substrate in a first loop and in a second loop that is the inverse of the first loop, e.g., where each of the first and second loops includes a first phase in which current is applied to the electrodes forming the vertical regions and a second phase in which current is applied to the electrodes forming the horizontal regions.

The following pseudo-code may be used to implement the discrete loop approach in connection:

Measure StabilizationValues (10 seconds no touch)
   (dV01 = V01, dV02 = V02, ..., dV10 = V10)

-continued

```
Measure DropValues
    (M1=|V01-dV01|, M2=|V02-dV02|, ..., M10=|V10-dV10|)
Find ActiveDropLine
    AL01=Min(M1,M2), AL02=Min(M3,M4), ...,
    AL05=Min(M9,M10))
Find ActiveVerticalRegion AVR by comparing ALs with
    AL_Thr
    If ActiveLine AL < NeigboorLine AL (1 or 2) - AL_Thr
        then ActiveLine AL is ActiveVerticalRegion (AVR)
    else NeigboorLine AL (1 or 2) is ActiveVerticalRegion
        (AVR)
End process if no AVR is determined
Find ActiveHorizontalRegion AHR by comparing ALs with
    AL_Thr
    If ActiveLine AL < NeigboorLine AL (1 or 2) - AL_Thr
        then ActiveLine AL is ActiveHorizontalRegion (AHR)
    else NeigboorLine AL (1 or 2) is ActiveHorizontalRegion
        (AHR)
```

In this example, 10 stabilization and drop values are taken because there are five vertical lines and five horizontal lines. As will be appreciated from the description above, these horizontal and vertical regions may be predefined on each side of each opposing electrode pair.

Using the FIG. 17 example, it may be determined that the active drop line is VL02, e.g., if the voltage measurement for VL02 is less than the voltage measurement for VL01 (with consideration being given to the respective stabilization values). In this case, a determination is made as to whether the touch event took place in VL02, in one of the areas adjacent VL02 (between VL02 and VL01 or between VL02 and VL03), or likely not at all. Because the difference in voltage drops between VL02 and the neighboring vertical regions VL02 and VL01 is not within the threshold, the active vertical region AVR is not VL02 itself. Thus, a determination is made that the active vertical region AVR is in one of the regions between VL02 and VL01 or between VL02 and VL03. Because the voltage drop is greater to the left of VL02, the area between VL01 and VL02 (namely, AVR02) is determined to be the active vertical region. For instance, assume that there is a 20 mA threshold. If the active line is 100 mA, the line to the right is 90 mA, and the line to the left is 160 mA, then the touch location is to the left of the active line and in the in-between area.

These operations in essence repeat for the horizontal rows. In this regard, it may be determined that the active drop line is HL02, e.g., if the voltage measurement for HL02 is less than the voltage measurement for HL01 (with consideration being given to the respective stabilization values). In this case, a determination is made as to whether the touch event took place in HL02, in one of the areas adjacent HL02 (between HL02 and HL01 or between HL02 and HL03), or likely not at all. Because the difference in voltage drops between HL02 and the neighboring horizontal regions HL02 and HL01 is not within the threshold, the active horizontal region AVR is not HL02 itself. Thus, a determination is made that the active horizontal region AHR is in one of the regions between HL02 and HL01 or between HL02 and HL03. Because the voltage drop is greater above HL02, the area between HL01 and HL02 (namely, AHR02) is determined to be the active horizontal region.

The touch position is known to be in the intersection of AVR02 and AHR02. Thus, the grid can be applied to this sub-region of the interface, and processing can proceed as above.

Suppose instead that the active drop line is VL01, e.g., if the voltage measurement for VL01 is less than the voltage measurement for VL02 (again, with consideration being given to the respective stabilization values). In this case, a determination is made as to whether the touch event took place in VL01, in the one area adjacent VL01 (between VL01 and VL02), or likely not at all. Because the difference in voltage drop between VL01 and the neighboring vertical regions VL02 is not within the threshold, the active vertical region AVR is not VL01 itself. Thus, a determination is made that the active vertical region AVR is in the region between VL01 and VL02. As VL01 is at the left-most edge of the interface, the error checking may be simplified. Thus, the area between VL01 and VL02 (namely, AVR02) is determined to be the active vertical region. Similar description will apply if the active drop line is HL01 rather than HL02. Again, the grid or other approach may be applied in order to further define the position of the touch-related interaction.

Example Equilibrium Path Algorithm

A fourth approach for detecting an interaction (e.g., touch, hover, gesture, or other interaction) with a manufactured article will now be described in connection with FIGS. 28-40. As above, this algorithm may be single or dual directional. More particularly, FIGS. 28-33 schematically demonstrate how this approach operates, and FIG. 35 is a flowchart summarizing the operation of this example approach.

Figure 28:
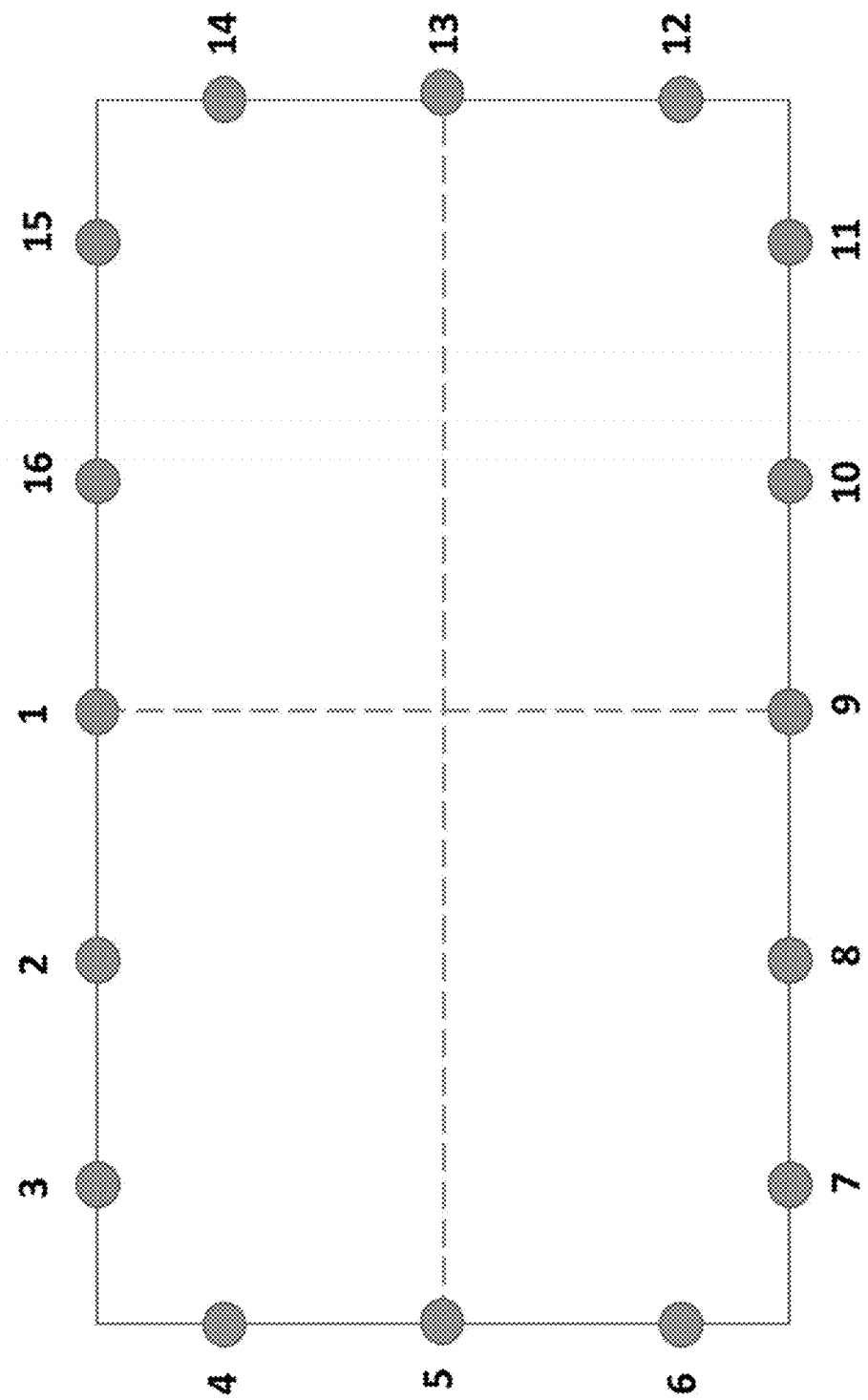
FIGS. 28-33 schematically demonstrate a fourth approach to determining details of an interaction, in accordance with certain example embodiments.

As will be appreciated, the manufactured article includes an electrically conductive region, e.g., as defined by the outer box in FIG. 28. Of course, the electrically conductive region can take different sizes, shapes, and dimension in different example embodiments. It may be provided in connection with an interface, e.g., with the electrically conductive region being all or a part of that interface. Likewise, it may be provided on a display, on a wall or floor, in a defined area of a warehouse or other location, etc., depending on the end-application. Electrodes are located in electrical contact with the electrically conductive region. In this FIG. 28 example, there are 16 electrodes provided around the periphery of the electrically conductive region (see step S3502 in FIG. 35). It will be appreciated that more or fewer electrodes may be provided in different locations relative to the electrically conductive region, e.g., provided that they nonetheless are electrically connected thereto.

Figure 35:
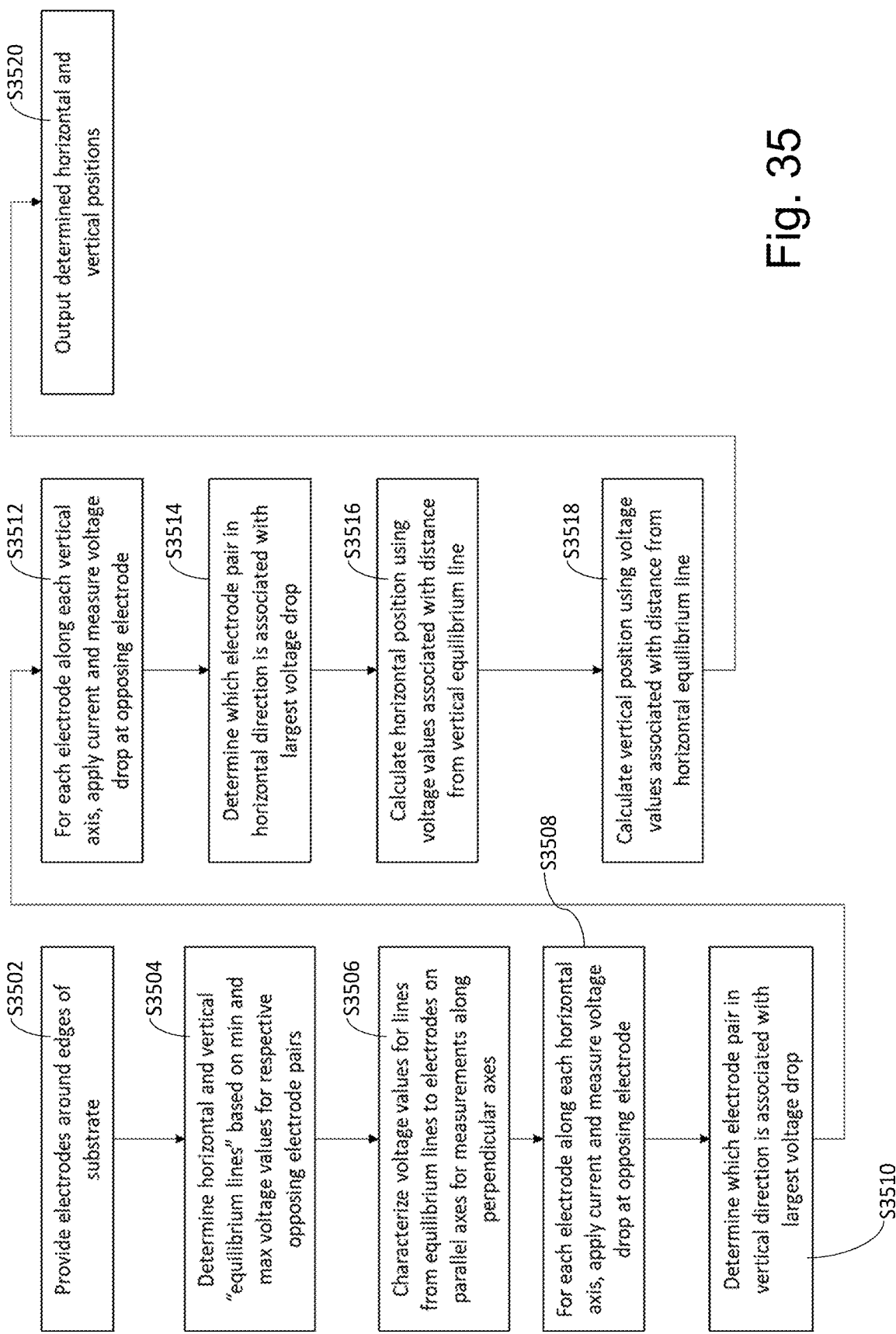
FIG. 35 is a flowchart summarizing the operation of the example approach described in connection with FIGS. 28-33.

Horizontal and vertical equilibrium paths are determined for the electrically conductive region (see step S3504 in FIG. 35). These equilibrium paths are shown as the dashed lines in FIG. 28. The equilibrium paths may be determined using opposing pairs of electrodes. For each defined opposing pair of electrodes, current is applied to a first electrode in the respective pair and a first voltage-related value is measured for the second electrode in the respective pair, and current is applied to the second electrode in the respective pair and a second voltage-related value is measured for the first electrode in the respective pair. The horizontal and vertical equilibrium paths are defined as being present where along the electrically conductive region the first and second voltage-related values are equivalent.

In certain example embodiments, the opposing pairs of electrodes used in determining the horizontal and vertical equilibrium paths may be electrode pairs that are directly opposite one another and/or at least some electrode pairs that are not directly opposite to one another. With respect to the former, in the FIG. 28 example, the 1-9, 2-8, 3-7, 4-14, 5-13, 6-12, and other electrode pairs are directly opposite to one another. With respect to the latter, the electrode pairs that are not directly opposite to one another may be used as slave lines in calculating the horizontal and vertical equilibrium paths, e.g., to increase the accuracy of the determination of where the equilibrium paths are located. In this regard, the opposing pairs of electrodes used in determining the horizontal and vertical equilibrium paths may include opposite electrode pairs including first and second electrodes that are directly opposite one another, and slave electrode pairs that are not directly opposite to one another, e.g., with the slave electrode pairs including the first electrode in a counterpart opposite electrode pair and a third electrode different from the second electrode in the respective counterpart opposite electrode pair. In this case, the third electrode in each slave electrode pair may be adjacent to the second electrode in the respective counterpart opposite electrode pair. However, it will be appreciated that "direct neighbors" are not necessary. For example, a standard slave line or a set of standard slave lines can be used.

Figure 34:
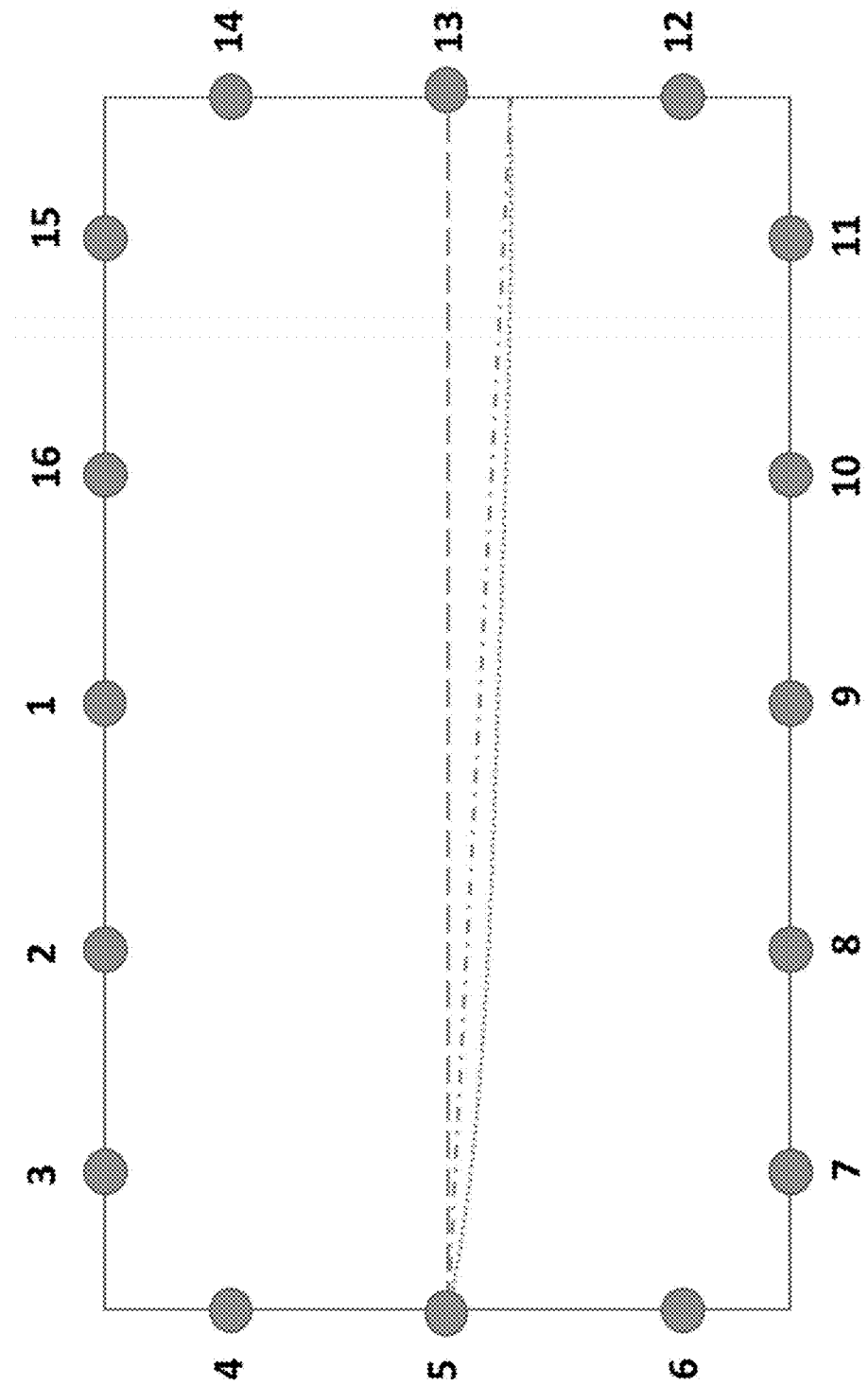
FIG. 34 schematically illustrates different example horizontal equilibrium paths that may result in different example embodiments.

Although the equilibrium paths shown in the FIG. 28 example are linear, it will be appreciated that this may not be true in actual implementations. The equilibrium paths may depend on, for example, where the electrodes are located relative to the conductive region, differences in conductivity in the conductive region caused by environmental factors (e.g., the device on or in which it is placed, operation of other equipment which may cause EMI, etc), manufacturing variances in the conductive region and/or the electrodes, etc. Thus, even when electrodes are placed equidistantly around a regular shape (which is not required of all embodiments, as should be clear from the description), the horizontal and vertical equilibrium paths may be non-linear and/or may not be in the exact horizontal and vertical centers of the electrically conductive region. Instead, they may be in some instances be representable as splines, curves, or other shapes. FIG. 34 schematically illustrates different example horizontal equilibrium paths that may result in different example embodiments. It will be appreciated that maximum voltage values will be at the source electrodes, and minimum voltage values will be at the receiver electrodes.

A characterization of voltage values is performed for areas from the equilibrium paths to electrodes on parallel axes for measurements along perpendicular axes (see step S3506 in FIG. 35). That is, (1) for the vertical equilibrium path, horizontal reference voltage values are characterized for areas between the vertical equilibrium path and electrodes disposed vertically along the electrically conductive region; and (2) for the horizontal equilibrium path, vertical reference voltage values are characterized for areas between the horizontal equilibrium path and electrodes disposed horizontally along the electrically conductive region. Referring to FIG. 28 for an even more concrete illustration, the vertical equilibrium path extends between electrodes 1 and 9, and the characterization identifies voltage drops as discrete locations between the 1-9 line and the 2-8 line, between the 1-9 line and the 3-7 line, etc. It will be appreciated that the 1-9, 2-8, and 3-7 lines are vertically oriented, but the voltage drops indicate horizontal positions across the interface. These voltage drops may be used as the reference voltages in certain example embodiments.

In certain example embodiments, the horizontal reference voltage values may be characterized such that zero values are provided proximate to the vertical equilibrium path and maximum values are provided proximate to the electrodes disposed vertically along the electrically conductive region; and the vertical reference voltage values may be characterized such that zero values are provided proximate to the horizontal equilibrium path and maximum values are provided proximate to the electrodes disposed horizontally along the electrically conductive region. In some instances, this will result in reference values being mirrored about the equilibrium paths. However, in instances where the equilibrium paths are non-linear, this relationship may not hold. For example, the maximum values may vary line by line and even for opposing sides of a single given line. In any event, the characterizations of the horizontal and vertical reference voltage values may be practiced using interpolation, e.g., a non-zero interpolative approach that used is used to find non-matching extreme values. It will be appreciated that a non-zero order interpolation approach may be applied between different discrete measurements taken in horizontal and vertical directions for the vertical and horizontal reference voltage values, respectively.

Figure 29:
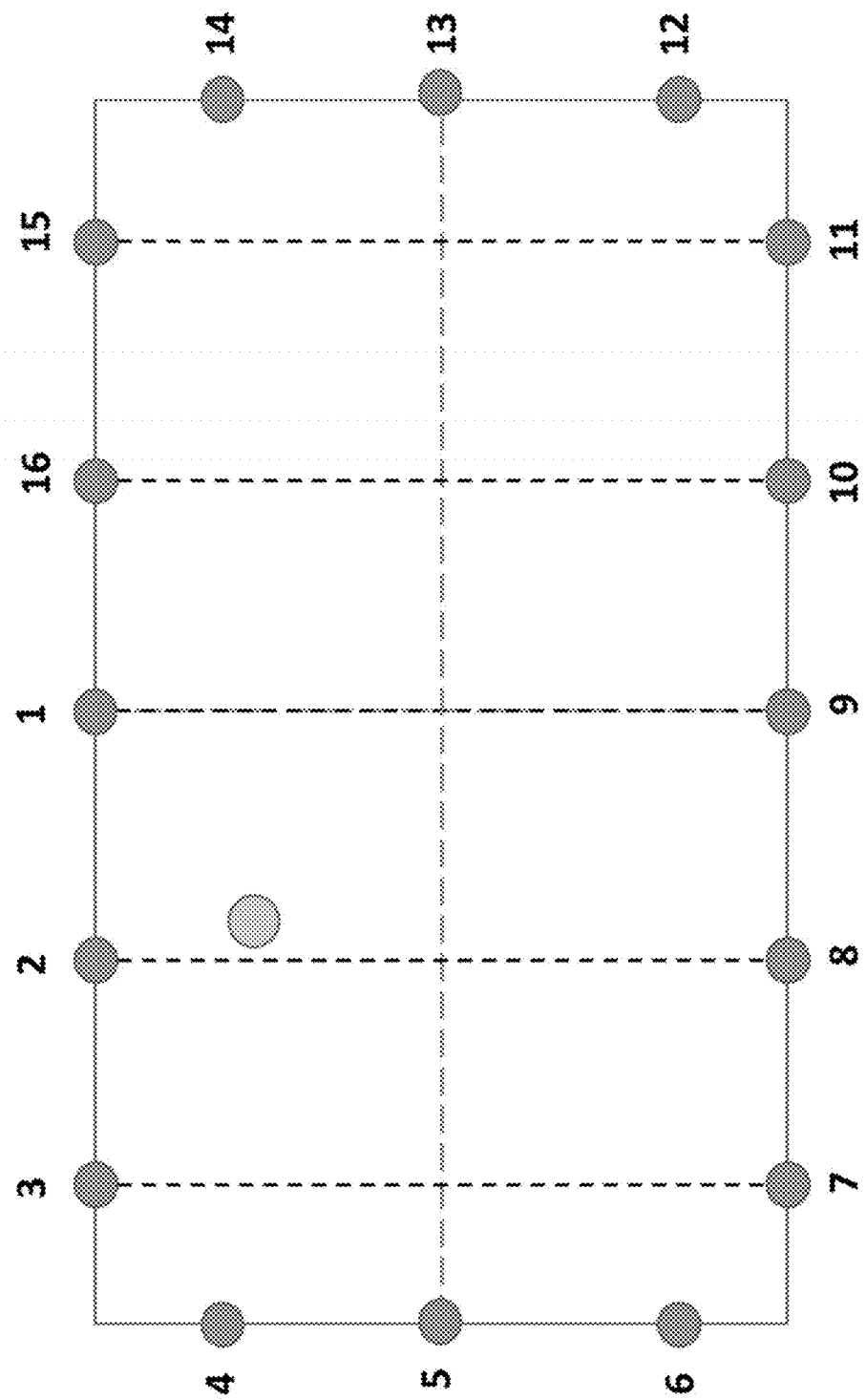
Figure 30:
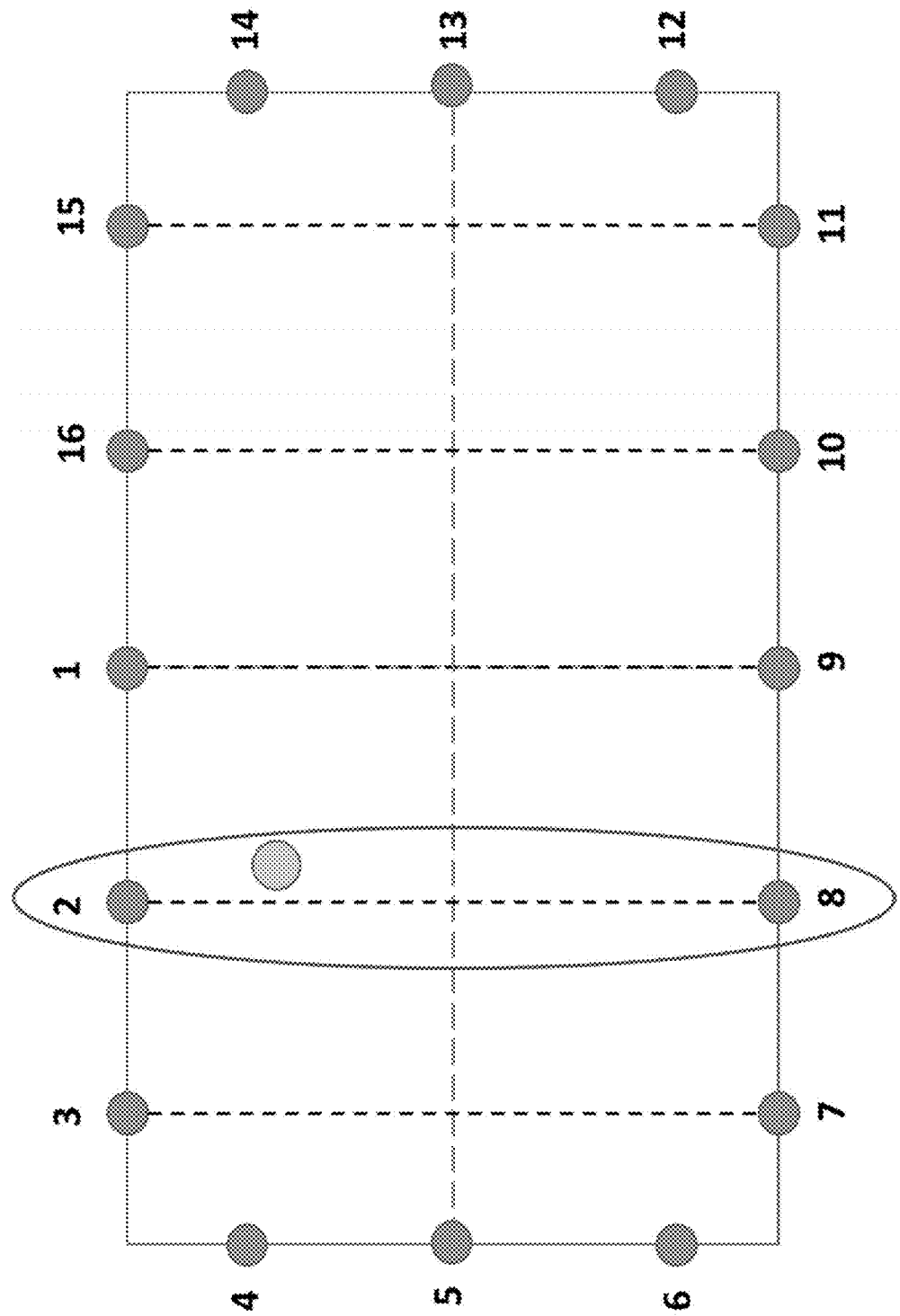

Similar to the approaches described above, the largest drop lines are found. For example, for each electrode disposed horizontally along the electrically conductive region, a current thereto is applied thereto and a voltage drop is measured at an opposing electrode so that current is applied and measured with respect to different vertically-opposed electrode pairs (see step S3508 in FIG. 35). FIG. 29 shows measurements taken along the vertical drop lines. The equilibrium paths are still shown for reference. A first electrode pair, from the different vertically-opposed electrode pairs, that is associated with the largest voltage drop in the vertical direction is determined (see step S3510 in FIG. 35). For an interaction at the blue circle area shown in FIG. 29, the 2-8 vertical line will be identified, as shown in FIG. 30.

Figure 31:
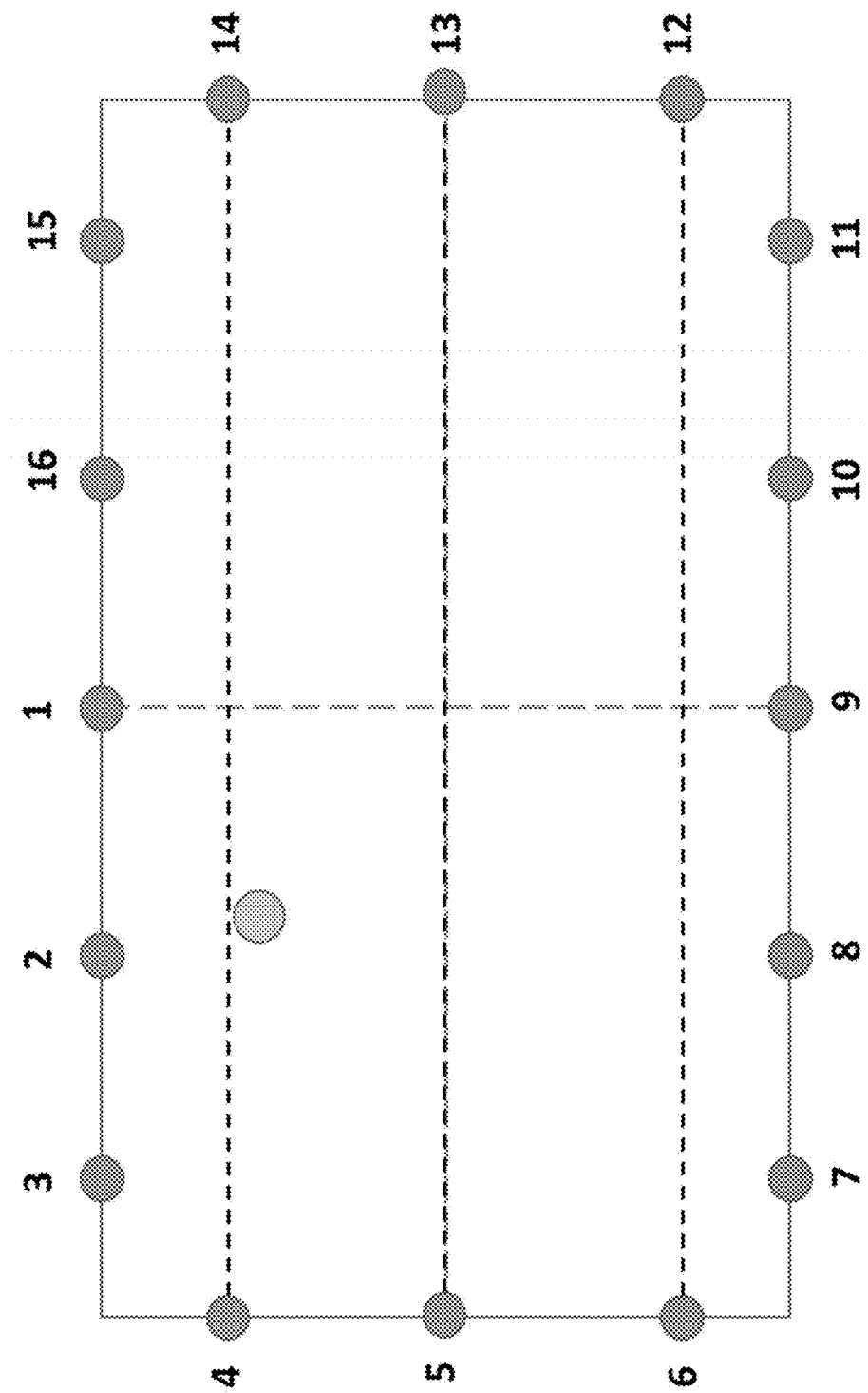

For each electrode disposed vertically along the electrically conductive region, a current is applied thereto and a voltage drop is measured at an opposing electrode so that current is applied and measured with respect to different horizontally-opposed electrode pairs (see step S3512 in FIG. 35). FIG. 31 shows measurements taken along the horizontal drop lines. The equilibrium paths are again shown for reference.

Figure 32:
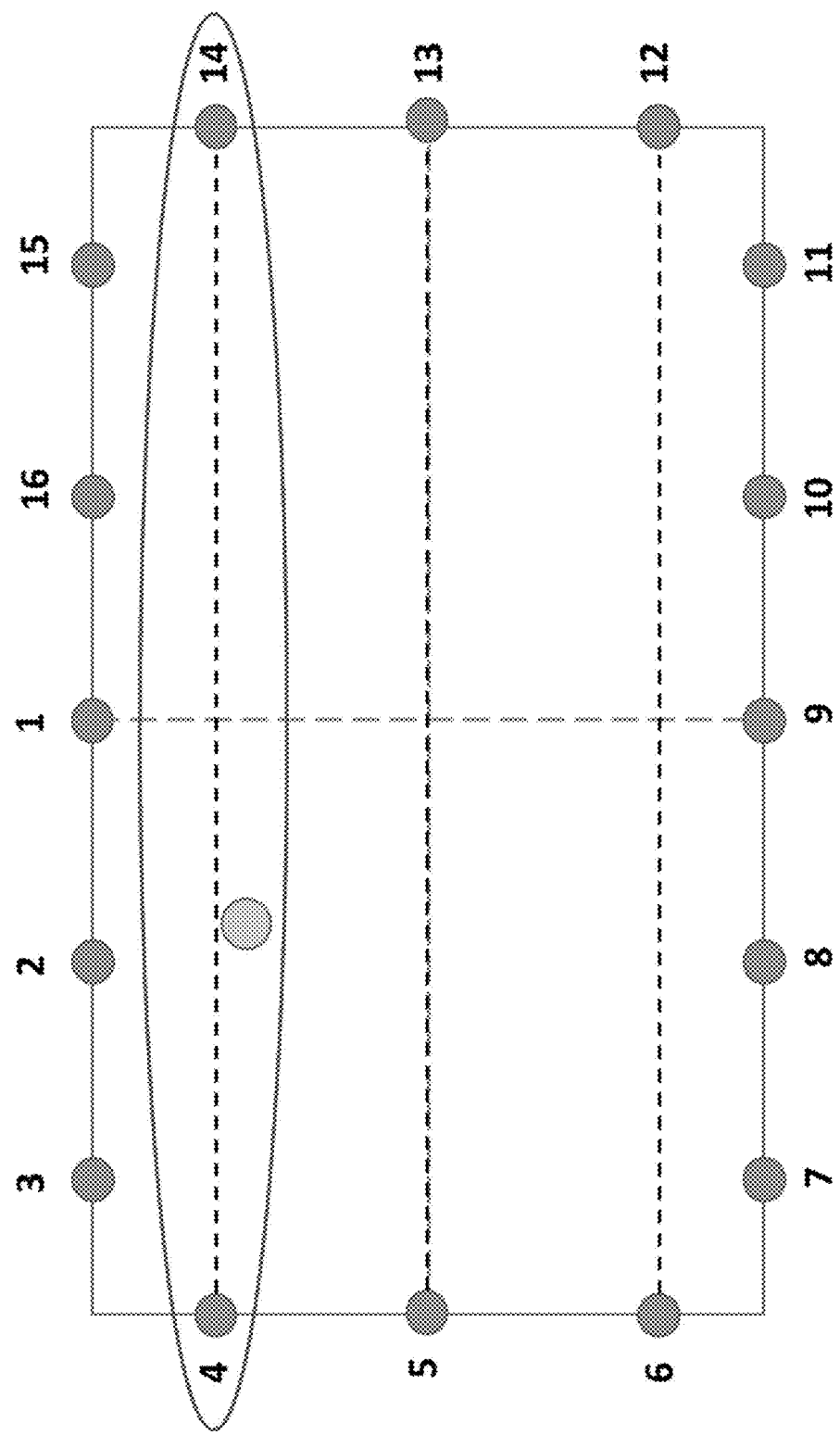

A second electrode pair, from the different horizontally-opposed electrode pairs, that is associated with the largest voltage drop in the horizontal direction is determined (see step S3514 in FIG. 35). For an interaction at the blue circle area shown in FIG. 31, the 4-14 horizontal line will be identified, as shown in FIG. 32.

It will be appreciated that the current application and voltage measurement may be performed bi-directionally for the electrode pairs. For example, current may be applied to electrode 1 and the voltage may be measured at electrode 9, and current may be applied to electrode 9 and the voltage may be measured at electrode 1. In certain example embodiments, each electrode will have a minimum of one voltage measurement that can be generated in the opposite direction (and neighbors or other electrodes can be used if a higher accuracy is desired, e.g., as described in greater detail below). Furthermore, it will be appreciated that, although electrode pairs are looked for (e.g., in step S3510 and S3514), the found electrode pairs help define the vertical and horizontal drop-line regions for additional operations where it is possible to use more than the determined electrodes in the vertical and horizontal directions.

In effect, a sub-region is defined based on at least the first electrode pair and the second electrode pair. That is, in certain example embodiments, the measurements discussed above will identify lines and a general direction for the interaction relative to the lines (e.g., to the left or right of a vertical drop line, and above or below a horizontal drop line). For instance, if the measured voltage values are below the reference values associated with the identified drop line, then the location likely more is closer to the respective equilibrium path, whereas the location is more likely farther from the respective equilibrium path if the measured voltage values are higher the reference values associated with the identified drop line. This may indicate what adjacent electrode pairs help define the sub-region. In certain example embodiments, the sub-region may, but need not, be defined using the horizontal and vertical equilibrium paths.

Figure 33:
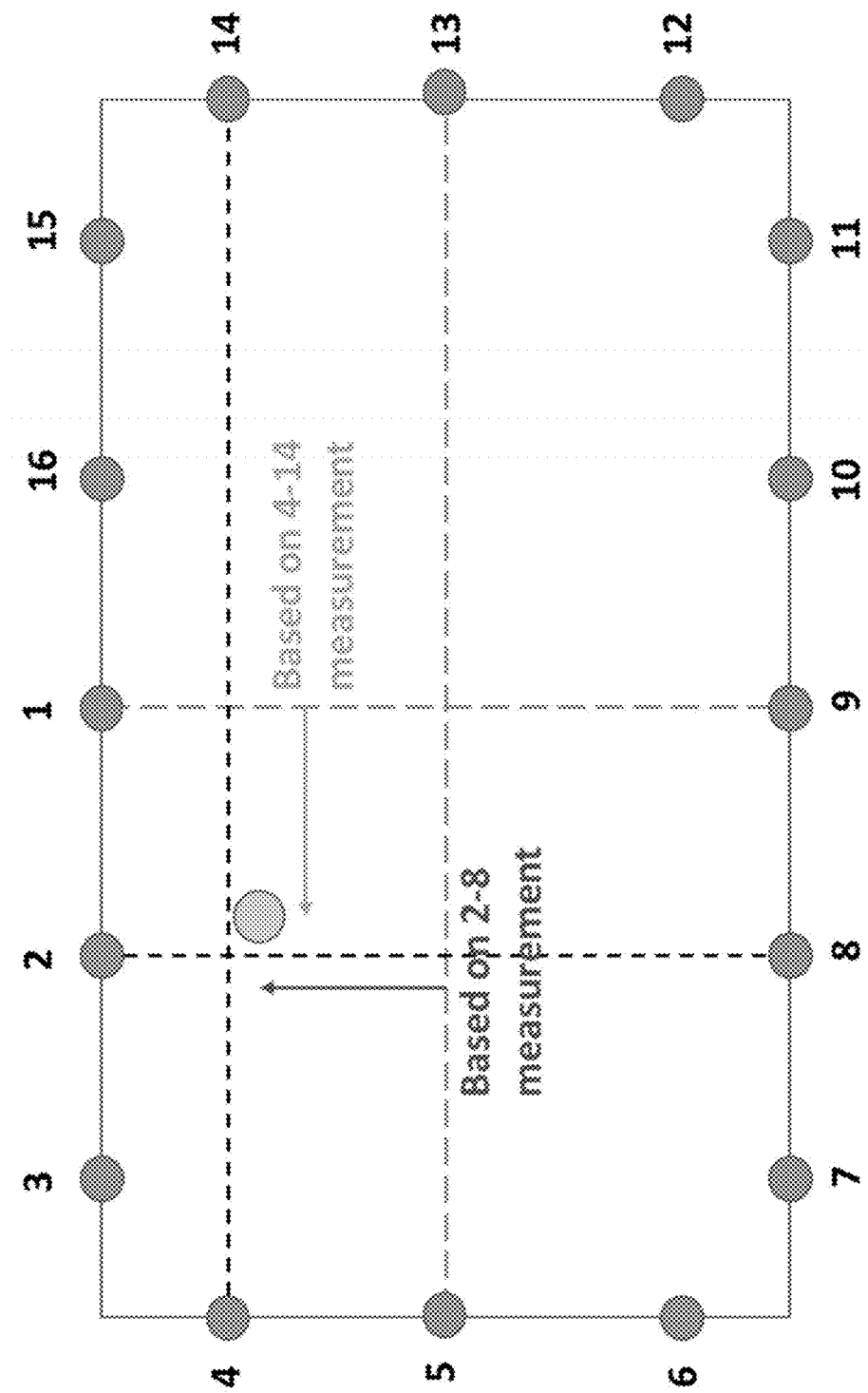

The sub-region in the FIG. 33 example is bounded by the 1-9, 2-8, 4-14, and 5-13 lines. A horizontal position of the interaction is calculated from within the defined sub-region based on a horizontal distance from the vertical equilibrium path using the characterized horizontal reference voltage values (see step S3516 in FIG. 35). This is the 4-14 based measurement shown in FIG. 33. Similarly, a vertical position of the interaction is calculated from within the defined sub-region based on a vertical distance from the horizontal equilibrium path using the characterized vertical reference voltage values (see step S3518 in FIG. 35). This is the 2-8 based measurement shown in FIG. 33. Thus, it will be appreciated that the horizontal position of the interaction is further based on the voltage drop measured using the first electrode pair; and the vertical position of the interaction is further based on the voltage drop measured using the second electrode pair.

The determined horizontal and vertical positions are output (see step S3520 in FIG. 35). These points may be used to determine details of the interaction (e.g., x, y, and/or z coordinates for the interaction, times, etc.), as well as interaction type (e.g., touch, hover, gesture, etc.). Data regarding the interaction may be collected and used for gesture determination and/or analysis, e.g., as disclosed herein. It will be appreciated that proximity-based detection may be performed as a variant of gesture and/or hover related functionality. As indicated above, here and with the other algorithmic approaches described herein, different types of interactions are detectable.

It will be appreciated that the algorithm may run continuously or in a more on-demand manner in different example embodiments. For example, the sub-process shown in and described in connection with steps S3508-S3520 may run more or less continuously, as appropriate. In certain example embodiments, this sub-process may be performed only responsive to an initial, coarser detection that a possible interaction occurred.

It will be appreciated that although FIG. 35 shows a process including device configuration and characterization through detection, expressly contemplated herein are the concepts of "actively" configuration and/or characterization with "passive" enabling of detection at a later time period, and "active" detection and assuming an earlier pre-configuration and/or pre-characterization.

As indicated above, slave lines can be used for position determination in certain example embodiments. In this regard, the horizontal position of the interaction may be further based on the voltage drop measured using a third electrode pair different from the first electrode pair, and the vertical position of the interaction may be further based on the voltage drop measured using a fourth electrode pair different from the second electrode pair.

In certain example embodiments, the third electrode pair may include one electrode in the first electrode pair and another electrode not in the first electrode pair; and the fourth electrode pair may include one electrode in the second electrode pair and another electrode not in the second electrode pair. And in certain example embodiments, the third electrode pair may include one electrode in the first electrode pair and another electrode adjacent to the other electrode in the first electrode pair, and the fourth electrode pair may include one electrode in the second electrode pair and another electrode adjacent to the other electrode in the second electrode pair. In certain example embodiments, neither of the electrodes in the first electrode pair is included in the third electrode pair, and neither of the electrodes second electrode pair is included in the fourth electrode pair. Reference voltages may be pre-characterized for the set of possible third and fourth electrode pairs, e.g., as indicated above. In sum, it will be appreciated that one or more slave lines may be used to improve accuracy, and the slave lines may, but need not, involve adjacent electrodes and/or adjacent slave lines. For example, a dedicated slave line may be used, all possible slave lines may be used, all or some slave lines in a parallel direction may be used, etc.

Figure 36:
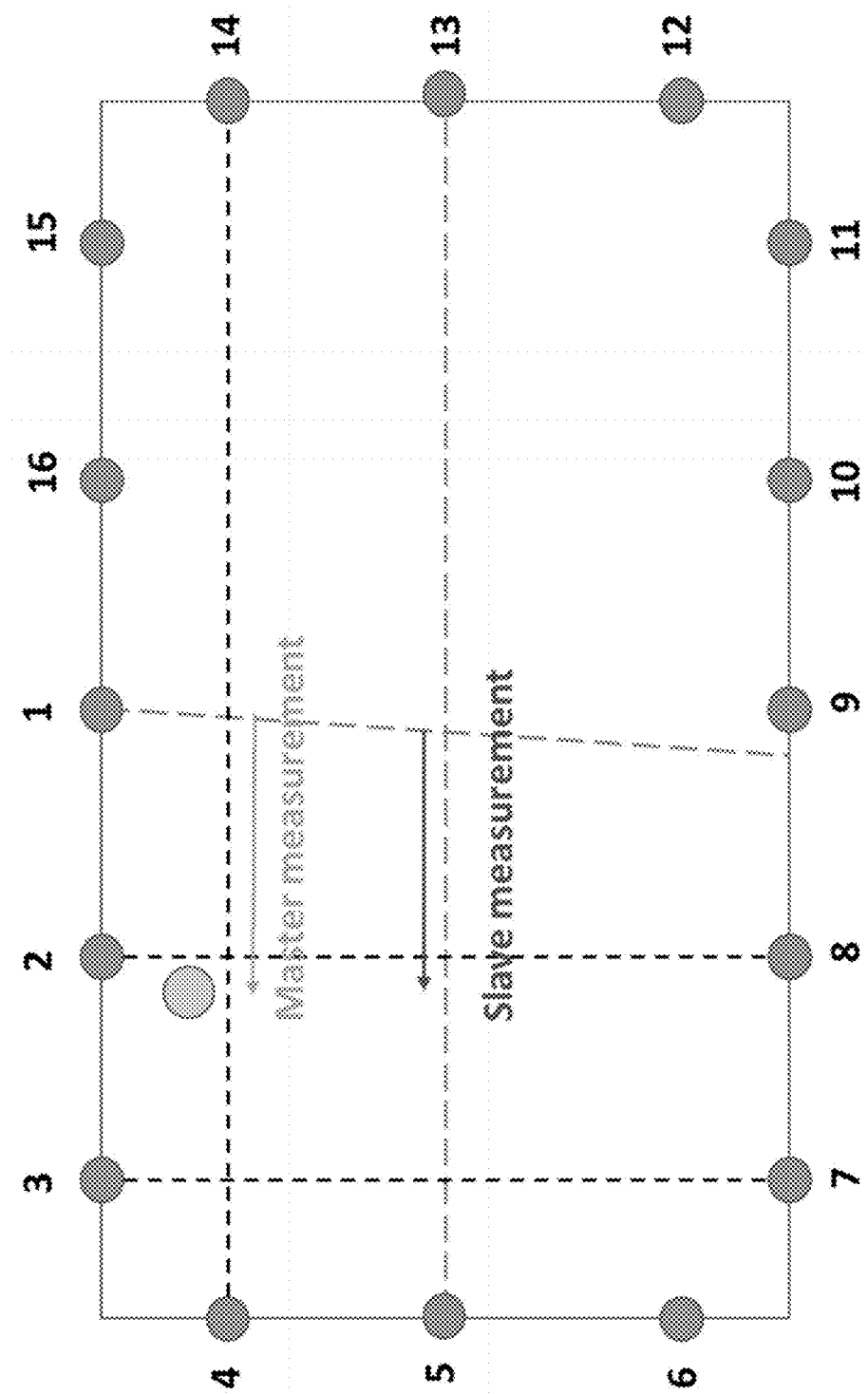
FIG. 36 is an example showing how slave lines can be used to improve accuracy, in accordance with certain example embodiments.

FIG. 36 is an example showing how slave lines can be used to improve accuracy, in accordance with certain example embodiments. In the FIG. 36 example, the vertical equilibrium path is shown to be slightly skewed. Thus, if the master measurement is taken based on the 4-14 line and the slave line is taken with the 5-13 line (either because the slave is set as the horizontal equilibrium path or the adjacent line), then the voltage-related values will be slightly different as a result of the pre-characterization related to the skew.

Figure 37:
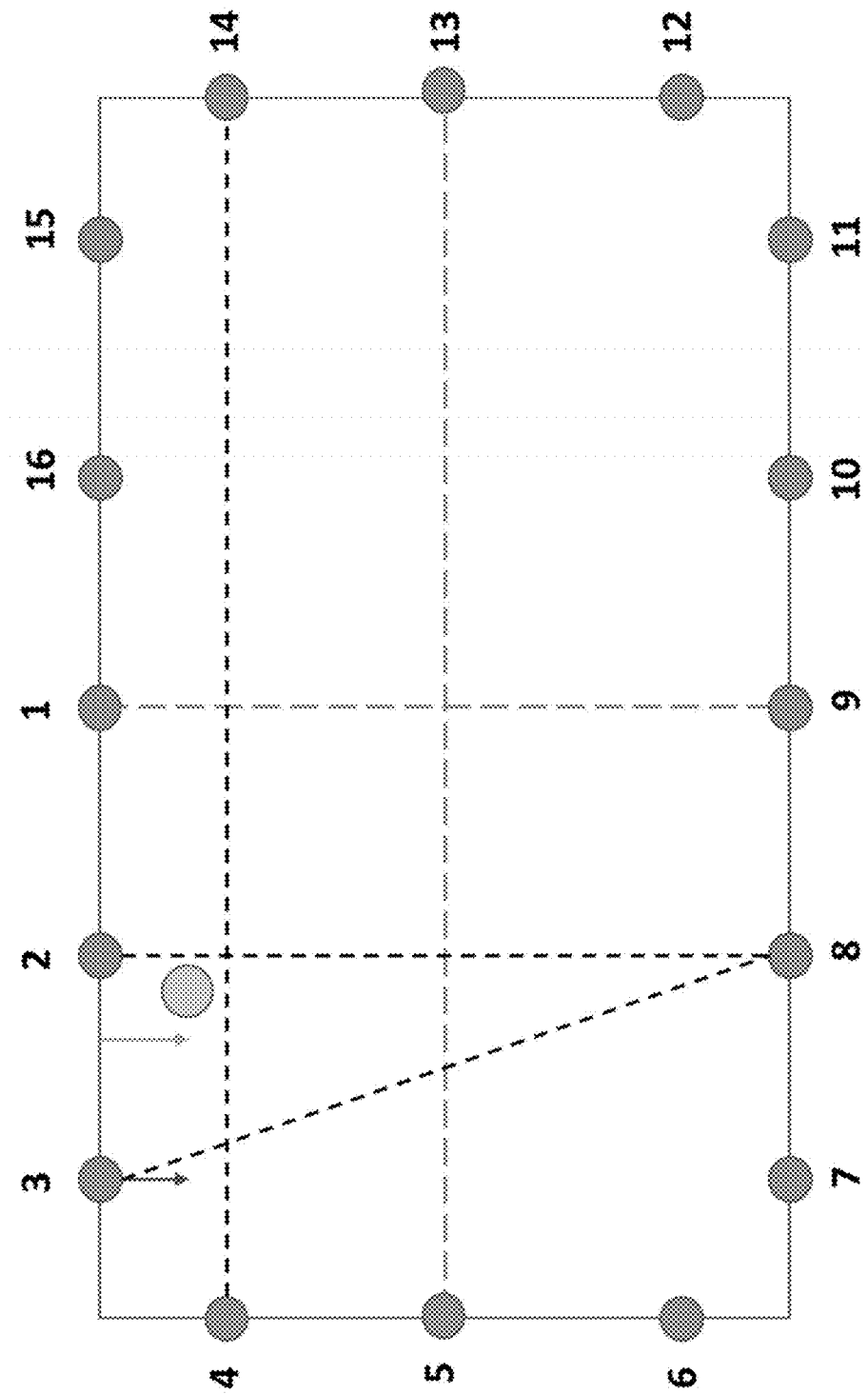
FIG. 37 is an example matrix approach variant that may be used to improve accuracy, in accordance with certain example embodiments.

FIG. 37 is an example matrix approach variant that may be used to improve accuracy, in accordance with certain example embodiments. In this example matrix approach, pre-characterizations are performed for neighbor electrodes. For example, in addition to pre-characterizing for directly opposite electrode pairs, pre-characterizations are completed for 3-8, 2-9, 1-10, 16-11, 2-7, 1-8, 16-9, 15-10, etc. The largest horizontal and vertical drop lines are still determined, and these are taken as master measurements. One or more neighbor electrodes are then used for slave line measurement(s). In the FIG. 37 example, the vertical drop line is 2-8 and that the interaction likely is to the left of the line, so adjacent electrode 3 is used as an additional source (e.g., for the 3-8 line, and potentially for the 3-7 line and/or others). The slave line(s) in this matrix approach thus can be used confirm or refine position detection.

Figure 38:
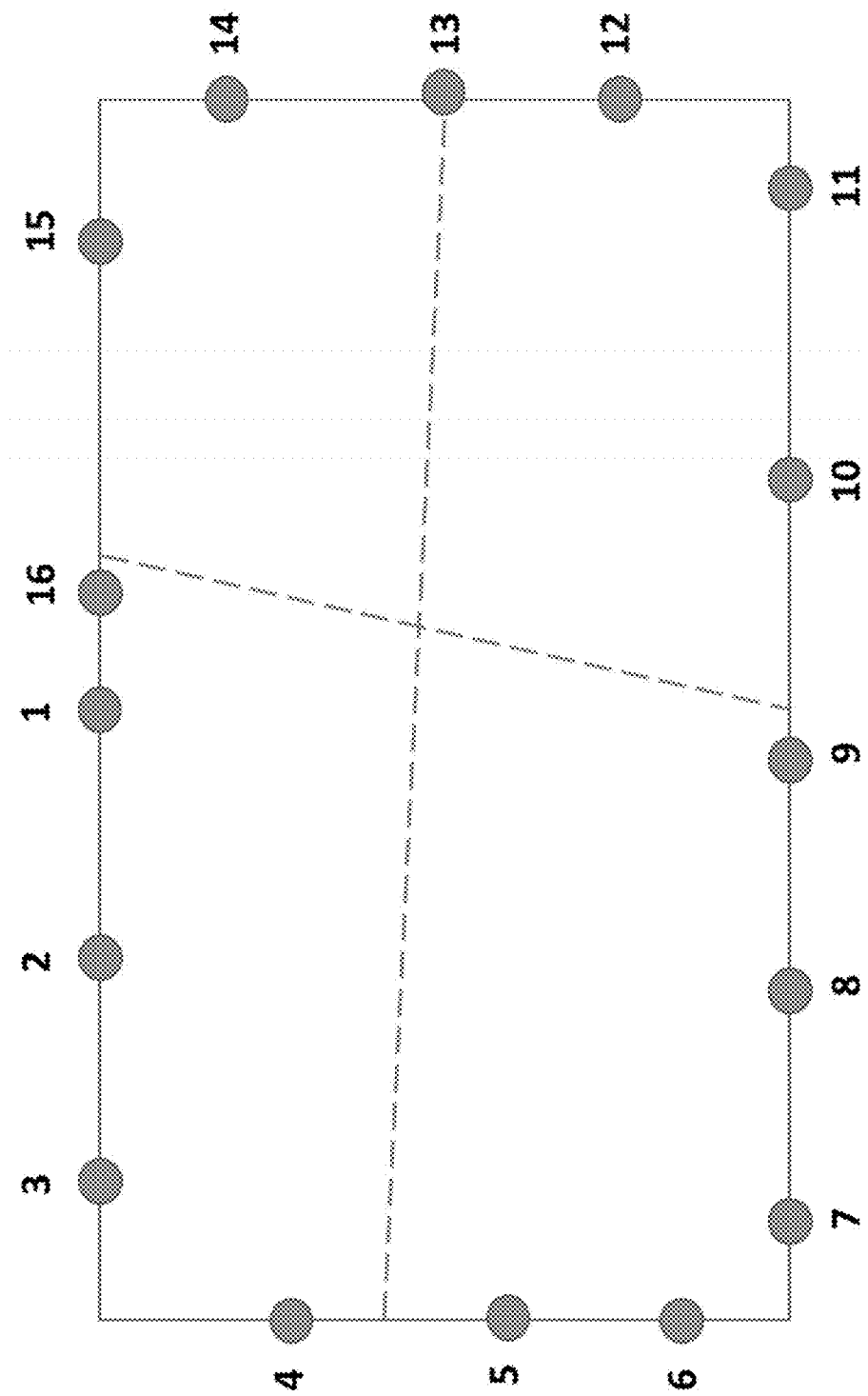
FIG. 38 shows how the center of gravity will be skewed towards the higher the electrode density in certain example embodiments.
Figure 39:
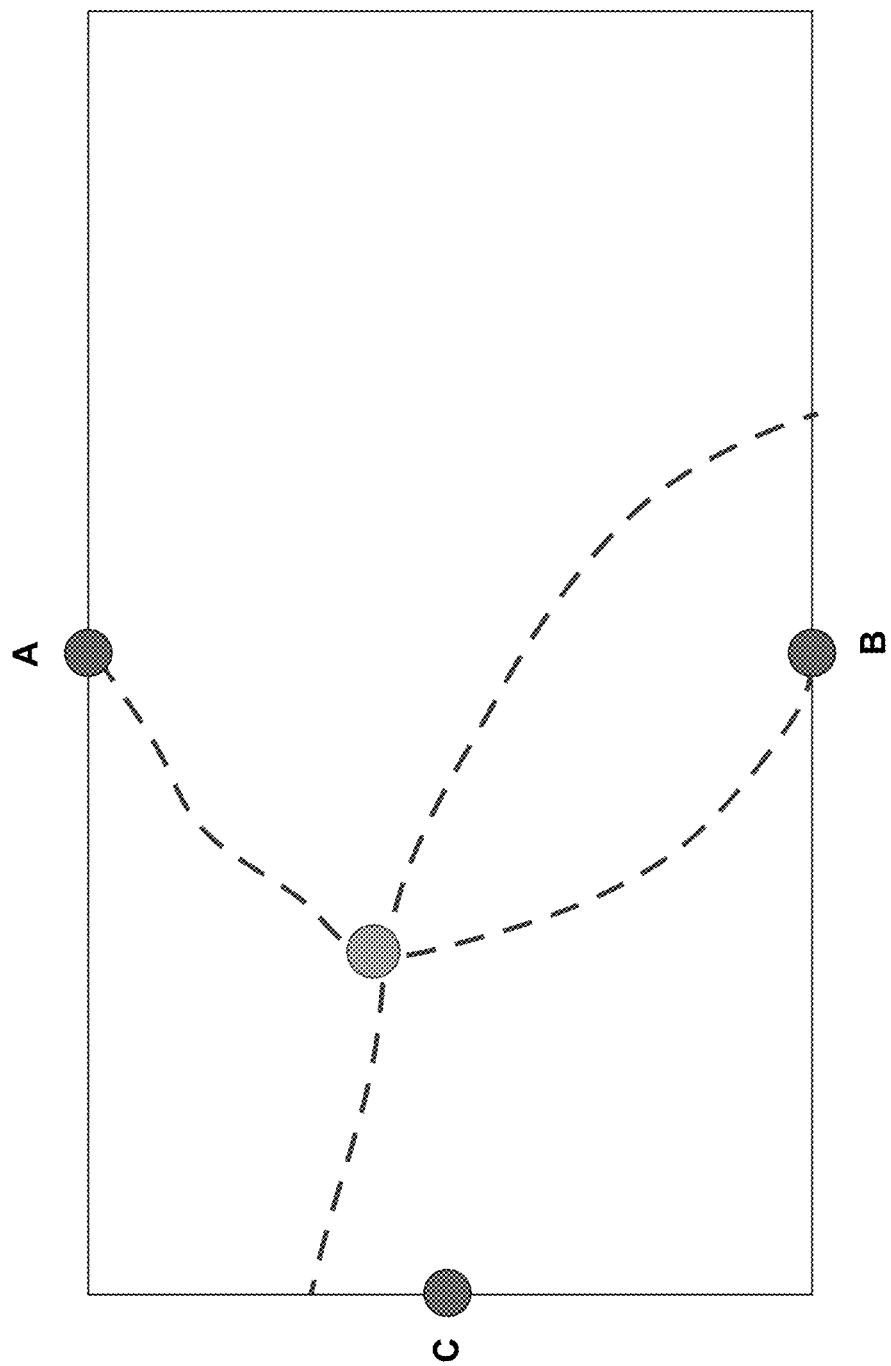
FIG. 39 is an example three-electrode system with an example center of gravity and example equilibrium paths, which may be similar to certain example embodiments.

As explained above, the equilibrium paths will change based on, for example, the placement of electrodes. In general, the horizontal and vertical equilibrium paths will cross at a "center of gravity" of electrical fields generated by provided current to different electrode pairs. As a result, the center of gravity may be off-center relative to the conductive region. In general, the center of gravity will be skewed towards the higher the electrode density, e.g., as shown in FIG. 38. With this recognition, it is possible to use systems with only three electrodes. The center of gravity can be located and equilibrium paths can then be generated, e.g., bisecting the electrical field and crossing at the center of gravity. FIG. 39 is an example three-electrode system with an example center of gravity and example equilibrium paths, which may be similar to certain example embodiments. The FIG. 39 system may function similar to the above, e.g., with A-B, A-C, B-A, B-C, C-A, and C-B lines being used for locating interactions after pre-characterizations are performed.

As described herein, this and the other approaches may involve electrodes provided at different locations other than those shown schematically in the drawings. These locations include locations around edges of the conductive region, electrodes provided at peripheral edges of the conductive region, electrodes provided in or on the conductive region (including in a central area in some cases), etc. The electrodes may be regularly or irregularly spaced apart, provided in rows and columns or other configurations, provided around only two sides (e.g., opposing or adjacent sides) of the conductive region, etc.

Figure 40:
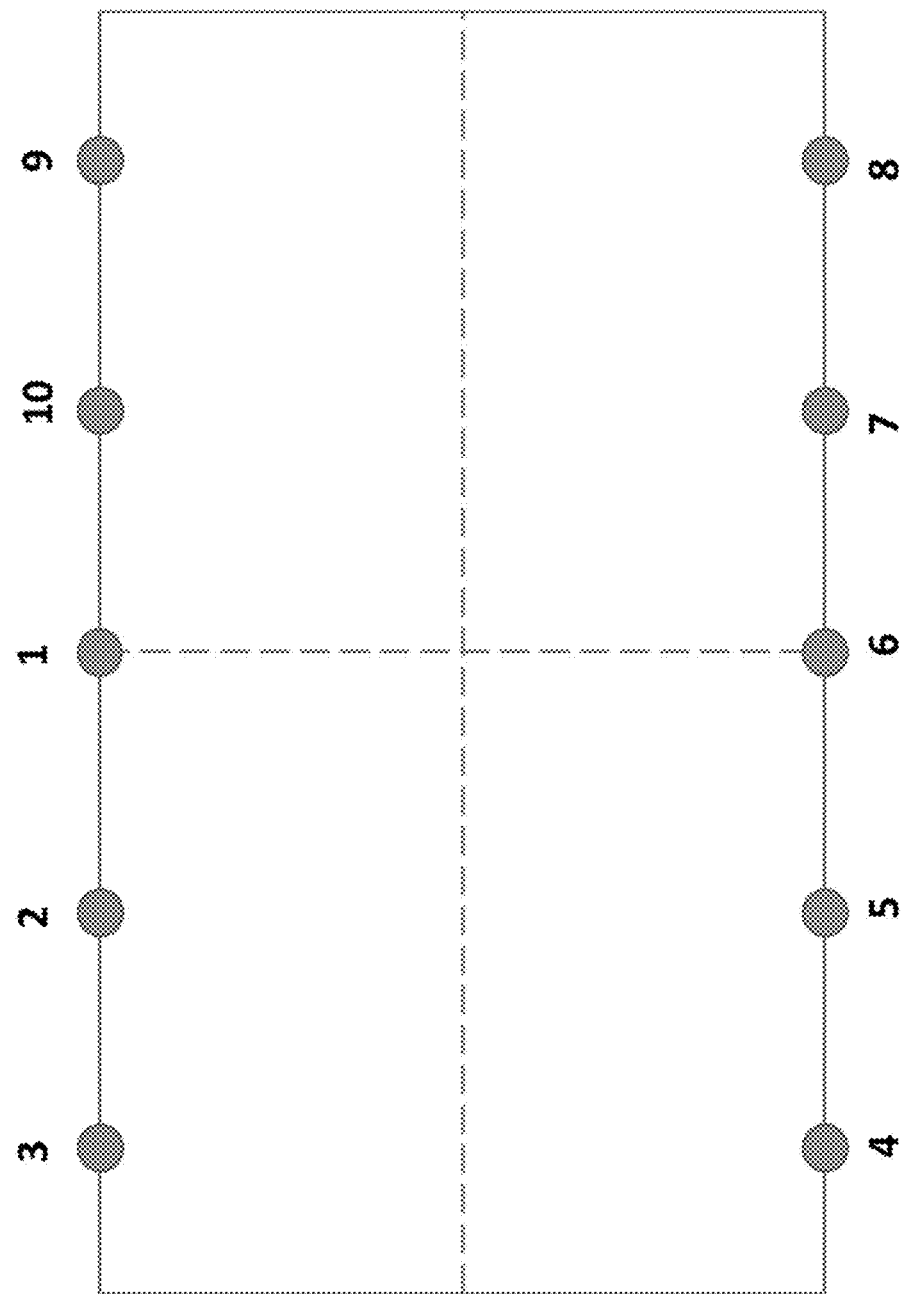
FIG. 40 is an example arrangement where electrodes are provided only on opposing edges of the electrically conductive region, in accordance with certain example embodiments.

FIG. 40 is an example arrangement where electrodes are provided only on opposing edges of the electrically conductive region, in accordance with certain example embodiments. Equilibrium paths can still be developed, and drop lines can still be determined. For instance, it is possible to obtain measurements including 3-9, 2-10, etc., to develop the vertical equilibrium path. The algorithmic approach described in this section may work with this arrangement. It thus will be appreciated that "horizontal and vertical" as used herein need not strictly be used with this approach. Instead, orthogonal, or simply separate, equilibrium paths may be used in different example embodiments. For instance, there may simply be two different paths on a coordinate system, with the paths being defined by electrodes.

In certain example embodiments, the conductive region may include a conductive coating and the plurality of electrodes may be formed in or otherwise electrically connected to the conductive coating. In certain example embodiments, a conductive coating may be provided across the entirety of the conductive region. The conductive region thus may include a surface with a conductive coating formed thereon, and that coating may, for example, be a thin film coating, include conductive elements provided in a liquid painted onto the surface, etc. Alternatively, or in addition, the conductive region may include a surface with conductive particles embedded therein and/or provided thereon. The conductive surface may be a floor, wall, ceiling/roof in a building and/or vehicle, and/or the like; it may be a part of a machine; etc.

It will be appreciated that this algorithmic approach, as with the others described herein, may be used in connection with a wide variety of systems, e.g., where a hardware processor is provided to execute the corresponding operations. It also will be appreciated that here, as with the other approaches described herein, there is also contemplated a non-transitory computer readable storage medium tangibly storing instructions that, when executed by a processor, perform these operations.

Although certain operations are described in the various algorithmic approaches set forth herein as being horizontal and vertical, it will be appreciated that other "reference orientations" may be used for any of the approaches, e.g., depending on the geometry of the interface, electrically conductive, field, etc. Similarly, the order of operations may be changed in the various algorithmic approaches set forth herein (e.g., horizontal related operations may be performed first and vertical related operations may be performed second, or vice versa).

Example Gesture Recognition-Related Techniques

Figure 18:
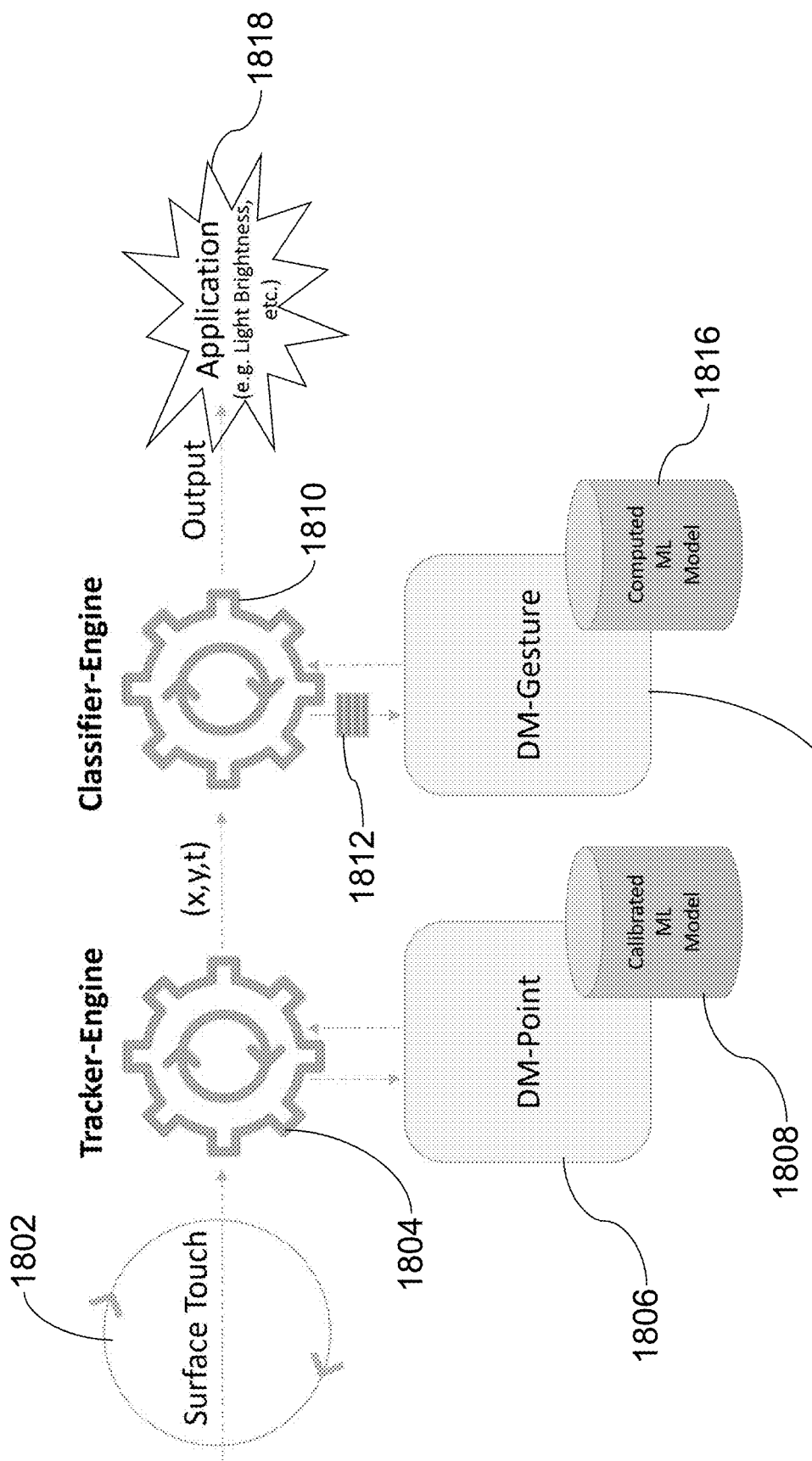
FIG. 18 schematically shows how points can be collected and used for gesture recognition, in certain example embodiments.

FIG. 18 schematically shows how points can be collected and used for gesture recognition, in certain example embodiments. Surface interactions are monitored for continuously using hardware 1802, e.g., as described above in connection with FIG. 7. A tracker engine 1804 tracks voltage related inputs and applies point-related decision-making logic 1806 to determine whether an interaction took place and, if so, at what time. Point-related calibrations 1808 aid in this regard. The tracker engine 1804 may implement part or all of one or more of the algorithmic approaches described above. The point-related calibrations 1808 may include information such as, for example, characterization data for the interface (e.g., size, sheet resistance/conductivity, etc.), mask characterization information (e.g., mask sizes, drop ratios, etc.), and/or the like.

Interactions registered by the tracker engine 1804 are fed as output 1812 therefrom to the classifier engine 1810. The output 1812 from the tracker engine 1804 includes position data (e.g., x and y coordinates) as well as a timestamp associated with the interaction. When the tracker engine 1804 is extended to handle hover operations, z coordinates also may be output. The output 1812 thus includes at least x, y, and t data.

The output 1812 is collected and provided to gesture-related decision-making logic 1814. The gesture-related decision-making logic 1814 consults the computed ML model database 1816 in certain example embodiments, e.g., to determine whether a gesture has been input. That is, an IS model may be generated from the output 1812 from the tracker engine 1804 and then analyzed to determine whether it matches any trained models referenced in the model database 1816.

The output from the classifier engine 1810 is then provided to an end application 1818 for control or other purposes. For example, a light may be turned on/off based on a touch or swipe, its brightness may be adjusted, etc. In addition to lighting control, gestures can be used at smart tables (e.g., to call a waiter), on smart whiteboards (e.g., to draw or clear a screen), in automotive applications (e.g., to open/close a door or trunk), etc. In certain example embodiments, the surface touch points may be collected via operation of a first thread (corresponding to the tracker engine 1804) and then registered for analysis and gesture recognition via operation of a second thread (corresponding to the classifier engine 1810). Of course, different example implementations may perform these tasks in serial, e.g., if parallel processing is not possible.

Example Hover-Related Techniques

As discussed above, the technology described herein can be used to track, recognize, and take action based on hover-related interactions with the interface. Similar electrical principles to those discussed above apply with respect to this third-dimension related interaction tracking. That is, hover-related interactions can be enabled by understanding the Z-distance to the surface by using the electromagnetic field and, in essence, considering the relationship between the voltage drop and the distance to the surface.

Figure 19C:
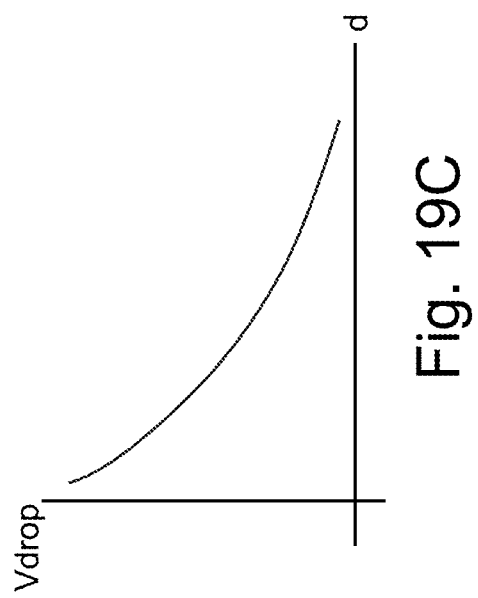
FIGS. 19A-19C help explain how hover-related interactions can be managed in accordance with certain example embodiments.
Figure 19B:
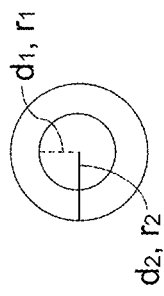
Figure 19A:
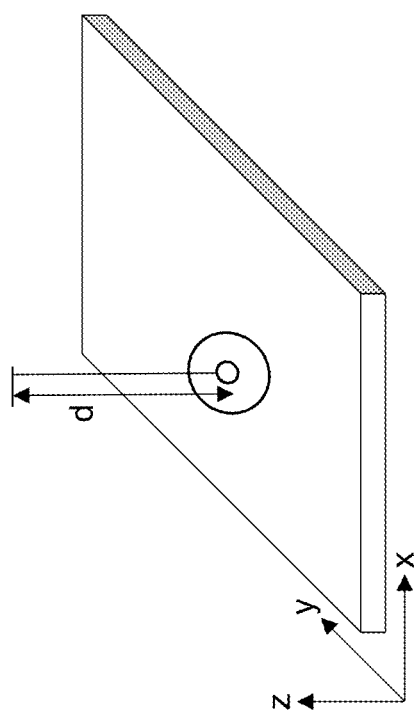

FIGS. 19A-19C help explain how hover-related interactions can be managed in accordance with certain example embodiments. As shown in FIG. 19A, for example, the distance d between the conductive surface of the interface and the hover causes a voltage drop in z-direction (which is perpendicular to the x- and y-directions) because of the generated electrical field. The amount of the voltage drop is detected using the hardware described herein. That is, a current (e.g., of up to 500 mA, for example, which is suitable for a large interface) is applied to the surface of the substrate. A reference voltage is pre-characterized for the substrate, e.g., for different positions thereon. When the hover interaction takes place, a voltage drop is triggered.

The algorithmic approaches described above can be adapted to understand the hover interaction locations. Through only minor modifications, the distance d to the substrate can be understood. It is noted, however, that resolution may be dependent on distance, unless further algorithmic or other modifications are made. The distance resolutions are related to the applied electrical field. As shown in FIG. 19B, a hover interaction at a distance d1 can be located on the substrate within a radius r1. However, for a hover interaction at a distance d2 that is larger than d1, the location will be within a radius r2 that is larger than r1. This is because the voltage drop reflects an inverse curve characteristic for the voltage drop axis vs. surface non-touch distance axis, e.g., as shown schematically in FIG. 19C. It is noted, however, that distance detection can be adjusted in several ways. For example, properties can be set to determine distance ranges to be used specific for specific applications. Thus, interactions can be assumed to be within a certain distance in order to more accurately locate them, or vice versa.

It has been found that hover-related functionality may be enabled using the example hardware and software setups described herein for large surfaces. For instance, for a surface with a 67" diagonal, hover/proximity-related sensitivity has been determined to be about 1 meters. The sensitivity may be affected by factors such as, for example, conductive surface size, shape, number of electrodes, and/or the like. Sensitivity can be increased to about 1-2 meters (and perhaps more) even with a 67" diagonal sensing surface (for example), for example, by providing complementary coatings on the sensing surface and the surface being sensed. For instance, complementary components can be provided on a sensing surface (e.g., a robot or other piece of machinery) and a human to help increase the distance at which hover/proximity-related measurements can be taken.

Example Measurements

Figure 20B:
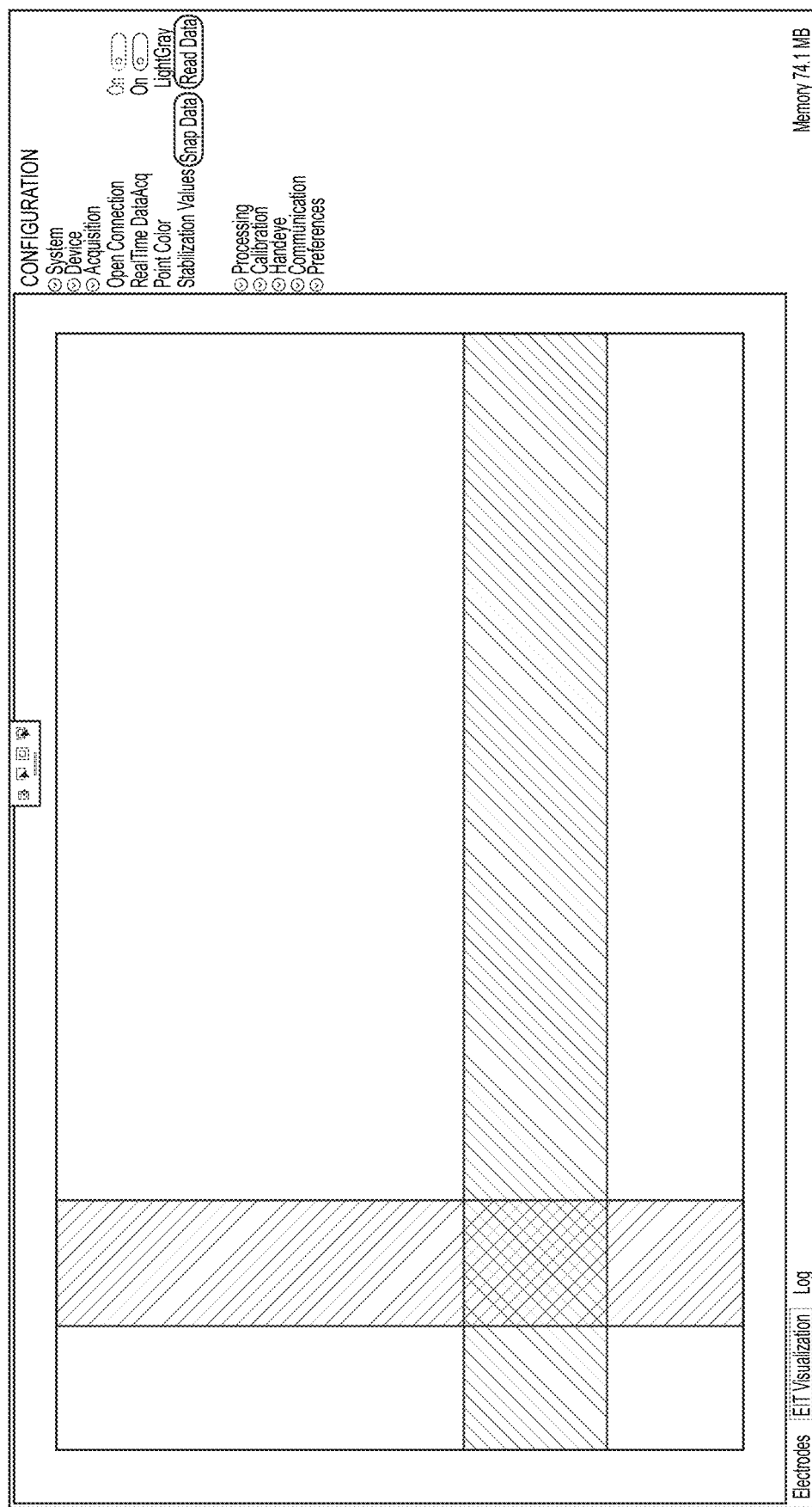

FIGS. 20A-22 help show what kind of information can be gathered using the example hardware described herein, and how it can be used in connection with the example algorithms described herein. In that regard, FIGS. 20A-20B provide information about how voltage-related measurements can be used in connection with the discrete loop algorithmic approach set forth herein, in accordance with certain example embodiments. As shown in FIG. 20A, for example, 16 electrodes are provided around a surface. When the surface is perturbed, voltage drops are triggered. The measurements (in millivolts) are provided for each of the 16 electrodes, as are the associated drop values. The measurements are denoted with the prefix "Measurement-" and the suffix of a corresponding electrode. Similarly, the drop values are denoted with the prefix "dV-" and the suffix of a corresponding area. The interface in this example is divided into nine active vertical regions (AVR-01, AVR-02, . . . , AVR-09) and five active horizontal regions (AHR-01, AHR-02, . . . , AHR-05). The highlighting below AVR-02 and AHR-04 indicates that these are the active lines in which the touch took place. FIG. 20B visualizes the substrate, highlighting these active lines and shows the area of overlap, where the touch-related interaction is likely to have taken place.

Figure 21:
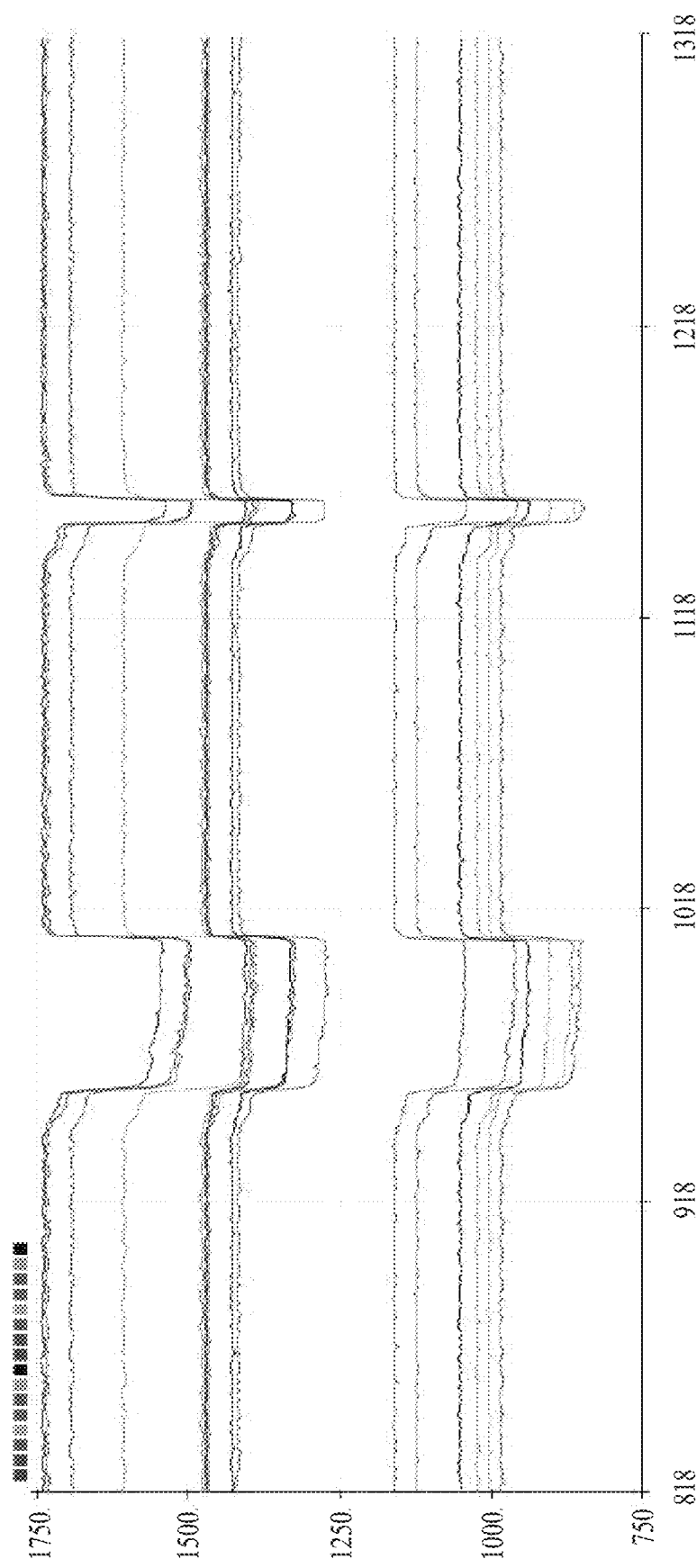
FIG. 21 shows voltage related signals gathered in connection with a simple touch interaction, using the hardware of certain example embodiments.
Figure 22:
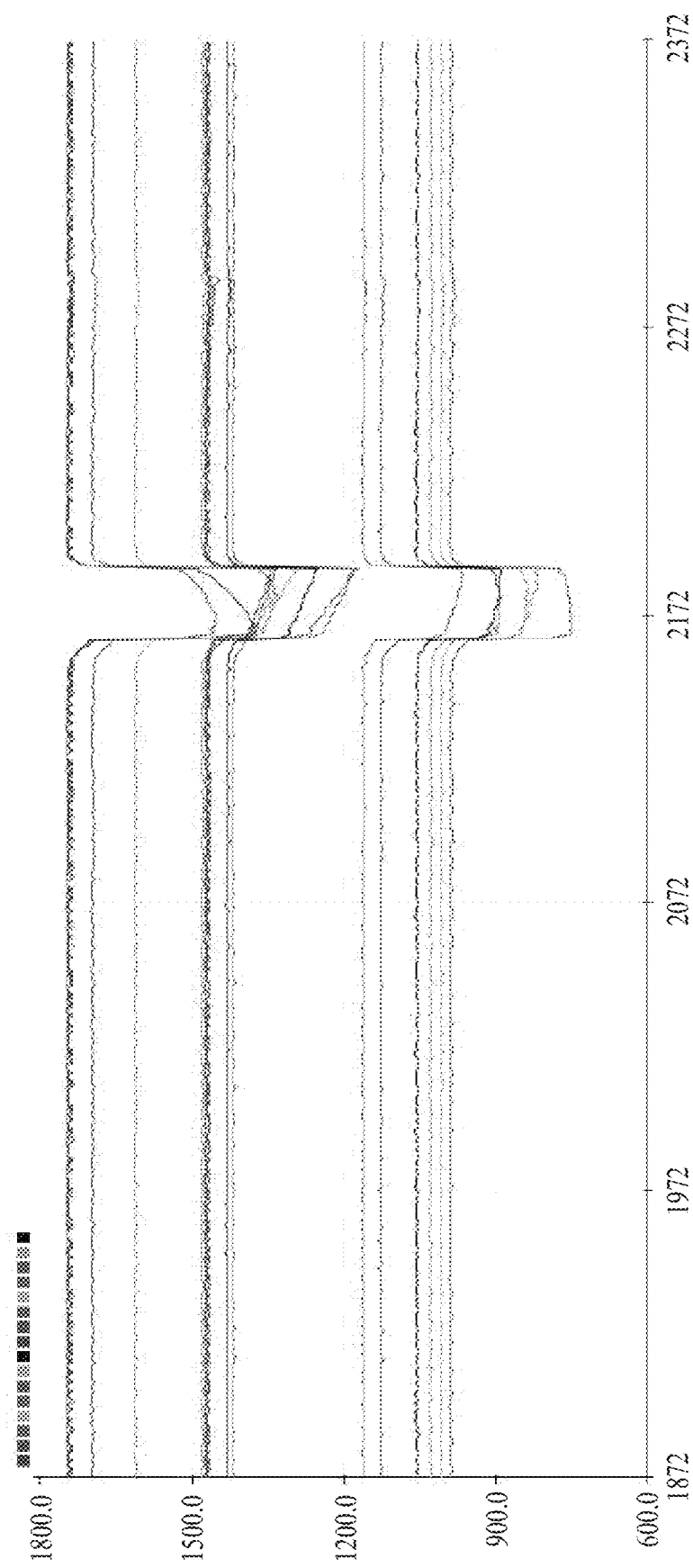
FIG. 22 shows voltage related signals gathered in connection with a swipe interaction, using the hardware of certain example embodiments.

FIG. 21 shows voltage related signals gathered in connection with a simple touch interaction, using the hardware of certain example embodiments, and FIG. 22 shows voltage related signals gathered in connection with a swipe interaction, using the hardware of certain example embodiments. In these graphs, the x-axes denote time, and the y-axes denote voltages. The colored lines in the graphs represent the measurements taken at each of the electrodes. As can be seen from both FIG. 21 and FIG. 22, the voltage measurements are substantially constant until there are large dips indicative of the interaction. The dips are fairly short in duration. Their profiles differ because different interaction types are present. That is, the dips are substantially U-shaped in FIG. 21, which is indicative of a single touch-on/touch-off event. By contrast, the dips have angled troughs in FIG. 22, indicative of a swiping interaction.

Example Applications

The technology described herein may be used in connection with a wide variety of different end-uses or applications. These applications may be spread across a variety of different industries. Moreover, the hardware architecture and algorithm related teachings disclosed herein may be used in both touch and non-touch related applications, e.g., a host of different interactive and/or detection-related applications. At a high level, more control can be provided as a matter of convenience (e.g., in connection with a touch-sensitive interface), movement and/or human presence can be detected to be more proactive with respect to an action to be taken (e.g., to avoid obstacles in a setting), more sanitary interactions can take place on shared surfaces when hover interactions and/or gesture functionality is enabled (e.g., in a variety of health-related domains), insights can be gathered for workplace safety and efficiencies (e.g., by gathering data about how individuals in a factory work), etc. In general, the techniques of certain example embodiments make it possible to provide control signals by, for example, interacting with a wall, surface top, dashboard, or other article, in a manner that is more easily accessible than today's buttons, switches, and/or displays; "interactions and movement" can be detected so that an action (manual and/or automated) can be taken; etc. In a healthcare setting (for example), infection may be a concern, so non-contact interactions may be useful in situations including, for instance, shared control panels as may be found with an elevator interface, in environments where soiled hands typically contact surfaces like kitchens and utility areas, etc. Touch sensing related applications may be useful in automotive, aerospace, health care, education, transportation, consumer products, electronics (including consumer electronics), building construction and architecture, office environments, information display, and other industries. Non-touch sensing related applications may be useful as alternatives to or supplements for proximity sensors, zone/area detection, human detection, health care industry where non-contact touch-like interactions may be desirable, etc. The technology can be used in retail stores, public areas (such as, for example, airports, exhibits, entertainment venues, etc.), hospitals, educational settings, in the home, at the work place, etc.

The uses in these applications and industries are wide and varied. Additional sensor and/or technologies can be used to provide further functionality to extend into other applications or industries, or to extend further into those example discussed herein. Thus, certain example embodiments may be provided in or as a part of a larger sensor ecosystem. For example, the technology of certain example embodiments can be augmented with light detectors, IR detectors, temperature gauges, humidity sensors, and a whole variety of Internet-of-Things (IoT) and/or other sensors, radar, LIDAR, optical sensing, etc. As an example, for automotive and other vehicle applications, the number of offered features can be increased because of the rich-set of used sensor technologies. In this regard, new generation vehicles are controlled with advanced controller technologies for sensing the environment for automatic parking, safety, autonomous driving, etc. As another example, body tracking can be used to determine whether seatbelts are engaged, a driver appears to be falling asleep, etc. Liquids (including gas, oil, wiper fluid, brake fluid, etc.) can be measured accurately, air-bags can be activated to protect the driver and passengers, etc., using the technology described herein. On-board processors can track the driver movements (e.g., head nodding to indicate passing out, swaying indicating a loss of full consciousness, etc.) and warn against possible dangers. This may be thought of as being a gesture tracking issue. ML may be used to adapt configurations regarding tracked driver actions for performance.

With so many integrated technologies provided in vehicle interiors, there are many areas where surface-sensing techniques could be used. This includes any sort of control functionality on a small or large surface including navigation, temperature, audiovisual entertainment, gear shifting, windows, locks, airbag engagement, etc. Some steering wheels currently are tracked with simple but expensive force sensors, and the technology described herein could be used in place of such technology. For instance, the techniques described herein can be used to take the place of sensors that track hand movements for the purpose of adaptive steering control, generally understanding how one drives, inferring when a person has been driving for a long time and might be fatigued, etc. The technology disclosed herein can be used on windshields for tracking environmental conditions, damaged regions, etc., e.g., so as to replace existing more expensive sensors while also offering the ability to provide full-surface control/interactivity.

There are variety of different types of hover-related or other non-touch/non-contact applications that can be achieved with different hardware platforms. For example, hover-related applications may include multi-point distance detection without X-Y detection (e.g., as an alternative to other sensors, which cannot be used on large surfaces and/or are very expensive); low-range distance detection and high-accuracy X-Y detection; mid-range distance detection and mid-accuracy X-Y detection; high-range distance detection and low-accuracy X-Y detection; etc.

Example Industrial Safety Related Applications

The technology described herein are applicable to industrial safety applications. For example, using the technology described herein, it is possible to track equipment (e.g., forklifts, dollies, etc.) and personnel (e.g., using EIT technology in the floor, on the individual, and/or on the equipment which may be mobile or stationary, etc.); provide alerts when objects get too close to hazards of varying degrees (such as, for example, "hot work" and/or "hot" zones); issue alerts to pinch/laceration risk and/or stop/adjust equipment such as robots or other automated machinery to help reduce the likelihood of injury; generate alerts when moving equipment (e.g., a forklift) comes within a predetermined distance of (e.g., too close to) personnel and/or when personnel enter into areas of potentially moving equipment; provide alerts when objects come within a predetermined distance of (e.g., get too close to) energized surface and/or de-energized surfaces; etc. Certain example embodiments provide a retrofit safety solution that can be used with existing machinery, layouts, and/or the like. Certain example embodiments provide a custom approach to providing new equipment, layouts, and/or the like. In both new and retrofit situations, the technology disclosed herein can be used to supplement, or sometimes supplant, existing safety-related systems, e.g., by providing "blind area" detection, which may be present in or around equipment or access ways when, for instance, items are blocking other sensors (like laser sensors or other optical imaging means), when there are "blind spots," etc.

In general, one or more areas of interest is/are defined. Such areas may be defined by providing a conductive surface. The surface may be made conductive by having a conductive coating formed thereon (e.g., a thin film or other coating, tape or other adhesive, a paint, or the like) and/or by having conductive materials embedded therein (e.g., in the case of a floor, wall, or other surface). Conductive mats/carpets, pads, decals, and/or the like may be used in certain example embodiments. The conductive surface may be provided as a "skin" to a robot, cobot, or other piece of machinery. It will be appreciated that the "skin" can be a pained, wrapped, or other coated to form the sensing surface in this and/or other embodiments. It may be provided on the entire apparatus, just the moving sections, just those sections that could cause a particular kind of injury, etc. It will be appreciated that "soft goods" may be used for conductive areas in certain example embodiments, and additionally or alternatively certain example embodiments may make use of hard materials (such as, for example, pads, plates, flooring materials, roofing materials, and/or the like) that might be particularly suitable for industrial settings. In certain example embodiments, it may be desirable to take have the conductive applied onto, or integrated/embedded into, another surface during or after manufacturing. In some cases, the sensing surface may be visually perceivable to humans using aesthetic signals or cues to notify people where the sensing areas exist and, as a result, where sensitive areas may be present.

One or more electrodes is/are provided on the surface (e.g., on, around, of formed in the conductive surface). In general, more electrodes will provide more sensitivity and, potentially, better definition. In some cases where simple touch on/off or gross proximity detection is desired, one or two electrodes may be used. Range can be extended in some instances by providing, for example, "transponders" on different articles. For example, a person may be asked to wear a transponder that transmits a particular electrical signal that is detectable. A controller is programmed to recognize different interaction types with respect to the area(s) of interest. Interaction types may include, for example, hover/proximity, touch, gesture, and/or other operations. They can be predefined and/or machine learned. Different interaction types may be specified for different areas. The controller also is programmed to cause different actions to be taken, potentially on an interaction-by-interaction and/or area-by-area basis. For instance, pause/stop, start/enable starting, slow, raise alarm, alert authorities, and combinations of these and/or other actions may be programmed.

Further example use cases are discussed in greater detail below in connection with certain industrial safety applications. Specifically, the technology disclosed herein may be used to provide industrial safety solutions for areas such as, for example, machine guarding, robotics and mobile equipment, loading and shipping, access and fencing, and/or other contexts, e.g., as discussed in greater detail below. It will be appreciated that certain example embodiments may be provided in duplicate and/or to supplement existing solutions. This may be useful for providing redundancy, e.g., for certain safety applications. Redundant systems implementing the technology disclosed herein can, for example, help ensure safety ratings by providing fail-safe redundancies in the event that a single system has a failure point.

In this regard, the example approaches provided herein can be used in duplicate, triplicate, etc., for redundant detection of the same events in the same areas. In such cases, the different systems can function at the same time, with the output being compared to confirm whether an event is taking place. Alternatively, another system can start up in the event that an error or malfunction is detected with an operating system (e.g., in the case that events are not reported within a predetermined amount of time, if there is an issue detected with the circuitry not responding, etc.). Additionally, or in the alternative, redundancy can be provided for a different safety system related or other technology. For instance, one safety system may implement laser-based detection of hazards or the like, and the example techniques disclosed herein can be used to augment or provide redundancy to such systems (e.g., in the event of low-light situations or focal distances where laser-based or other technologies have difficulties). In such cases, the systems can function at the same time, or when another system starts to produce invalid or untrustworthy output (and/or stops producing valid or trustworthy output).

Example Machine Guarding Related Techniques

Figure 23A:
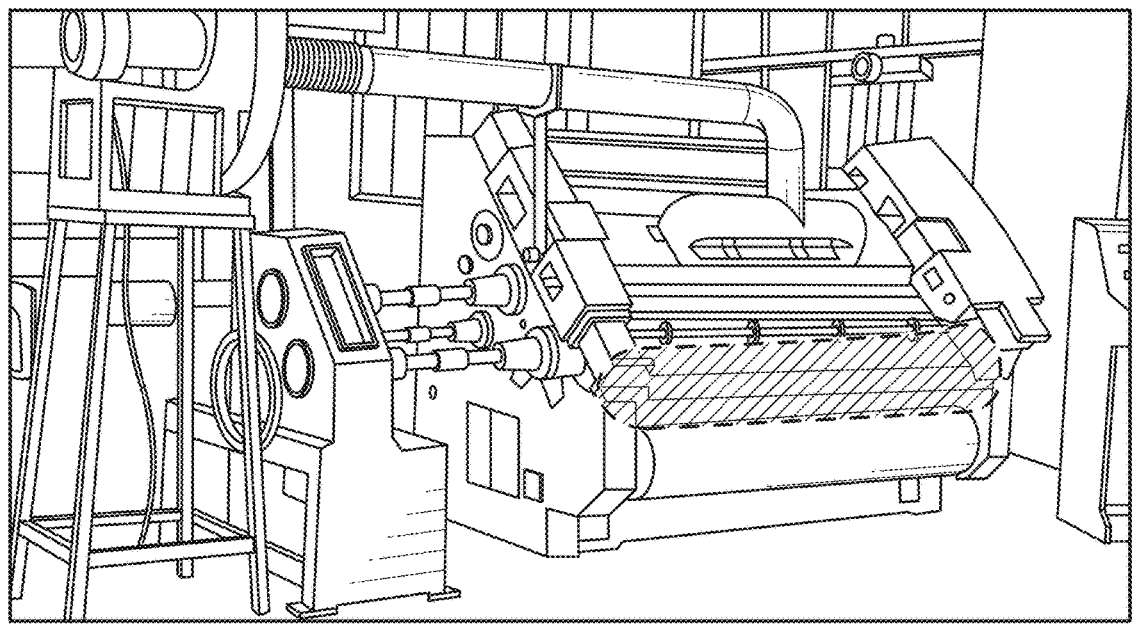
FIG. 23A shows machinery into which a modular detection system based on the technology disclosed herein has been installed, in accordance with certain example embodiments.

Safety issues can exist when operators and/or other personnel act or interact in close relative proximity to hazardous areas. Certain example embodiments relate to retrofit and/or self-installation solutions, as well as other solutions that are integrated/embedded during manufacture/construction. That is, by providing modular accessories that are able to detect touch, proximity, and/or other interactions, it becomes possible to detect a human or other object that might be too close to the machinery. The machinery can then be controlled to de-energize itself (e.g., to stop/pause, slow down, reverse course, etc.). FIG. 23A shows machinery into which a modular detection system based on the technology disclosed herein has been installed, in accordance with certain example embodiments. In the FIG. 23A example, a modular accessor is installable. In this instance, a generally rectangular area is defined, as indicated in the area that is hatched and surrounded by broken lines. When a person or object approaches or touches this area as detected using proximity, hover, and/or touch related functionality disclosed herein, the machinery may be controlled to improve the overall safety situation. To enable this operation, a modular component may be installed at the left, right, top, or bottom of the hatched area surrounded by broken lines. It also may be installed elsewhere, but the area of interest may be defined so as to "project" and thus protect the hatched area surrounded by broken lines.

Figure 23B:
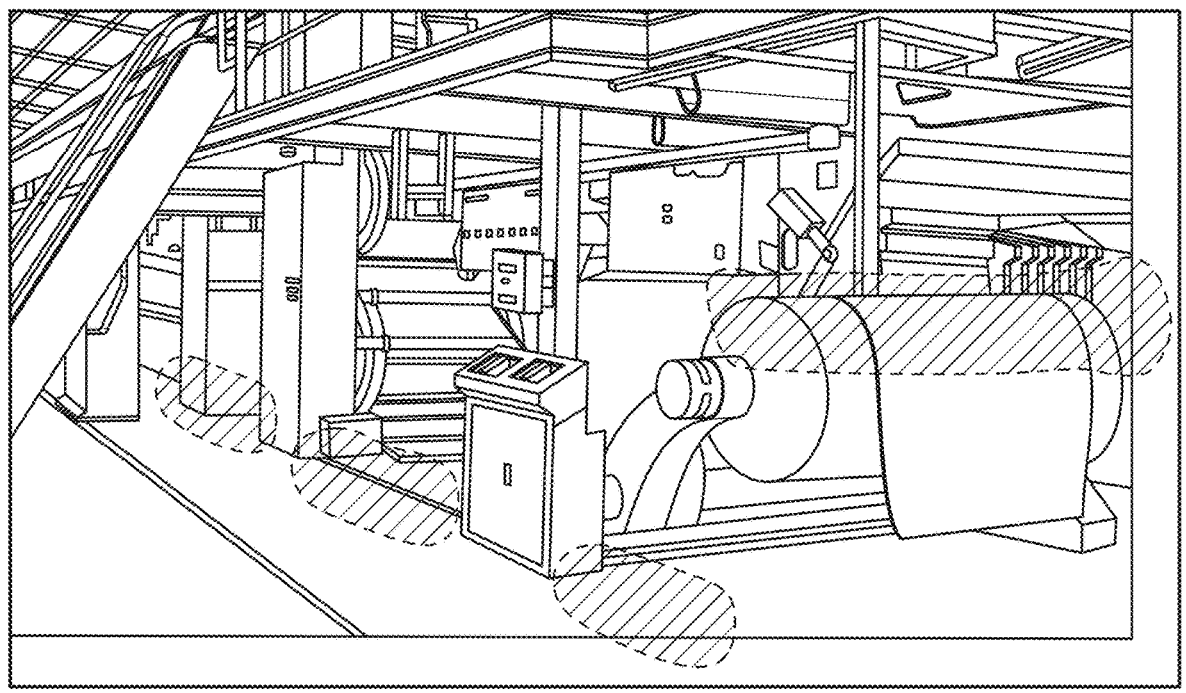
FIG. 23B shows the disclosed technology being used to create protective areas for machinery in a bespoke manner suited for that particular piece of machinery, in accordance with certain example embodiments.

Safety issues also can exist when workers access a hazardous space or area. Using current technology, it can be challenging to make safer large, complex, and/or older machinery. The techniques disclosed herein can be used to provide a custom integration for such machinery. In this regard, FIG. 23B shows the disclosed technology being used to create protective areas for machinery in a bespoke manner suited for that particular piece of machinery, in accordance with certain example embodiments. The technology disclosed herein can be used to create a custom integration to upgrade existing systems, e.g., by one or more multiple protective areas or zones using modular components. The hatched areas surrounded by broken lines shown in FIG. 23B are areas that can be protected. Different actions can be taken for different areas, e.g., in accordance with custom or other programming of the controller. For instance, the machine may be controlled so as to slow down or pause if a human is detected under it, whereas it may be controlled to stop completely if a person comes within a predefined proximity of the operation area at the front of the machine.

Figure 23C:
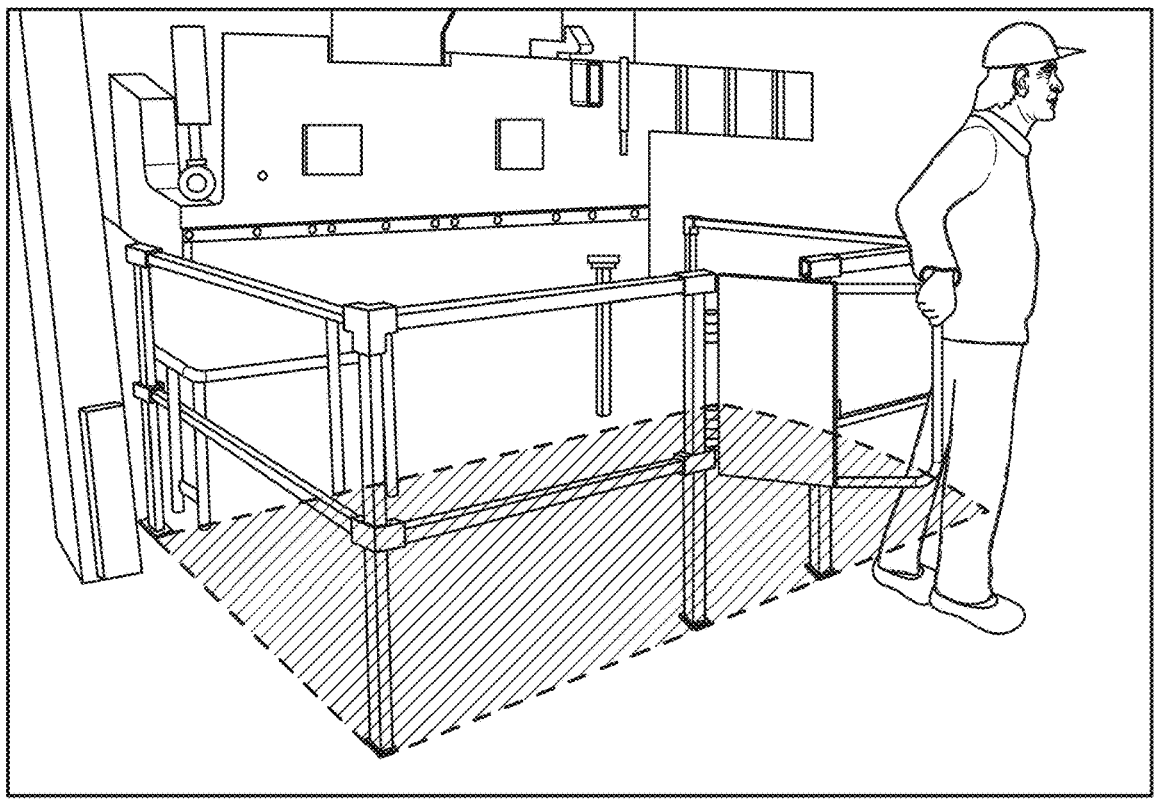
FIG. 23C shows the technology disclosed herein being used for active enablement of a defined area, in accordance with certain example embodiments.

FIG. 23C shows the technology disclosed herein being used for active enablement of a defined area, in accordance with certain example embodiments. In some instances, machinery can be energized or powered unnecessarily. This may waste energy and/or create potentially hazardous conditions when persons leave workstations or other areas unattended (e.g., because they forget to turn off machinery, are fleeing in view of an accident, and/or for other reasons). Thus, certain example embodiments may detect when an operator is at or near a defined control area (see the hatched area surrounded by broken lines in FIG. 23C). In certain example embodiments, then, proximity detection may be used to determine when a human is standing in a defined area, at controls, when a person enter/exits a defined area, when a person is alert at the area (e.g., based on collapse, swaying or head nodding, etc.), etc. Control functions may include pausing or stopping operations when a person leaves an area, starting or enabling a machine for start when a person enters into an area, etc. The controller may be programmed to perform these and/or other functions in different example embodiments.

Example Machine Robotics and Mobile Equipment Related Techniques

Certain example embodiments may be used to help protect workers from moving robots and vehicles. This may be particularly advantageous in a time where automation is increasing. Even though some automated/autonomous systems are quite safe when properly installed and when individuals are properly trained, there may be more potentially hazardous situations because of a lack of familiarity with such machines. Even for machines where people have familiarity, there is oftentimes a tendency from even experienced individuals to simply ignore (e.g., walk past) potentially dangerous situations. People tend to take shortcuts by dangerous machinery when they think they have experience, perceive low risk, etc. Some people will even walk up to dangerous machinery to inspect it, just because they are curious.

Figure 24A:
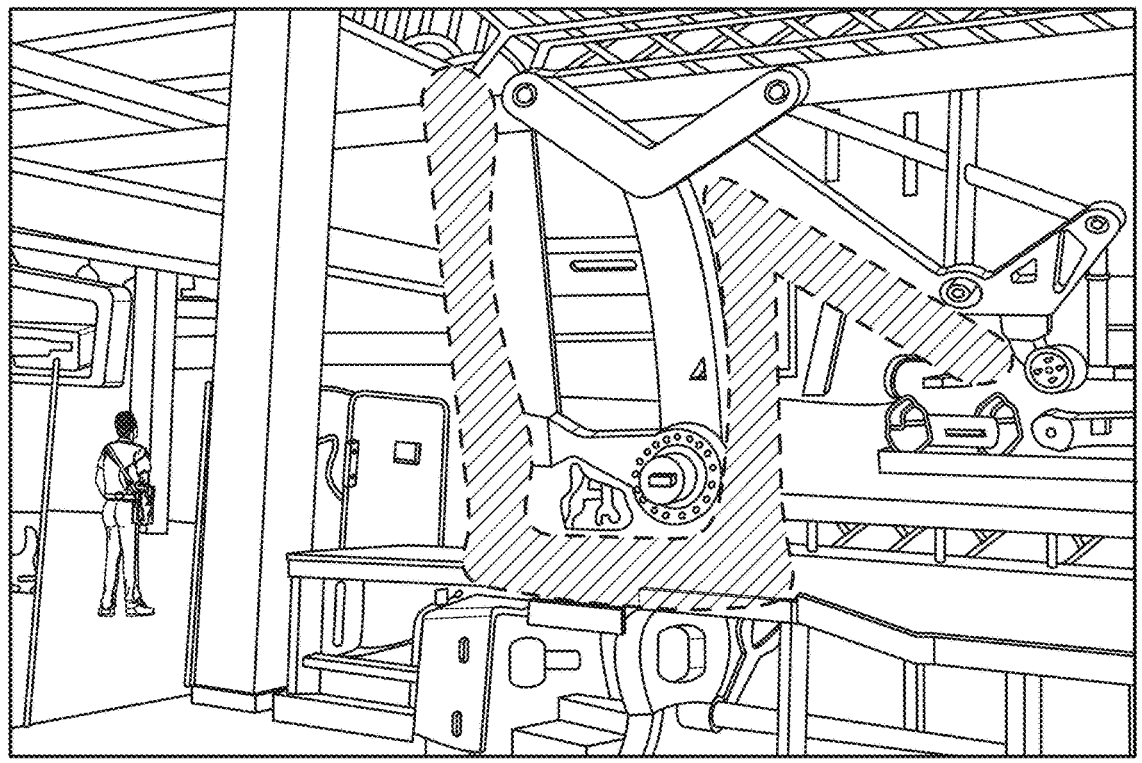
FIG. 24A shows a "skin" applied to a robot in accordance with certain example embodiments.

Some current industrial solutions rely on physical guarding (e.g., cages, scaffolding, and/or the like) to protect humans from "bots." Such guarding can help keep people away from machines that move forcefully, interact with dangerous materials, etc. FIG. 24A shows a "skin" applied to a robot in accordance with certain example embodiments. This skin may be provided in place of, or in addition to, such physical guarding. The skin can be integrated onto machinery, physical guarding, and/or the like. In the FIG. 24A example, the skin is shown with hatching inside broken lines, and is provided on the robot itself. Operation (e.g., motion) of the machinery onto which the skin is applied can be slowed, paused, stopped, or otherwise controlled as programmed based on detected proximity to or other interaction with a human or other object. For instance, if a human unknowingly comes within a predetermined distance of (e.g., comes too close to) a swinging robot arm, the skin on the robot arm may provide signals to the controller, which detects the human's presence, and safely stops the arm so as to help avoid contact between the human and the robot arm. In a similar vein, the skin on the robot arm may provide signals to the controller, which detects the human's presence, and takes different actions based on how far the person is from the equipment. For example, a visual and/or auditory warnings can be triggered when the person comes within a first threshold distance, the machinery can be slowed when the person comes within a second threshold distance, the machinery can be stopped when the person comes within a third threshold distance (e.g., within or nearly within a contact range and thus is deemed too close), etc.

Figure 24B:
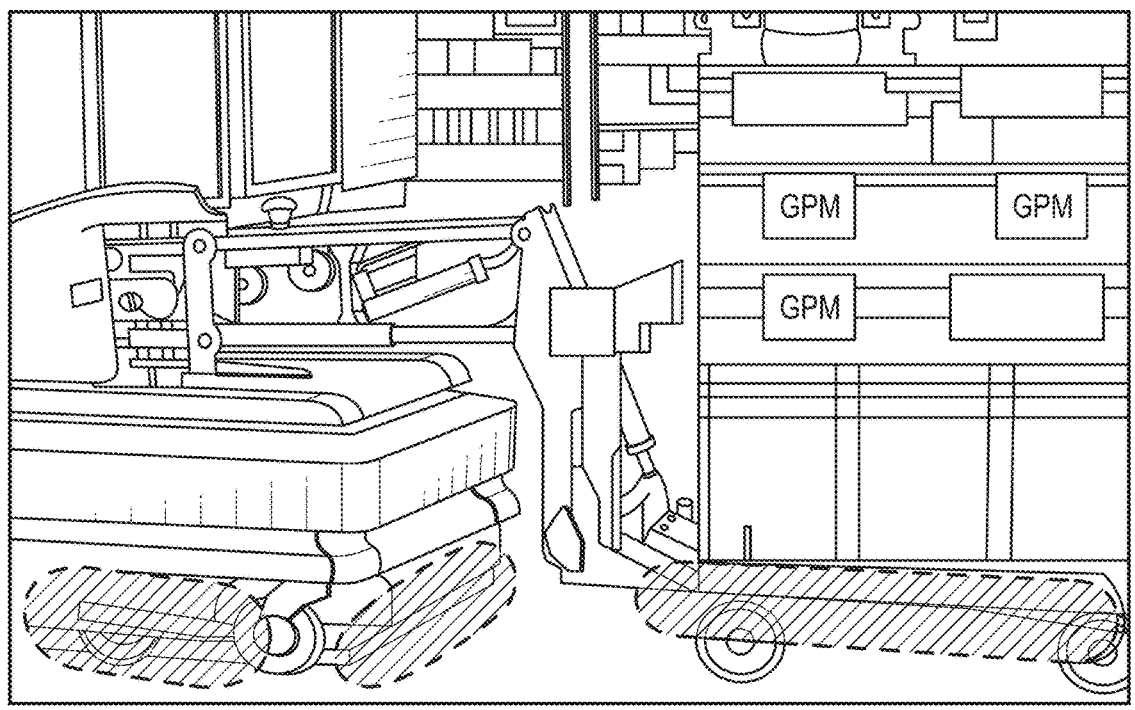
FIG. 24B shows the technology disclosed herein being used on a mobile cart in a manner that helps plug vision gaps, in accordance with certain example embodiments.

Sometimes, in some current industrial settings, there are gaps between areas where detectors are provided. For example, a cage set up around a machine may detect interaction with the fencing itself and leave large areas into which humans, animals, or objects can enter. Sometimes mobile carts are daisy-chained together, and there can be gaps between different sections of such carts. Other examples also exist. The technology disclosed herein can be used to help close these potentially hazardous sensing gaps. The technology can be used to augment and/or replace visioning systems that might leave gaps that could create risks. FIG. 24B, for example, shows the technology disclosed herein being used on a mobile cart in a manner that helps plug vision gaps (e.g., blind spots), in accordance with certain example embodiments. That is, sensor technology of the type disclosed herein may be provided in the hatched areas shown in broken lines. These areas can help detect issues below wheels, between areas of the cart (e.g., a drive area and a cargo area) and/or between carts, etc. The technology disclosed herein may be used as a retrofit solution in some instances. In other instances, it may be provided with the equipment and gaps that otherwise may exist may be known ahead of time based on, for example, known usage, geometries, and/or other factors relating the equipment itself.

Figure 24C:
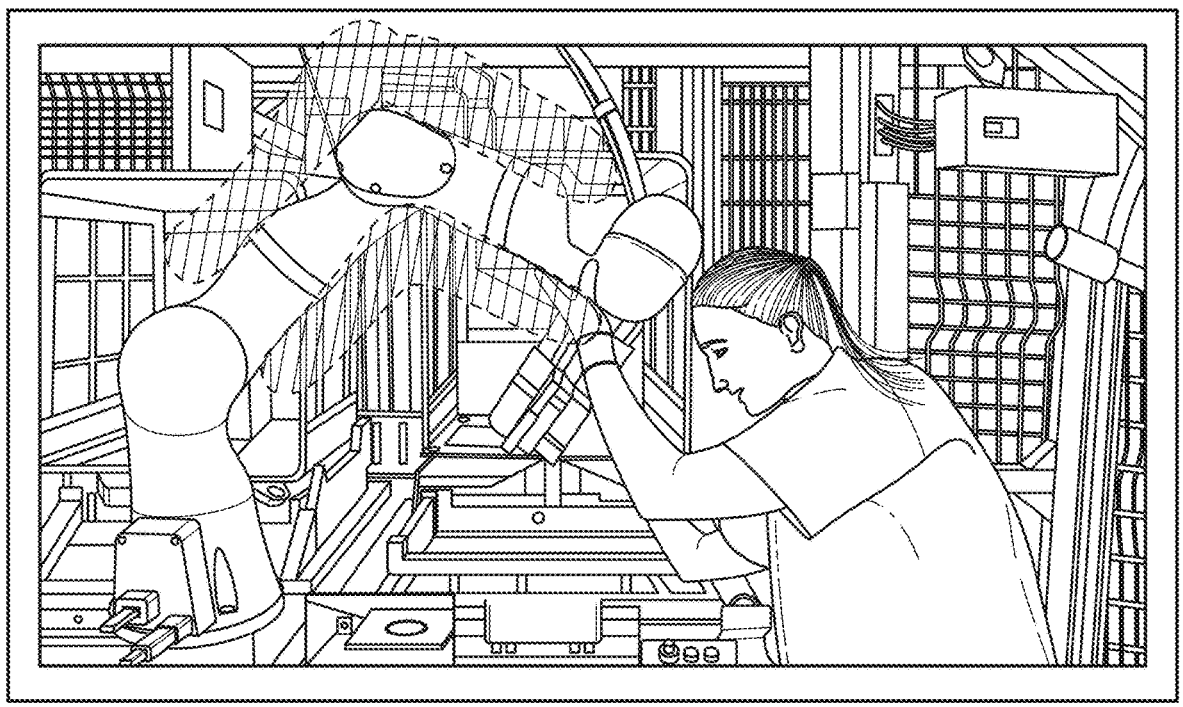
FIG. 24C is an example cobot with a skin applied thereto, which may implement the technology disclosed herein for the above-described and/or other purposes, in accordance with certain example embodiments.

Certain example embodiments also may be used in connection with cobots. Cobots can help humans perform tasks, e.g., on a production line. However, cobot safety systems are still in their infancy, e.g., as cobot technology continues to develop. Sometimes, very expensive pressure sensors or the like are incorporated, e.g., to give the cobot more human-like programmed capabilities. However, these sensors can be replaced and/or supplemented with the technology disclosed herein. In this and other industrial safety system related contexts, the proximity detection and even (simulated or actual) pressure sensing capabilities enabled by certain example embodiments is advantageous compared to force sensors, e.g., because the system can be trained or otherwise programmed to distinguish between different proximities, bumping into a human (which might cause a mitigation plan such as movement away from an area, a safety system being activated, etc.) and bumping into inanimate and or other objects like cardboard boxes (e.g., where there might not be a need to change plans or operations), etc. For example, the technology disclosed herein can be used to help control cobot motion, e.g., by helping to sense the presence of humans and/or human movements. Such detections can help prevent contact to the humans. Machine learning can be employed to help train cobots to understand how humans area likely to use them. For instance, the sensing technology of certain example embodiments can be used to help train a cobot to follow movements in space, potentially without specialized equipment such as specialized "smart gloves" or the like. Instead, a human's natural movements can be sensed within a field projected by or proximate to the cobot. These movements can then be translated into work instructions to be repeated by the cobot or to be expected from a human working with a cobot. Then, if movements out of the ordinary are detected, the cobot can react accordingly by, for example, stopping, pausing, sounding an alarm to indicate a likely issue with the human co-operator; etc. FIG. 24C is an example cobot with a skin applied thereto (shown in with hatching inside of broken lines), which may implement the technology disclosed herein for the above-described and/or other purposes, in accordance with certain example embodiments. Here, as with other applications and use cases, omnidirectional sensing becomes a possibility.

Example Loading and Shipping Related Technology

Figure 25A:
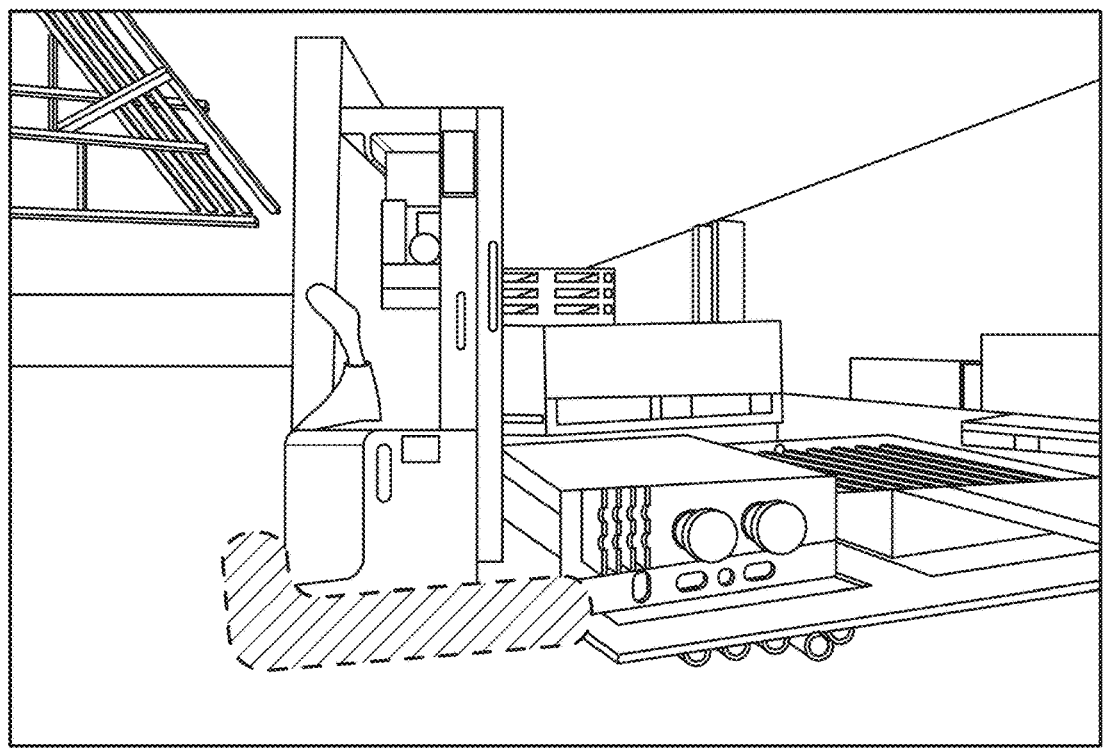
FIG. 25A shows the technology disclosed herein being implemented on a mobile loader in accordance with certain example embodiments.

The technology disclosed herein may be used to provide safer and/or more automated loading/unloading and shipping related functions. For example, pedestrians oftentimes can be "missed" when items are being moved, loaded/unloaded, and/or the like. This may occur in the context of automated guided vehicles (AGVs) that have not been properly trained or that cannot respond quickly enough, as well as with human-operated machinery (e.g., because humans may have their vision obscured by the machinery and/or the items being moved, human movements are sometimes unpredictable, distractions occur, etc.). The technology disclosed herein also may be useful for "blind area" detections such as, for example, detections around corners or "through" objects, in operator "blind spots," in low light or otherwise occluded or obscured areas where other sensors (like laser-based systems) may not function, and/or the like. FIG. 25A shows the technology disclosed herein being implemented on a mobile loader in accordance with certain example embodiments. That is, the sensing area may be defined in hatched area inside of the broken lines in this example. Having sensors here can help detect humans or other objects, potentially regardless of whether they are in a sensing path, regardless of whether they are wearing transponders or the like, etc. Automated control may take over to redirect a machine, slow or stop it, sound an alarm, etc. This technology may be used in connection with defined paths, transponders, and/or the like. In general, however, the technology may be used to detect proximity and/or touch.

Figure 25B:
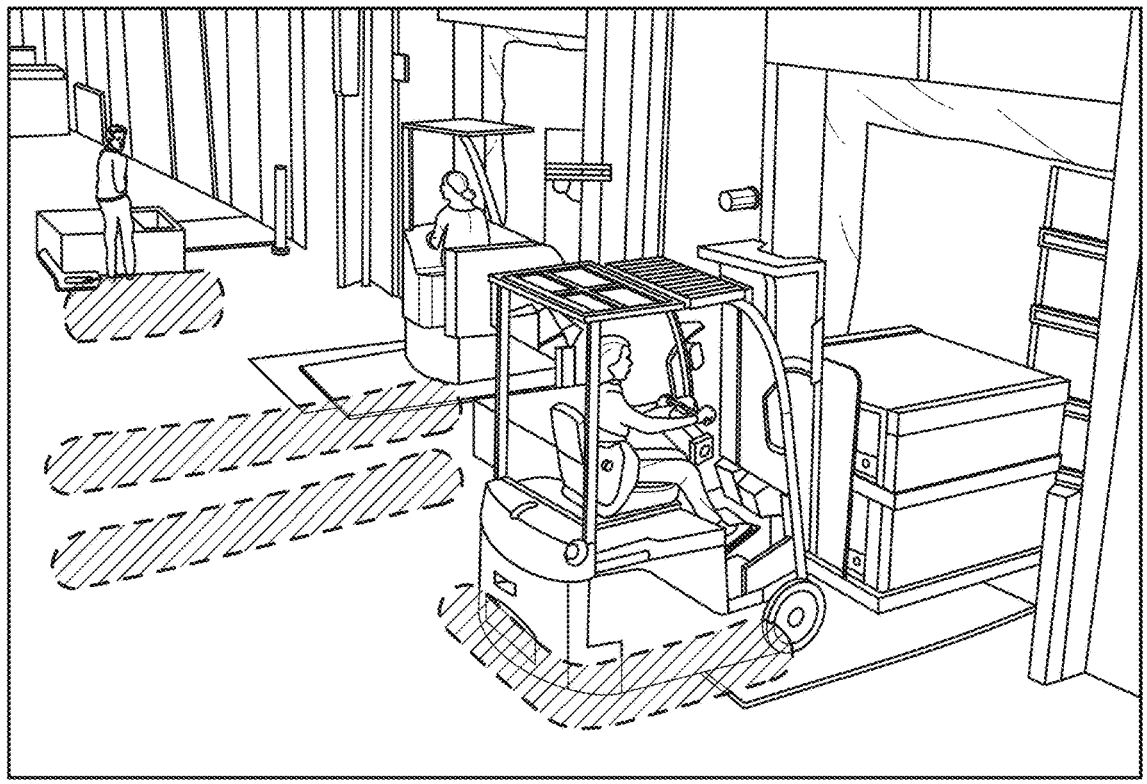
FIG. 25B shows defined shipping areas provided in the floor and sensors defined on the machinery in accordance with certain example embodiments.

With many moving parts (including human and machine parts), collisions can occur. When loading/unloading in shipping areas, for example, objects may need to get in or out a doorway, loading dock, or other area. A crew may be needed. However, a machine operator and individual crew members may not be aware of what each other person is doing. This may be especially true if there are multiple doors, docks, and/or the like in close relative proximity (e.g., adjacent) to one another. FIG. 25B shows defined shipping areas provided in the floor and sensors defined on the machinery in accordance with certain example embodiments. Sensors and/or transponders also may be provided on humans working in the area to increase detection distance. The controller may be configured to control the machinery moving the objects to stop if it comes within proximity to a protected area on the floor, within a human, and/or the like.

Figure 25C:
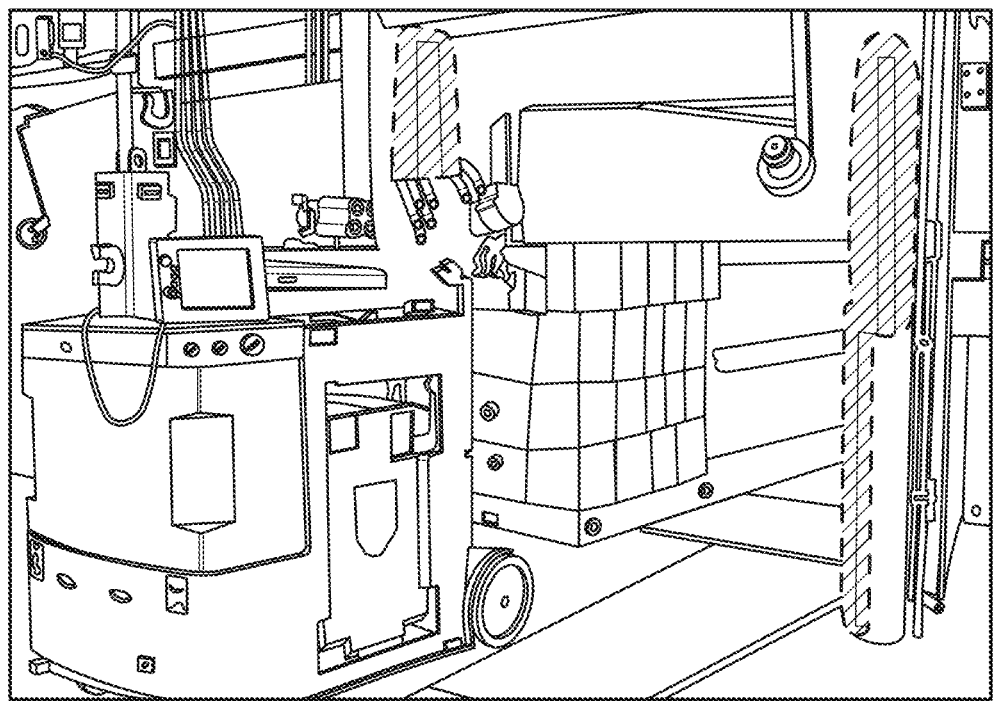
FIG. 25C shows conductive areas provided on the outside of a shipping area that can be used to guide a suitably equipped auto-loader in accordance with certain example embodiments.

As perhaps alluded to above, some loading/unloading operations are performed automatically. For example, some auto-loaders move containers into and out of units. These auto-loaders tend to turn off their sensors in tight spaces, e.g., because they function poorly in such situations. For example, LIDAR systems can be quite susceptible to backscatter, visioning systems can function poorly in low light, etc. There is thus a potential for a gap in sensing when at least some sensors are turned off. Certain example embodiments employ sensor technology to improve upon these approaches. For example, loading equipment can have sensors embedded thereon, and conductive features can be used to guide the equipment into and out of the area. This can work because the electrical field can be generated, and the machine can be guided (e.g., controlled to steer in different directions) as a function of electrical signal strength/guides as if there were proximity or gesture detection. FIG. 25C, for example, shows conductive and/or sensing areas (in hatches inside of broken lines) provided on the outside of a shipping area that can be used to guide a suitably equipped autoloader in accordance with certain example embodiments. Pallet/inventory tracking techniques can be complex and expensive, especially if trying to use tracking systems for safety purposes too. The approaches disclosed herein can provide one or both services at a potentially more cost effective and efficacious package.

Example Access and Fencing Related Technology

Certain example embodiments provide accessing and fencing solutions that can help protect workers from potentially hazardous equipment. Such systems can, in different example embodiments, raise alerts, alarms, and/or otherwise alter the operation of the equipment (e.g., by disabling them, controlling their movements, etc.).

Figure 26A:
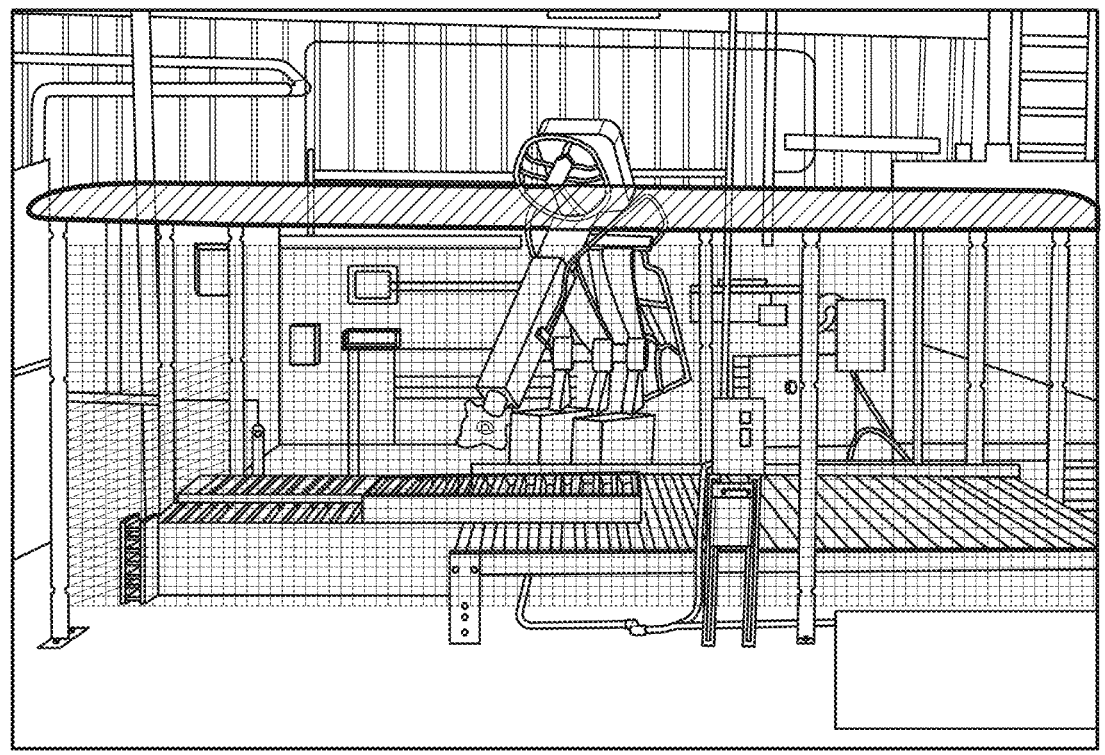
FIG. 26A shows a smart fencing solution that can be used with or in place of an existing fence in different example embodiments.

When it comes to machine guarding, for example, some existing solutions involve light curtains that have known difficulties being implemented in the field; fencing, which is known to be expensive, inflexible, and oftentimes easy to defeat; etc. With regard to the latter, some current fencing approaches simply put a barrier in place. These barriers can be cost and space intensive, and they can lack the ability to sense and act in a responsive manner FIG. 26A shows a smart fencing solution that can be used with or in place of an existing fence in different example embodiments. In FIG. 26A, only the area across the top of the fence is shown as being provided with sensing ability. This is because a physical barrier is provided around the other surfaces. In this case, the technology disclosed herein may be useful in providing supplemental protection, e.g., for existing protections like those in FIG. 26A where side fencing is provided through physical barriers and where additional detection ability is provided via the upper sensing surface. However, it will be appreciated that some or all of the other portions of the existing fence may be supplemented or even replaced with the sensing technology of certain example embodiments. A "smart fencing" solution can help fencing systems respond to situations in real time. For example, if a person or piece of equipment is approaching a restricted space, an alert can be generated, a door or gate can be closed, etc. If a person or piece of equipment enters a restricted space, then action can be taken with respect to the equipment in that space (e.g., it can be shut down, paused, slowed, etc.).

Figure 26B:
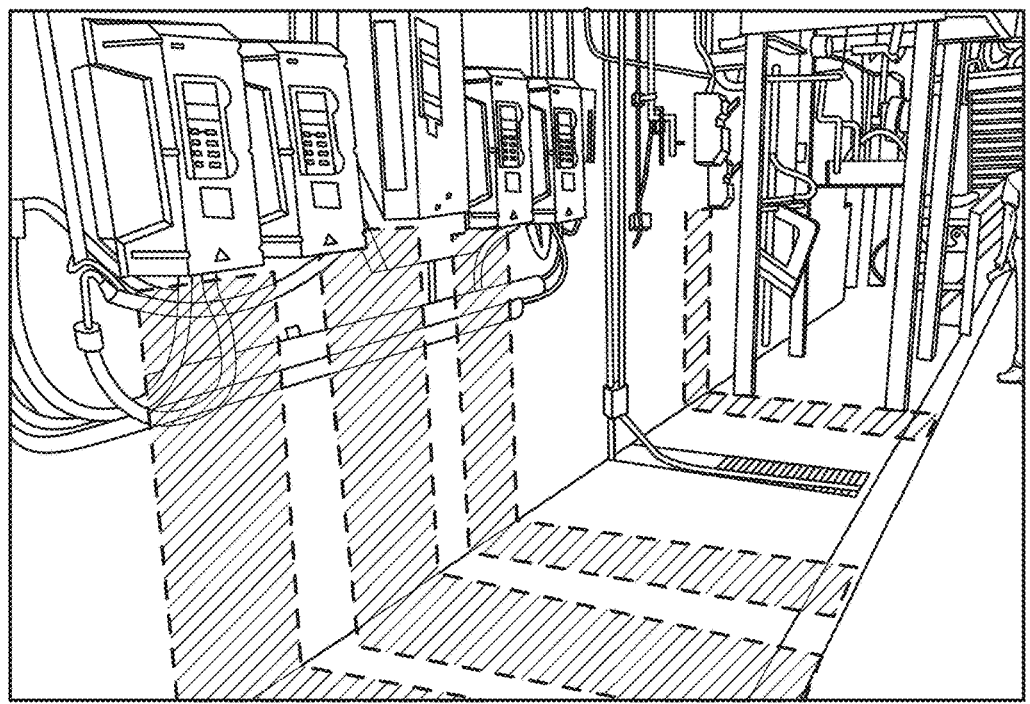
FIG. 26B shows how the technology disclosed herein can be used to provide real-time compliance related updates in accordance with certain example embodiments.

In some instances, compliance situations may be compromised, e.g., by having cluttered areas. For example, the U.S. Occupational Safety and Health Administration (OSHA) in some instances publishes regulations regarding access-ways, e.g., to different equipment, breakers, and/or the like. FIG. 26B shows how the technology disclosed herein can be used to provide real-time compliance related updates in accordance with certain example embodiments. That is, it is possible to define areas that need to remain uncluttered and use the technology disclosed herein to determine whether there are items in the way of such areas. The geometries of these areas can be custom-defined to meet requirements of the regulations, best practices, specific construction of the building or other area, etc. Moreover, the system can be programmed, or learn, to sense when there are temporary obstructions (such as, a person or piece of equipment legitimately crossing a path or temporarily standing in one place) and differentiate such situations from non-compliant blockages. In some instances, compliance-based reporting can be automated.

Figure 26C:
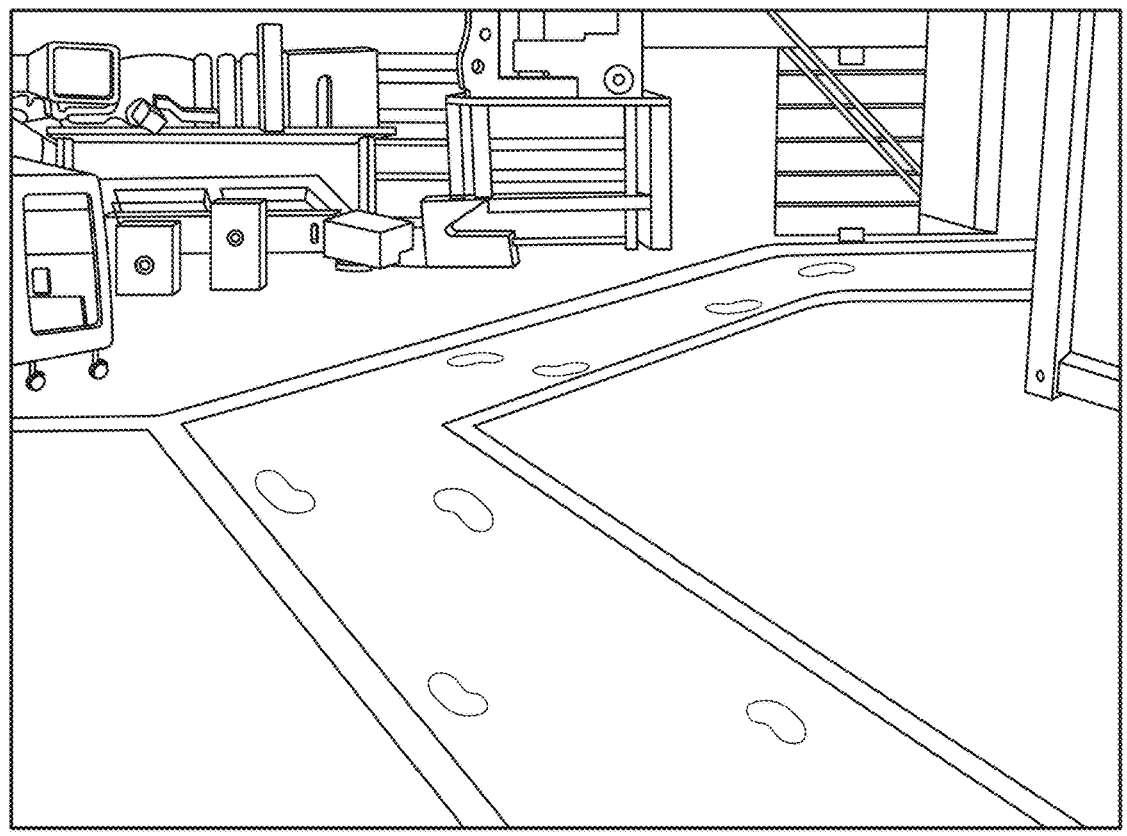
FIG. 26C shows a defined walkway, which may benefit from the techniques disclosed herein, in accordance with certain example embodiments.

FIG. 26C shows a defined walkway, which may benefit from the techniques disclosed herein, in accordance with certain example embodiments. Sometimes, people step outside of walkways or other designated safe areas. Walkways are helpful visually, but they do not alert, alarm, and disable hazards when they are crossed. The technology disclosed herein can be used with active means to detect when a person steps outside of a defined area, or when a piece of equipment moves outside of a defined (on purpose or accidentally), and active measures can be taken to alert, alarm, and/or control the functioning of equipment in the facility.

FIG. 26C describes a situation for detecting when someone steps outside of a defined area. However, it will be appreciated that the technology disclosed herein can be used to detect when someone steps inside of a defined (potentially "off-limits") area, across a plane/threshold delineating a defined (e.g., off-limits) area, etc. In other words, in different use cases, the defined area may be an area where people are permitted, or from which people are prohibited.

Example Holistic Sensing Related Technology

Figure 27:
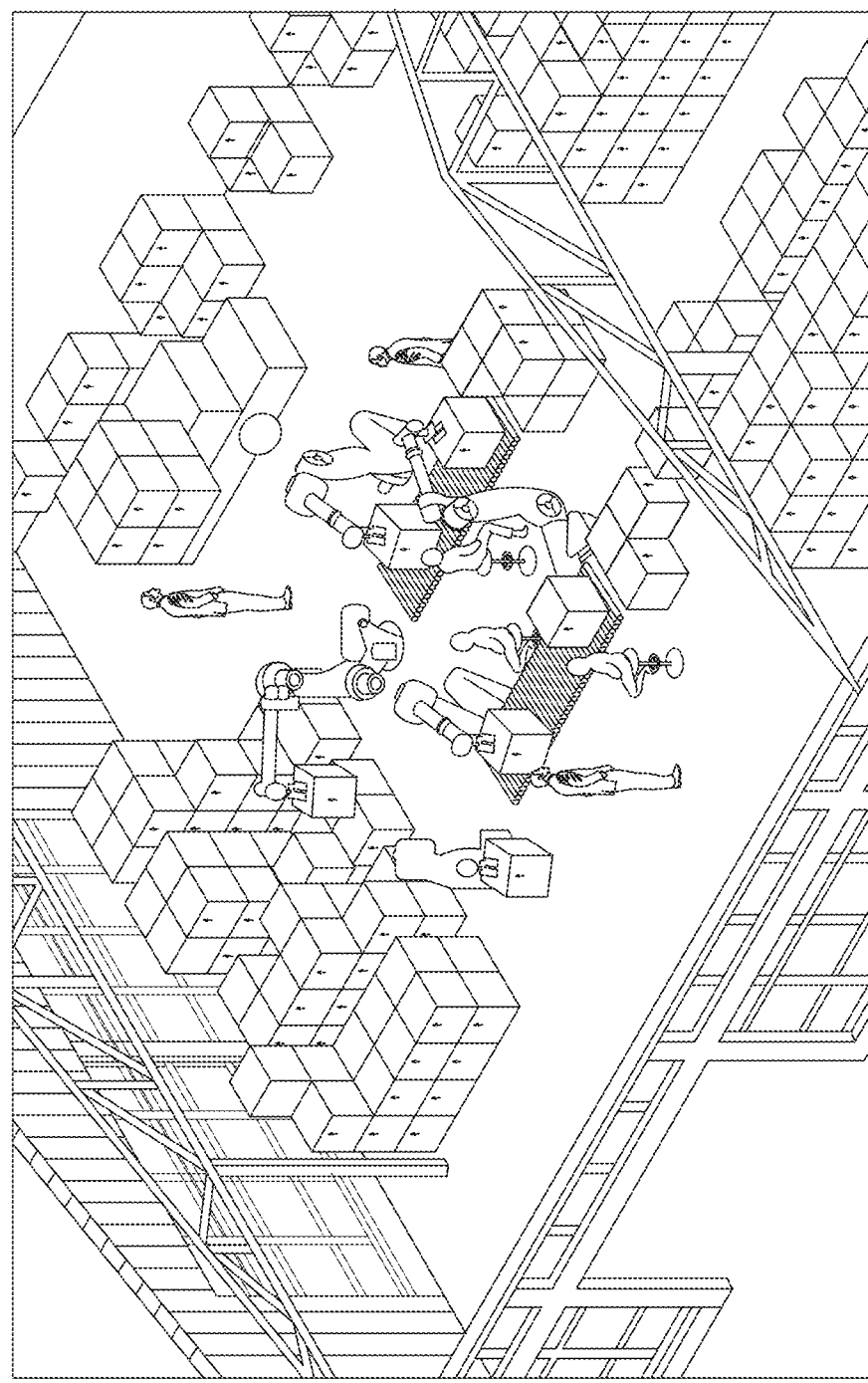
FIG. 27 shows how the techniques disclosed herein can be used to provide a holistic view into an entire operation area, in accordance with certain example embodiments.

FIG. 27 shows how the techniques disclosed herein can be used to provide a holistic view into an entire operation area, in accordance with certain example embodiments. For example, fixed machines, loaders/trucks, humans, materials, goods, accessories (including palettes), and other objects will all have their own unique electrical fields. These fields can be discerned and used to help monitor who and what is "on the floor," where people and things are, whether compliance is met in terms of keeping access lanes clear, at least rough inventory control, etc. This information can be used to inform transportation/logistics systems, drive information displays, help with accounting- and/or audit-related functions, etc. From a holistic standpoint, and as discussed above, features can be provided relating to machine safety (including with interaction points on, for example, large "unique" equipment like corrugators, broadly applicable equipment like wrappers, etc.; moving goods in connection with conveyers, floor/inventory control, loading/unloading and shipping; traffic areas including for prohibited spaces, pedestrian walkways, emergency people location services, etc.; robotics and automation in connection with industrial robots, automated mobile vehicles, cobots, etc.; and/or the like.

As will be appreciated from the above, certain example embodiments enable potentially low-fidelity sensing data to be converted into high-value insights and actionable information. For example, surfaces can measure and "feel" phenomena in the physical world and use that data to improve digital and physical processes. This can be accomplished by leveraging novel algorithms and AI applied to sensing technologies that are integrated into larger product eco-systems, etc., in different example embodiments.

The technology disclosed herein is advantageous for a number of different reasons. For example, in certain example embodiments:

It is adaptable, in that it can be applied to virtually any surface, regardless of material, shape, or size;

It includes simple components and architecture, and can be implemented using edge-computing technology; and Durable, in that it can be designed for implementations that are resistant to environment factors such as dust, sun, water, vibrations, heat, cold, humidity, and/or the like.

The approach is advantageous in that bumps and/or minor collisions are unlikely to misalign the sensor. This promotes ease of maintenance, which complements ease of applicability (which may be provided by a suitably enabled applique or mat, epoxy-painted area, and/or the like).

It is noted that the "skin" related techniques may be used in connection with cobots and non cobot machinery in industrial safety and/or non-industrial safety applications.

Figure 41A:
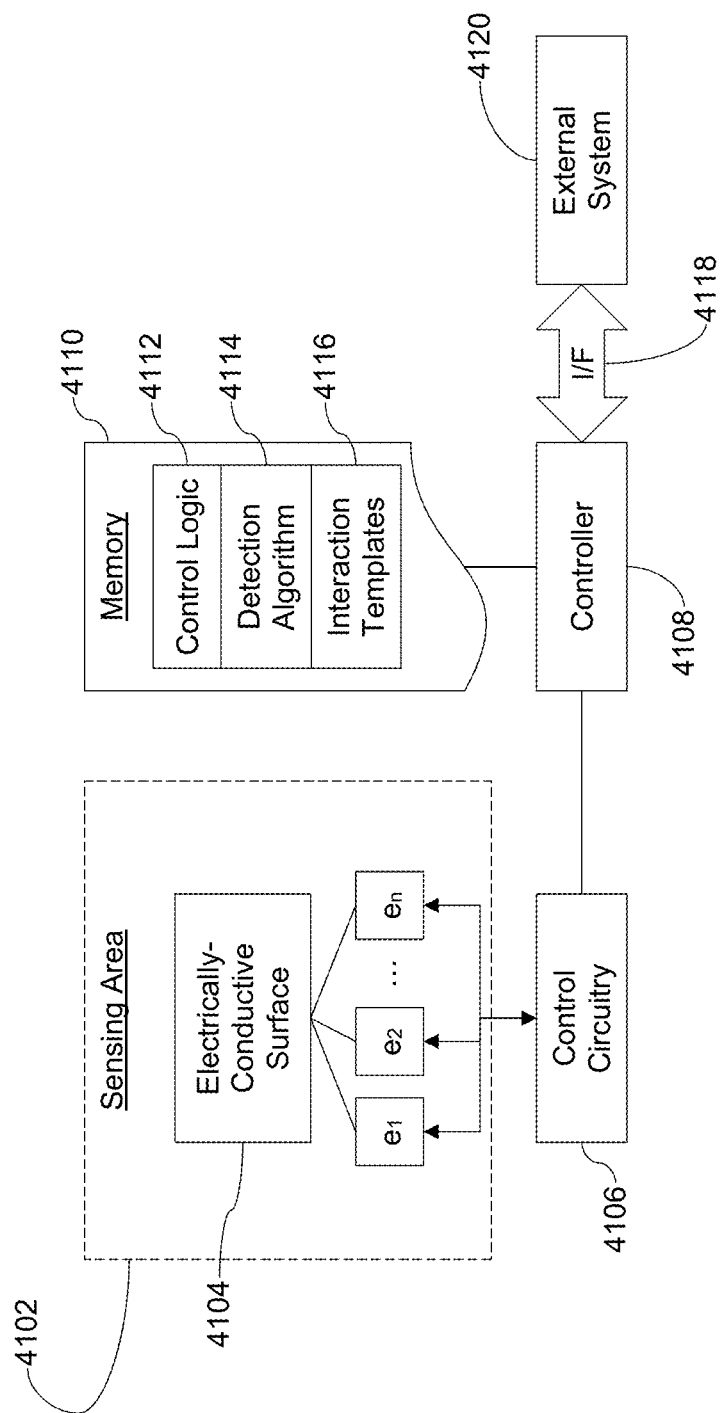
FIG. 41A is a block diagram of a system for a detection system in accordance with certain example embodiments.

Example Technology Platform for Creating and
Passively Detecting Changes in Electrical Fields FIG. 41A is a block diagram of a system for a detection system in accordance with certain example embodiments. The FIG. 41A example system creates, and passively detects, changes in electrical fields. These changes are, broadly speaking, caused by interactions with the electrical field, e.g., via shunting, constructive or destructive interference, or other electrical impacts. The field is created for a sensing area 4102 by an electrically-conductive surface 4104, which has at least two electrodes (including $e_1$, $e_2$, ... $e_n$ in the FIG. 41A example) electrically connected thereto. Current is provided to the electrodes $e_1$, $e_2$, ... $e_n$ via control circuitry 4106, which may match some or all of the components shown in, and described above in connection with, FIG. 7. In brief, current is provided to the electrodes $e_1$, $e_2$, ... $e_n$. An interaction with the electrical field that is created in the sensing area 4102 will cause a voltage drop that is observable by the control circuitry 4106.

The sensing area 4102 is definable in X, Y, and/or Z dimensions. "True" omnidirectional sensing is possible. That is, the sensing area 4102 can be defined to be any or all of area surrounding the system. Certain systems may purport to provide 360 degree sensing, but the sensors oftentimes are limited in that they cannot "see through" the equipment on which they are mounted or otherwise connected. For instance, 360 degree cameras are at least in theory possible, but they cannot "see through" the machine on which they are mounted. In contrast, the electrical field created by certain example embodiments can be on any side of the machine, even its underside and even if occluded by the machine itself, because the field can project that far and through the machinery. This may be useful for mobile equipment to detect obstacles on any side thereof, including potential obstacles on the ground (e.g., spikes, broken glass, or the like), or to use it to guide the vehicle by following a defined pattern while also detecting potential oncoming obstacles like humans who might walk into the defined path. The sensing area 4102 may have a rectilinear or non-rectilinear shape. Likewise, the shape of the sensing area 4102 may be regular or irregular. The size, shape, and arrangement of the sensing area 4102 may be determined based on the particular application. For instance, the sensing area 4102 may be defined as a portion of a machine such as at a pinch-pint or arm accession area; an area around a human-operated mobile machine such as a forklift or fork truck or an AGV or the like (e.g., so that detections are possible outside of specific defined places as the machinery is mobile and/or potentially unguarded); on or around a skin of a robot or cobot; a prohibited space such as in front of an area to which access is required; interior or exterior to a walkway, crossing, or other defined path; interior or exterior to a control or operator area; interior or exterior to a control or operator area. The sensing area 4102 could be provided so as to take the place of at least a bottom, side, lower, and/or upper portion of a glass, plastic, wire, or other barrier and, in this respect, it could be provided with a glass, plastic, wire, or other barrier.

A variety of different materials and/or constructions can be used for the electrically-conductive surface 4104. For instance, the electrically-conductive surface 4104 could be a dedicated article such as, for example, a conductive mat, conductive ceiling or wall panel, substrate (which may or may not be transparent), or the like. In other cases, the electrically-conductive surface 4104 could be an applique such as a film or tape that includes conductive elements. In still other cases, the electrically-conductive surface 4104 could be includes a sprayed-on conductive material such as a paint or a thin film or other coating. In yet other cases, the electrically-conductive surface 4104 could include conductive particles or other elements laminated, molded, or embedded in an article such as, for example, a mat, floor, ceiling or wall panel, or the like. The electrically-conductive surface 4104 can be integral with or attached to an article in or proximate to the sensing area 4102. For example, the electrically-conductive surface 4104 can be attached to a fence or other guard structure, provided in or near a control room or operator area, connected as a skin on a robot or cobot, etc. The electrically-conductive surface 4104 preferably has a sheet resistance in the ranges identified above.

The field-defining electrodes $e_1$, $e_2$, ... $e_n$ can be formed as dedicated attachable components in certain example embodiments. For instance, puck-like electrodes can be (re)positionable on the electrically-conductive surface 4104 in some instance. In other instances, the field-defining electrodes $e_1$, $e_2$, ... $e_n$ can be formed as wires or wire leads, printed conductors, or other electrically-conductive materials. In certain example embodiments, the field-defining electrodes $e_1$, $e_2$, ... $e_n$ are in, around, or otherwise proximate to the sensing area 4102. The field-defining electrodes may be electrically connected to the conductive surface in any appropriate manner. For example, in certain example embodiments, the electrodes may be provided in a tape or roll form. Individual electrodes may directly contact (e.g., be in a plane of contact with) the conductive surface, or otherwise be electrically connected thereto (e.g., by connecting with leads from the conductive surface, by having leads therefrom directly contact the conductive surface, etc.).

In certain example embodiments, the field-defining electrodes $e_1$, $e_2$, ... $e_n$ are provided around at least one peripheral edge of the sensing area 4102. This may be useful for guarding applications, applications that incorporate a transparent interface (such as, for example, public information displays, touch screen devices, etc.), etc. In different example embodiments, the field-defining electrodes $e_1$, $e_2$, ... $e_n$ are provided within the sensing area 4102, which may be possible when a transparent interface is not required (such as, for example, when monitoring pinch points in machinery, when provided as a sensor on an AGV or the like, etc.).

The field-defining electrodes $e_1$, $e_2$, ... $e_n$ may be provided on the same plane as one another, or they may be provided on different planes. Similarly, the field-defining electrodes $e_1$, $e_2$, ... $e_n$ may be provided on the same plane as, or a different plane from, the electrically-conductive surface 4104. In certain example embodiments, the electrically-conductive surface 4104 may be provided on a first plane, and at least one (and possibly all) of the field-defining electrodes may be provided on one or more planes other than the first plane. This arrangement may be useful for a guarding application, e.g., where field-defining electrodes $e_1$, $e_2$, ... $e_n$ are provided as wires on opposing sides of a doorframe or entryway and the electrically-conductive surface 4104 is on the floor, upper casing, or other area. For object and/or human tracking applications, for example, it may be desirable to have the electrically-conductive surface 4104 and the field-defining electrodes $e_1$, $e_2$, ... $e_n$ provided on parallel (e.g., floor and ceiling) or perpendicular (e.g., ceiling and wall or floor and wall) planes. It will be appreciated that, when the electrodes are formed as wires or wire leads and are described as being on different planes compared to the electrically-conductive surface 4104, it will be appreciated that at least a part of the electrodes (e.g., the distal terminal parts thereof) are provided on different planes, as the electrodes are still electrically connected to the electrically-conductive surface 4104. In certain example embodiments, the conductive surface and/or field defining electrodes may be positioned and/or insulated to control the directionality of the field. This may be useful in preventing stray signals from another area (e.g., on another side of a wall or outside of a detection zone) from triggering an unintended or otherwise spurious effect.

Referring once again to FIG. 41A, the control circuitry 4106 operates under the control of a controller 4108. The controller 4108, in turn, has a memory 4110 operably coupled thereto. The memory 4110 includes control logic 4112, a detection algorithm 4114, and interaction templates 4116. The control logic 4112 is coordinating program logic that helps the controller 4108 and the control circuitry 4106 cooperate to create the field and passively monitor for changes therein. That is, the created electrical field is made to function as a passive sensor for the detection system.

The detection algorithm 4114 helps to monitor for changes with the electrical field that might be indicative of an interaction with the electrical field. It uses data derived from output from at least some of the electrodes $e_1, e_2, \ldots e_n$. Interactions have characteristics including three-dimensional spatial and timing characteristics. That is, each interaction will have a spatial coordinate and timestamp associated therewith, providing x, y, z, and t data. The detection algorithm 4114 may be any one or more of the above-described or other algorithms.

In some cases, the detection algorithm 4114 alone may generate output indicative of an interaction. For instance, for simple one-touch functionality, and for some hover or proximity operations, the detection algorithm 4114 may produce sufficient data to enable the system to function. In other cases, a determination may be made as to whether the interaction matches one or more defined interaction templates 4116. As discussed below, the interaction templates 4116 help distinguish between different interaction types (e.g., different detectable disturbances to the electrical field) and/or characteristics thereof. For example, for situations where it is desirable to detect complex gestures, the presence or absence of a particular type of material, etc. If a determination is made that a detected interaction matches one of the defined templates, or if no such determination is necessary and output can be discerned from just the detection algorithm 4114, a corresponding action may or may not be triggered, e.g., depending on characteristics of the interaction. For instance, in a proximity detection system, the presence of a human or other object might be detected as an interaction or disturbance to the electrical field. However, the corresponding template may specify that actions should not be taken if the interaction is beyond a threshold distance. Likewise, the corresponding template may specify that different actions should be taken based on different distances or distance thresholds, proximity, location, trajectory, incoming or other velocity, type of object detected, whether the object has passed through or entered into a defined area, etc.

Certain example embodiments run the detection algorithm 4114 and process template data for the interaction templates 4116 without having to reconstruct the entire electrical field. In other words, it is possible to (a) monitor for changes with the electrical field based on data derived from output from at least some of the electrodes, with that data potentially being indicative of an interaction with the sensing area 4102, and (b) determine characteristics of the interaction, without reconstructing the entire electrical field.

The control logic 4112 may instruct the controller 4108 based on the output of the interaction templates 4116. For instance, the controller 4108 may use an interface 4118 to interaction with an external system 4120 based on signals from the control logic 4112 that in turn depend on output from the interaction templates 4116. The external system 4120 may be a vehicle control system (which may cause the corresponding vehicle to slow down, stop, redirect, etc.), a display device (which may be caused to register touch or gestures as input and update automatically), an inventory tracking or management system (which may be updated to indicate receipt or shipment of a tracked good), etc. The interface 4118 may be an interface to a control system of a machine used in loading/unloading operations, and the control system of the machine may be controllable in response to disturbances to the electrical field during loading/unloading operations. In this regard, the electrically-conductive surface may correspond to one or more pained, marked, or otherwise designated walls of the container or vehicle into/from which the objects are being loaded/unloaded. In certain example embodiments, an interface to a scheduling system may be provided and detections may relate to unplanned and/or unexpected disturbances to the electrical field caused by a perturbation emanating from a human, other machinery, a structure, a recognizable electronic signal, pest, or debris. In this regard, the scheduling system may indicate where people, goods, and/or other objects, are supposed to be located (or not located), and a deviation from this detected by the system in operation can be detected as an error. The interface 4118 may be any suitable computer-mediated interface. Hardware and/or software components may be included. For instance, an application programming interface (API) may be used with a wired or wireless connection to the external system 4120.

Figure 41B:
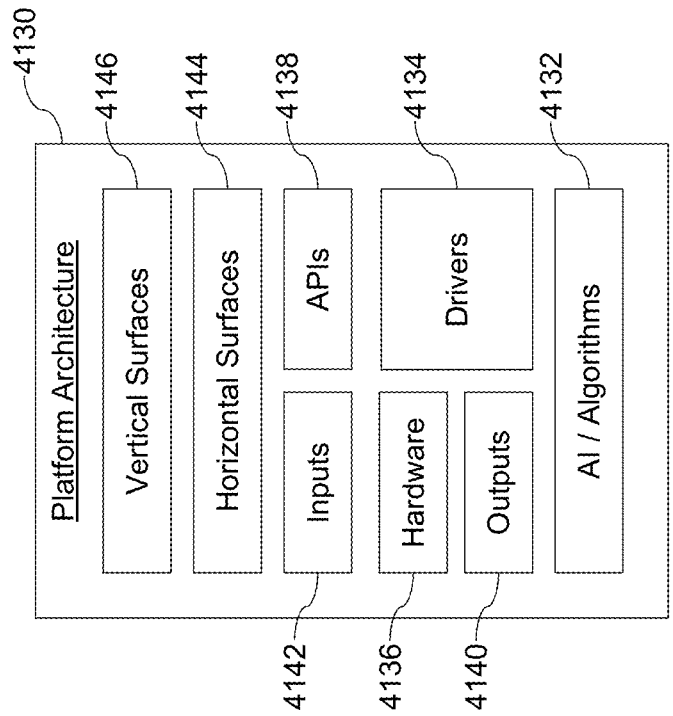
FIG. 41B shows an example platform architecture stack in accordance with certain example embodiments

FIG. 41B shows an example platform architecture stack 4130 in accordance with certain example embodiments. The FIG. 41B example platform architecture stack 4130 includes AI and other algorithms 4132. The AI and other algorithms 4132 are capable of learning over time to better enable the platform to accommodate different types of behaviors and to better understand user intent. The AI and other algorithms 4132 may include categorization, recognition, prediction, and other functions. Drivers 4134 are interfaces that control hardware elements 4136 and allow their functionality to be controlled and/or understood by software, including the AI and other algorithms 4132. The hardware elements 4136 are the physical elements of the platform and include the sensing system itself, physical controls, displays, and/or any other physical components that may be provided (e.g., cameras, motion sensors, haptics, speakers, etc.). The APIs 4138 enable communications between different software and/or other components. Outputs 4140 include responses of the platform to users or other parties. Outputs 4140 can include, for example, sounds, lighting, display changes, haptic feedback, and/or the like. Inputs 4132 in this context refers to user-facing interactive elements that include interaction paradigms for interacting with and managing functions, content, animations, and/or the like. horizontal and vertical surfaces 4144 and 4146 are elements in the environment that can include, for example, tabletops, counters, desks, floors, ceilings, platforms, rugs, mats, walls, windows, doors, panels or separators, lockers, signage, etc.

Figure 42:
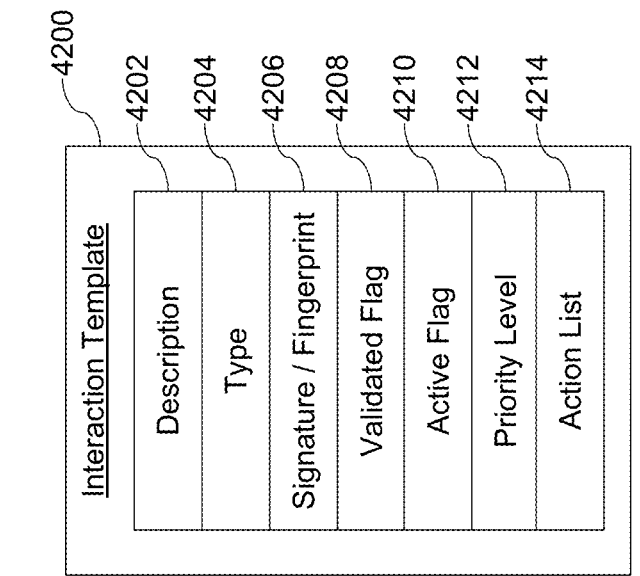
FIG. 42 shows the contents of an interaction template in accordance with certain example embodiments.

FIG. 42 shows the contents of an interaction template 4200 in accordance with certain example embodiments. The interaction template 4200 in the FIG. 42 example includes a plain, human-understandable description 4202 of what the particular interaction template 4200 is designed for. For instance, the description 4202 may indicate in "plain language" that the particular interaction template 4200 is for detecting a certain kind of gesture made with a hand, a particular type of contaminant that might enter into a defined area, etc. Type information 4204 describes the general subject matter of the particular interaction template 4200. For instance, the type information 4204 also may be hierarchical. For instance, at a first level, the type information 4204 may distinguish between gestures, touches, and hover interactions. At a second level with the gesture type, further type information 4204 may distinguish between pan or swipe left, pan or swipe right, checkmark, freeform draw, or the like. In certain example embodiments, a taxonomy may be provided for this type information 4204, and the taxonomy may be a multilevel hierarchical taxonomy in some instances.

The signature/fingerprint 4206 is a collection of data defining the particular interaction template. For example, each interaction may be characterized by a series of normalized voltage-related measurements. By identifying key components, a "signature" or "fingerprint" of the different interactions can be cataloged and associated with the different templates. In some instances, the signatures or fingerprints of the various templates may be preprogrammed, e.g. before the detection system is shipped, installed, and/or activated. In other instances, the signatures or fingerprints of the various templates may be defined onsite, e.g., through a training, configuration, or calibration program. In still other instances, the signatures or fingerprints of the various templates may be machine-learned, e.g., over time and potentially through actual usage of the detection system. In some instances, specific fingerprints may be generated by electromagnetic field disrupters, including electronic devices in the form of specific tags or markers. These tags or markers may cause specific patterns or specific recognizable disturbances to the electrical field. This may be useful in guiding AGVs to/from an area (e.g., which could be useful during loading/unloading operations); signaling the presence of a human or obstacle (e.g., which could be useful to help signal to humans or machinery that a person or obstacle is present); marking goods (which could be useful in inventory tracking and/or other scenarios); etc. In general, recognizable electronic signals can be made to emanate from placed markers, such as markers placed on humans, near a defined path, near an area that cannot be blocked, and/or the like. The marker itself can output a defined constant or fixed signal, or a pattern or signals that is distinguishable from other signals and recognizable as being from a placed marker.

In some instances, different templates may be proposed and require an authorized human to indicate that they are valid. This may occur with signatures or fingerprints that are developed through a training, configuration, or calibration program, or are machine learned, and/or potentially even for preprogrammed scenarios. The validated flag 4208 is used to signal whether the particular interaction template 4200 is validated in this way. In some instances, unvalidated interaction templates may not be activated. That is, in some instances, interactions unvalidated interaction templates may not be registered by the detection system.

In a similar manner, an active flag 4210 indicates whether the particular interaction template 4200 is eligible to be registered by the detection system when the detection system is in use. Unvalidated interaction templates may flagged as invalid. In other instances, templates that are not used because of circumstances of where or how the detection system is deployed may be flagged as inactive. For instance, a detection system providing guarding over a vat of peanut butter may have interaction templates activated to detect pests but may not have activated gesture-related interaction templates. Conversely, a public information display may have activated gesture-related interaction templates but have inactivated templates for detecting pests.

The priority level 4212 is a numeric or other indicator of the severity of the particular interaction template 4200. This information may be used, for example, to prioritize which interactions are most important to respond to. For instance, in an industrial safety setting, it may be more important to respond to a system-detected runaway forklift compared to a piece of machinery being placed in a designated walkway. As another example, it may be more important to respond to a touch to a public information display compared to a simultaneous hover interaction. Thus, it will be appreciated that a severity level may be assigned to each template and, when multiple interactions are detected, actions may be triggered in accordance with the different respective severity levels.

In this regard, multiple interactions may be detected at the same time, and/or in close or overlapping temporal proximity to one another. In certain example embodiments, the controller 4108 is configured to determine whether multiple interactions with the sensing area 4102 are occurring at the same time, and/or in close or overlapping temporal proximity to one another; determine whether each of these multiple interactions match one of the defined templates without reconstructing the entire electrical field; and responsive to a determination that more than one of the multiple interaction match one of the defined templates, selectively triggering the corresponding action(s) based on one or more of the characteristics of the interaction. The prioritization of actions for multiple detections may be in accordance with the priority level information for the respective templates. In other cases, the prioritization may be based on a heuristic such as, for example, first-in first-out (FIFO), last-in first-out (LIFO), and/or the like. The memory 4110 may maintain a suitable data structure for processing prioritization such as, for example, a queue (or priority queue) or stack data structure. Elements in the queue or stack data structure may point to the template, characteristics of the interaction, and aspects of the actions. Alternatively, or in addition, the actions themselves may be enqueued to a queue data structure, pushed to a stack data structure, or the like, and the control logic 4112 may process items therefrom.

The action list 4214 specifies what, if any, action(s) should be taken in response to a determination that the particular interaction associated with the interaction template is detected. The action list 4214 may include one or more actions in different example embodiments, and those actions may have conditional logic associated therewith. In the case of a touch interaction, the action may be to simply output the coordinates and timestamp. However, in the case of a guarding application, different actions may be specified for different proximities. The conditional logic may, for example, specify that no action should be taken if a person or object is detected beyond a first threshold distance from a guarded area, that an auditory and/or visual alarm should be sounded if the person or object is detected between first and second distances from the guarded area, that machinery should slow down when the person or object is detected between second and third distances from the guarded area, and that the machinery should stop when the person or is within a fourth threshold distance from the guarded area. Conditional logic also may be used to help identify malfunctions with monitored machinery. For example, if a machine is expected to move to a certain area, produce certain output, move certain items, open/close, remain unblocked, provide throughput, etc., the detection system can detect a variance from a specified condition, and conditional logic can dictate whether a problem has occurred.

Different actions may be specified for the different templates, and these actions may be programmable to reflect conditional or other logic. Different programmable actions may include, depending on the circumstance, a light, sign, and/or siren; slowing down an object or equipment (like a robot arm, forklift, or AGV); shutting down an object or equipment (like a conveyor); de-energizing an object or equipment; initiating a phone call, Short Message Service (SMS), email or other electronically-mediated message or alert; causing an object or equipment to move relative to the sensing area such that the object or equipment moves into or out of the defined area or to a designated location (e.g., away from an area to which access is required like an electrical panel), etc.

In certain example embodiments, the template may be just the signature/fingerprint 4206. In certain example embodiments, the templates may include links to other data structures including, for example, for information related to actions or action lists. In other words, and as an example, in certain example embodiments, the action list for a given interaction template may be provided in a different data structure linked to or otherwise identified by that given interaction template.

In certain example embodiments, a mapping may be maintained between different actions to be triggered in the various different use cases and different interactions. For example, a "gesture vocabulary" can be defined to cover different functions such as, for example, move interface device (like mouse cursor) left/right/up/down, select, drag, activate, launch specific application or function, open menu or sub-menu, single/double click, etc.

A number of use cases and use case concepts have been described above and further use cases are set forth in further sections below. The following sub-sections list different applications and use cases to which the system described above can be adapted. That is, the technology platform, including its definable sensing area, electrically-conductive surface, field-defining electrodes, algorithms, interaction definitions, etc., can be used to provide the following and/or other elements. It will be appreciated that the detections can be characterized ahead of time, via calibration, and/or machine learning. Apart from that, the field definition, sensing techniques, approach to triggering events, etc., can remain the same.

Example Object Tracking Related Systems

Figure 43A:
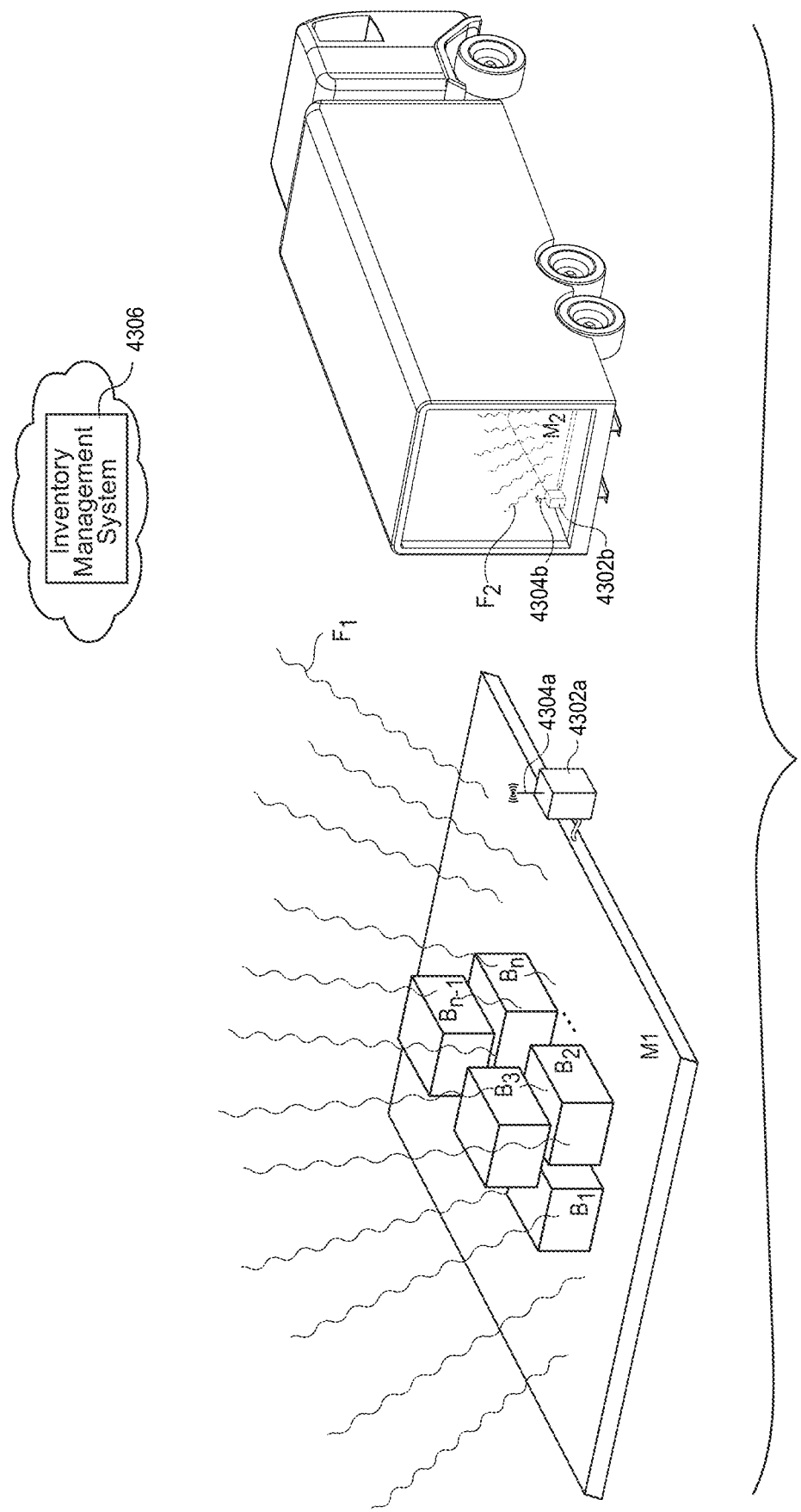
FIGS. 43A-43B show different object tracking related systems incorporating sensing systems in accordance with certain example embodiments.
Figure 43B:
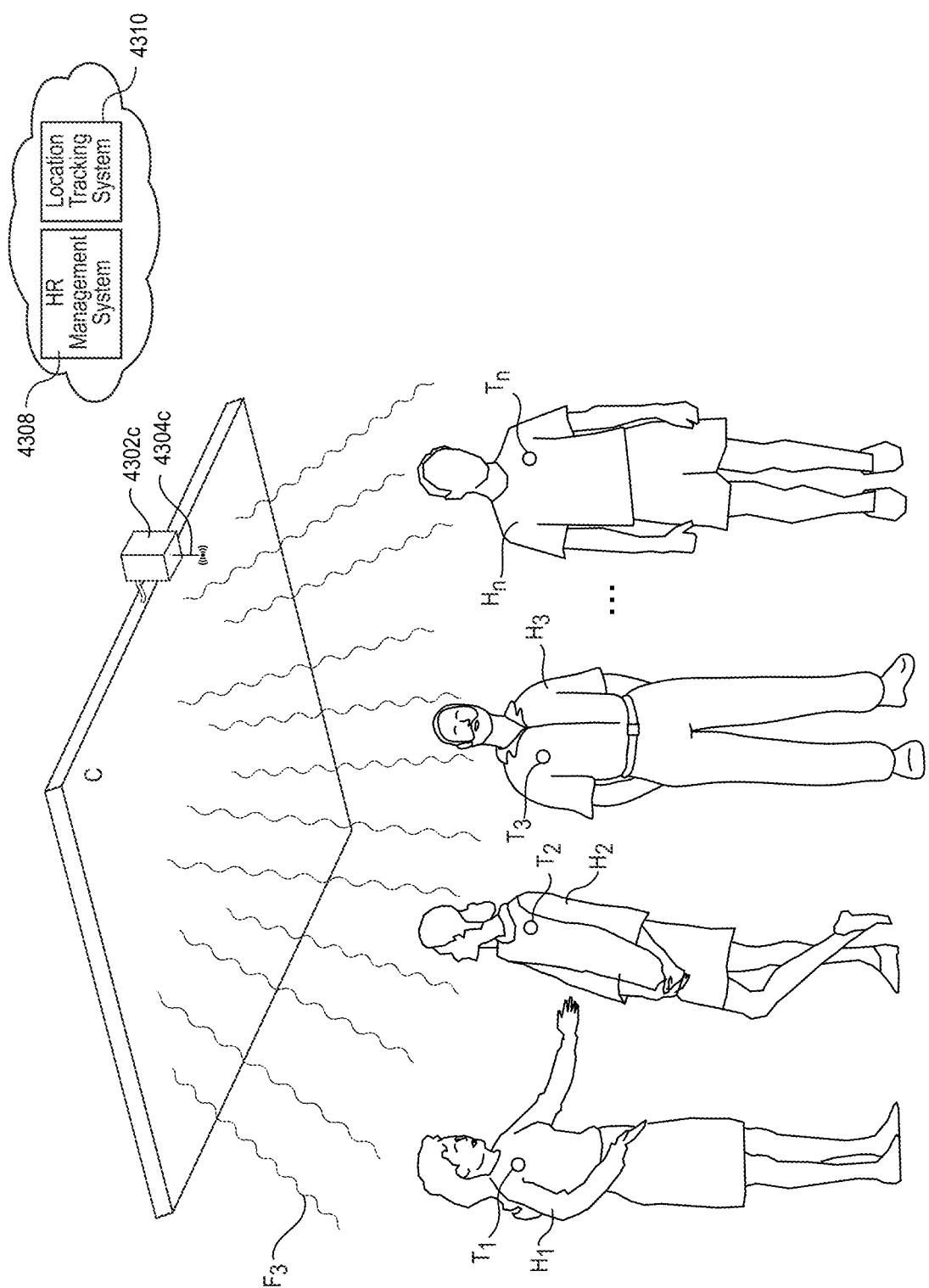

There are a variety of ways the passive sensing techniques of certain example embodiments can be used to track objects, including inanimate objections and/or humans FIGS. 43A-43B are two examples in that they show different object tracking related systems incorporating sensing systems in accordance with certain example embodiments. In FIG. 43A, for example, boxes $B_1, B_2, \ldots B_n$ are stacked on mat $M_1$ from which they are movable by a human or humans, or machinery such as a forklift or the like. In this example, the boxes $B_1, B_2, \ldots B_n$ are movable to mat $M_2$ in the back of a truck T. The mat $M_1$ has connected thereto a first sensing system 4302*a* and a first transceiver 4304*a*, and the mat $M_2$ has connected thereto a second sensing system 4302*b* and a second transceiver 4304*b*. The first sensing system 4302*a* of the mat $M_1$ helps projects a first field $F_1$ and, likewise, the second sensing system 4302*b* of the mat $M_2$ helps projects a second field $F_2$. The mats $M_1$ and $M_2$ may be configured as electrically-conductive surfaces, and field-defining electrodes may be provided in, around, or proximate to those electrically-conductive surfaces. The fields $F_1$ and $F_2$ correspond to different sensing areas. Thus, the sensing areas here are provided proximate to the mats $M_1$ and $M_2$. The mats $M_1$ and $M_2$ have interfaces 4304*a* and 4304*b* connected thereto, and these interfaces 4304*a* and 4304*b* may include wired or wireless connections to an external system, such as inventory management system 4306, which exists in a network location (such as in a cloud computing infrastructure). The sensing systems 4302*a* and 4302*b* are configured to detect when the boxes are moved thereto/therefrom. That is, movements of the boxes $B_1, B_2, \ldots B_n$ cause changes to the electrical fields $F_1$ and $F_2$, which can be detected by the sensing systems 4302*a* and 4302*b*. This may be accomplished because the contents of the boxes $B_1, B_2, \ldots B_n$ may have some intrinsic field-altering property (e.g., have some conductivity), or because tags or markers that disrupt the fields $F_1$ and $F_2$ in understandable manners are provided therein and/or thereon. In certain example embodiments, the sensing systems 4302*a* and 4302*b* may be configured to distinguish between different types of objects detected in the different sensing areas by virtue of different intrinsic field altering properties thereof and/or different tags or markers affixed thereto. Packaging material also may be used for this purpose. When such detections are made, the inventory management system 4306 is updated. For instance, state data maintained in a non-volatile storage location of the inventory management system 4306 initially indicates that box $B_1$ is on or near mat $M_1$. When the box $B_1$ is picked up and moved, the state data is updated to indicate that it is in transit. If the human or machine involved in moving the box $B_1$ is recognizable (e.g., by virtue of a characteristic pattern emanating therefrom, either as an intrinsic field or with the aid of a marker emitting a specialized output, for example), then this information may also be stored. When the box $B_1$ is placed on or near the mat $M_2$, the state data can be updated once again. In this way, inventory tracking and/or management can be performed in a warehouse or other location, with audit trails being provided at different steps. Should a box go missing, the state data could be consulted. In general, the sensing systems 4302*a* and 4302*b* are able to send electronic messages related to the movement of objects to the inventory management system 4306.

It will be appreciated that boxes may be moved to mat $M_1$ from mat $M_2$, e.g., in different scenarios. It also will be appreciated that a different sensing system can be used to help guide machinery into or around the truck, e.g., as described in detail above. This may be useful, for example, when using AGVs or the like. Although this example has been described in connection with mats onto/from which the objects are movable, it will be appreciated that different examples may use different electrically-conductive surfaces that the objects do not need to contact (e.g., ceiling areas, floor areas, fenced or otherwise defined areas, etc.). Similarly, although this example has been described in connection with boxes, different types of objects may be trackable.

In certain example embodiments, the sensing area may include a conduit and detectable events may relate to a blockage of, clog in, expected flow in, unexpected flow in, and/or presence of contaminants in the conduit.

In FIG. 43B, the "objects" to be tracked are humans, e.g., in a warehouse or other environment. In FIG. 43B, the ceiling has an electrically-conductive surface C. Field-defining electrodes are electrically connected to the surface C and can be provided on the ceiling, on walls perpendicular to the ceiling, in the floor, and/or elsewhere. The sensing system 4302c in this environment, with the aid of the surface C and the field-defining electrodes, helps create a field $F_3$ in which the humans $H_1, H_2, \ldots H_n$ are able to move. The presence and movements of the humans $H_1, H_2, \ldots H_n$ create changes in the field $F_3$ which the sensing system 4302c is able to monitor for. To help the sensing system 4302c in locating and/or distinguish between the different humans $H_1, H_2, \ldots H_n$ from one another, the humans $H_1, H_2, \ldots H_n$ may be provided with markers or tags $t_1, t_2, \ldots t_n$ As with the other markers or tags described herein, these markers or tags may be wearable, carried, or otherwise provided, and they may produce their own characteristic signal or interfere with the electrical field in a known manner. This includes generating a constant and fixed signal or providing a discernable patterns of signals. The sensing system 4302c is able to use the interface 4304c to report events to an external system such as, for example, a human resources (HR) management system 4308 and/or location tracking system 4310. The HR management system 4308 may be used to supplement or replace timecards, to track breaks and/or productivity, etc. The location tracking system 4310 may track the location and/or identities of the humans $H_1, H_2, \ldots H_n$. Thus, if there is an accident (for example) the location tracking system 4310 can be consulted to know who was in the environment and where they were last located. Tracking this kind of data may make it possible to more easily assess accident impacts and commence recovery options more quickly and precisely. As noted, the arrangement of FIG. 43B is useful for a wide variety of environments including, for example, warehouses, shipment facilities, fulfillment centers, airports, mines, and/or the like.

Example Consumer Electronics Related Systems

The disclosed technology can also be used with a variety of different consumer electronics related solutions, e.g., for interfacing with such devices. For instance, gesture or other control of televisions, CD/DVD players, streamer, A/V receivers, projectors, video game systems, and/or the like can be provided. In essence, a sensing area is created by the consumer electronics device or via an electronic device connected thereto. The sensing area monitors for human movements and interprets them so as to provide input to the consumer electronics device. In this regard, the consumer electronics device may maintain a mapping between different possible interactions (e.g., as templates disclosed above) and commands appropriate for the device being controlled. These mappings may include commands for starting and end recognition of different interactions, as well as control-related interactions themselves.

Figure 44A:
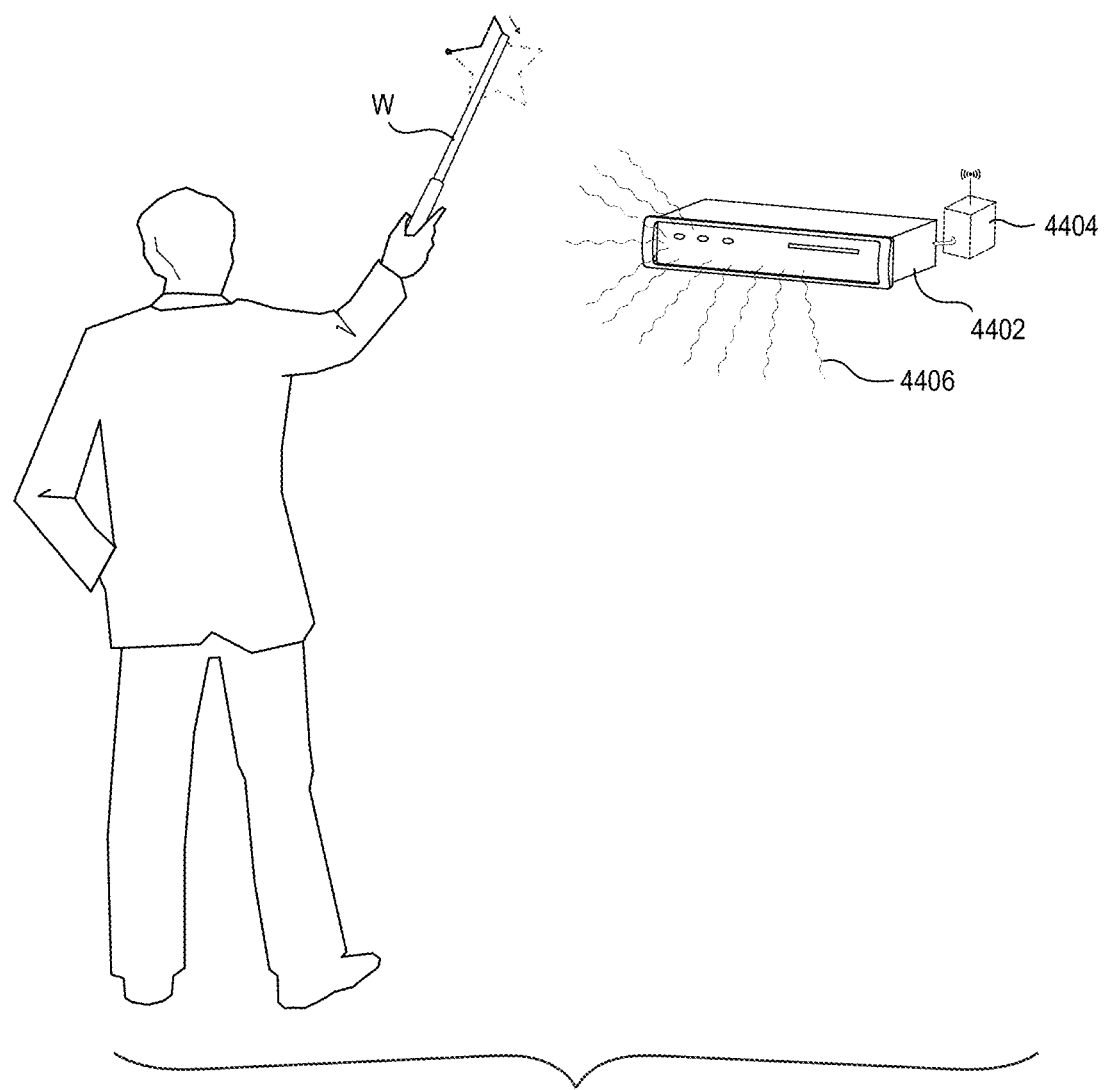
FIGS. 44A-44D are examples showing how the technology disclosed herein can be used in connection with consumer electronics devices in accordance with certain example embodiments.

FIGS. 44A-44D are examples showing how the technology disclosed herein can be used in connection with consumer electronics devices in accordance with certain example embodiments. In FIG. 44A, the consumer electronics device 4402 includes a sensing system 4404. The sensing system 4404 is configured to project a field 4406 is a sensing area in which the user interacts. As a general matter, movements to the passively projected sensing area may be detected and erroneously interpreted as control signals, e.g., in the normal course of shifting or stretching while watching television, eating popcorn, a dog jumping onto/off of a couch, a child running in front of a projection screen, etc. Thus, certain example embodiments may monitor for a specific interaction to signal that subsequent control-type interactions are to be accepted. In the FIG. 44A example, a user holding a wand W moves the wand W in a star shape. This star shape is specific and unlikely to be accidentally detected by one of the above-described and/or other factors. Once the system detects this shape, it may transition to a mode of accepting user-based control-type inputs.

Figure 44B:
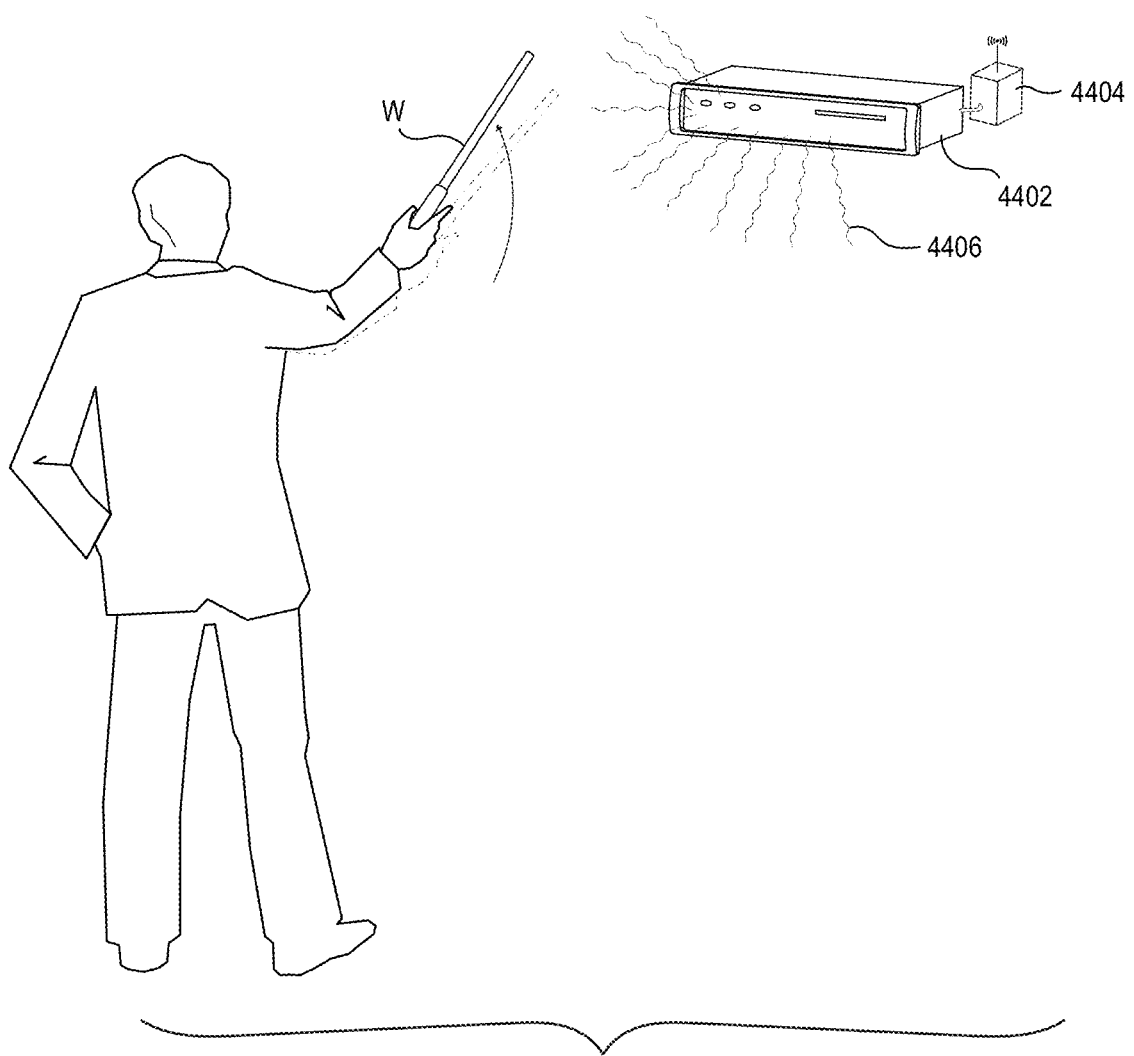

The user-based control-type inputs may be specific to the particular device being controlled and/or the application being interacted with. For example, FIG. 44B shows the wand moving upward, which may be used to turn up the volume, change a television channel, adjust a frequency to be tuned into by a radio, etc. Up and down movements may be used in this regard. Moving in the left/right direction may rewind or fast-forward, and multiple left or multiple right movements may rewind or fast-forward at faster paces. Pressing towards the display can signal a selection, an X-shape can signal a cancellation or "back" action, etc.

Figure 44C:
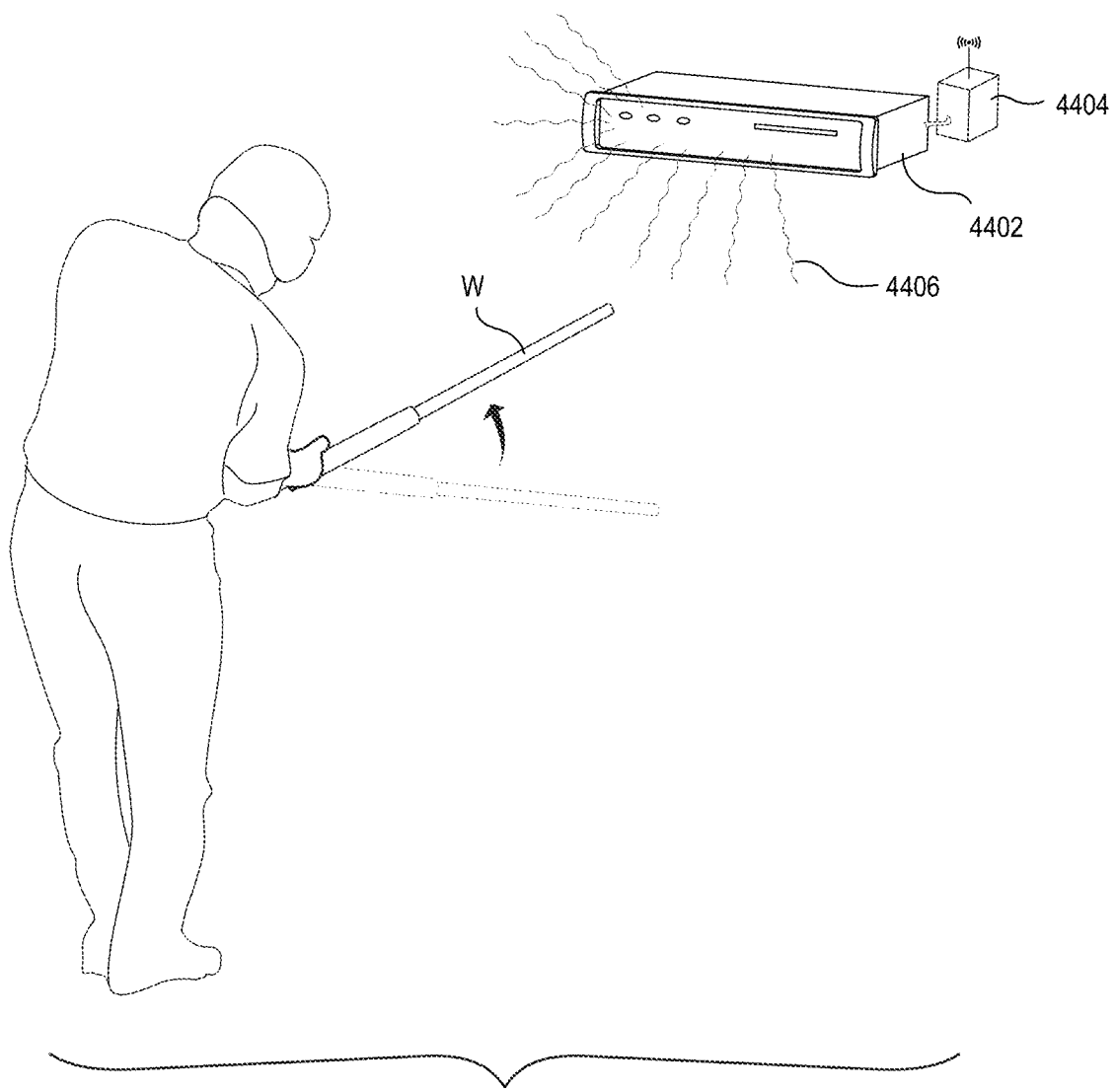

As noted above, the consumer electronics device 4402 may be a video game system. FIG. 44C shows a human holding the wand W as if it were a baseball bat, as may be provided in a baseball game. A swing of the bat can be detected, for example. In other cases, the position and/or orientation of the wand W can be known or tracked and used as input for a video game. In some cases, complex movements may be used to signal reloading of a gun (e.g., inserting a new clip), shedding a backpack, picking up an item in a virtual world, etc. Because the video game system is detecting changes to a field, no visible sensor bars, infrared candles, or other detectors need to be provided external to the device 4402 itself. That is the sensing system 4404 with the electrically-conductive surface and the field-defining electrodes can be provided in or on the device 4402, e.g., on a front grille or bezel for example.

Figure 44D:
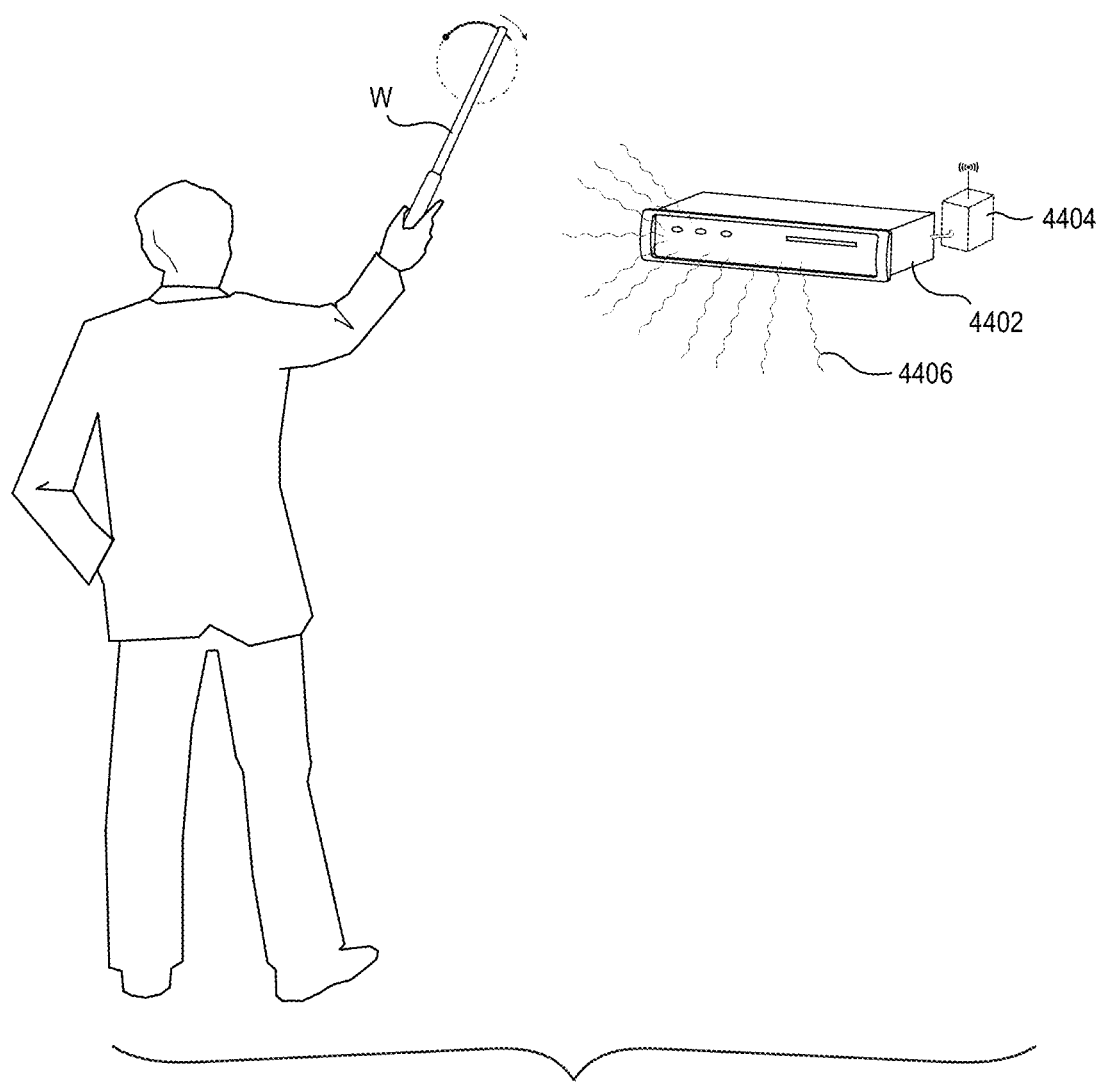

In FIG. 44D, a defined movement (in this case, a circular motion) of the wand W ends the period of defined interaction with the consumer electronics device 4402.

The use of a wand W may be beneficial because a tag or marker can be used to facilitate the detections by having the wand W output a recognizable signal or have intrinsic characteristics that are recognizable as specific disruptions to the field. Although certain example embodiments have been described in connection with a wand, different objects could be used in different cases. In some cases, simple human gestures without a separate object could be used for control.

Example Workplace Related Systems

Certain example embodiments can be used for a variety of workplace-related interactions. This functionality may take place at a home or other office, in a school or other educational setting, or anywhere else work is done using a workstation of the like. The kinds of workplace-related interactions that can be facilitated by certain example embodiments include, for example:

Workstation arrival and "sign-of-life" functionality. The sensing system may detect when a user arrives in a defined space near a workstation. The sensing system can then send a signal to power-on or wake up a monitor, computer, or other device. Humans interact with electrical fields in characteristically recognizable manners, and the system can monitor for the same within a defined area proximate to the workstation (e.g., within a cubicle, office, or the like). The system thus may ignore passers-by based on distance or speed (e.g., because they are too far from the workstation or moving too fast to stop). When it is detected that the user is arriving at the workstation, the system can interface with the computer or other device, check whether the device is off or asleep, and then send a control signal over an appropriate interface.

Gesture-based unlocking and powering-up of a workstation. The sensing system may detect when the user initiates a gesture and unlock the workstation and/or power-up the workstation. For instance, based on the principles in the prior point, the sensing system can detect when the user is in proximity to the workstation and then makes a defined movement, e.g., a movement similar to turning a key to start a car or unlock a door, a movement waving hello, etc. In certain example embodiments, a form of two-factor authentication (2FA) can be provided, e.g., if the user makes a "secret," "reserved," or otherwise "customized" gesture and enters a password or the like. Another form of authentication can be provided by having the user possess a tag or marker that disrupts the electrical field in a way that is specific for the particular user. The computer system can interface with a security system, linking together gestures and tags or markers to provide for such authentication.

Bringing a peripheral device or tool (such as a keyboard, mouse, power mat, and/or the like) to life via a hover interaction. In some instances, peripheral devices and tools can enter into a hibernation mode, especially when they are battery powered. However, the detection system of certain example embodiments can wake up these peripheral devices or tools based on detected hover operations, for example.

Initiating shortcut actions. Many computer-based functions are repetitive in nature. For example, standard text oftentimes is provided in everything from form letters to patent applications, it is not uncommon to toggle back and forth between applications when doing bank reconciliations, many people want to bring up or refresh specific websites throughout the day (e.g., to check news feeds, stock prices, sports scores, etc.). Certain example embodiments include a user-defined mapping of gestures to specific actions. Then, when such actions are detected, the sensing system can initiate the corresponding actions. Shortcut actions could also involve "typing" frequently-used words or phrases, auto-correcting spelling mistakes, auto-completing words or phrases, etc.

Focusing a light or camera on an area. In certain example embodiments, it is possible to turn on/off or dim lights, focus lights in a space, adjust cameras used in video conferencing, telehealth, and/or other applications. This may be accomplished using different defined gestures. Pointing, for example, could focus a light, camera, or the like. Likewise, pointing could cause video conferencing or other software to share a screen (or different screen), highlight an area, etc.

Raising/lowering a desk. Similar to turning on/off or dimming a light, similar gesture control can be used to raise or lower a desk.

Automatic locking of a workstation upon departure therefrom. As a parallel to the unlocking of a workstation, the sensing system may detect when the user has moved away from the workstation and then lock the screen, put it to sleep, or take other actions.

The sensing system of certain example embodiments can also provide a form of "macro workplace awareness." For example, the sensing system can detect objects that might be present in a work environment (which may be useful for determining when supplies are low, hallways are blocked, the lunchroom is crowded, etc.), and/or recognize tasks and provide data to a task analysis computer-based platform. By recognizing tasks, it becomes possible to feed the data to a task analysis computer-based platform to help recognize which tasks are performed most frequently, identify which tasks are the most time-consuming, identify which tasks might be optimized (e.g., through training to perform better movements, to move materials to different locations, etc.), and/or the like. Task analysis also can be used to recognize intent and provide coordinated productivity analytics. It might also be possible to recognize an individual within a space based on past patterns of movement, activities, times, spent, etc. Moreover, task analysis can be used to identify periods of interactivity and/or productivity, nodding off at a workstation, etc.

In terms of interaction with applications and content, gesture control can be provided to accomplish functionality including, for example, accession of a file for display and/or review, sorting, sizing, sharing, editing, and/or the like. Gesture control likewise can be provided to accomplish presentation-related functionality such as, for example, moving to a next/previous slide, going to sleep, playing an embedded or other video, etc. For video conferencing, gesture control can be provided for starting and concluding a meeting, as well as managing or adjusting settings such as, for example, changing volume, muting, pan/tilt/zoom controls, etc.

Figure 45A:
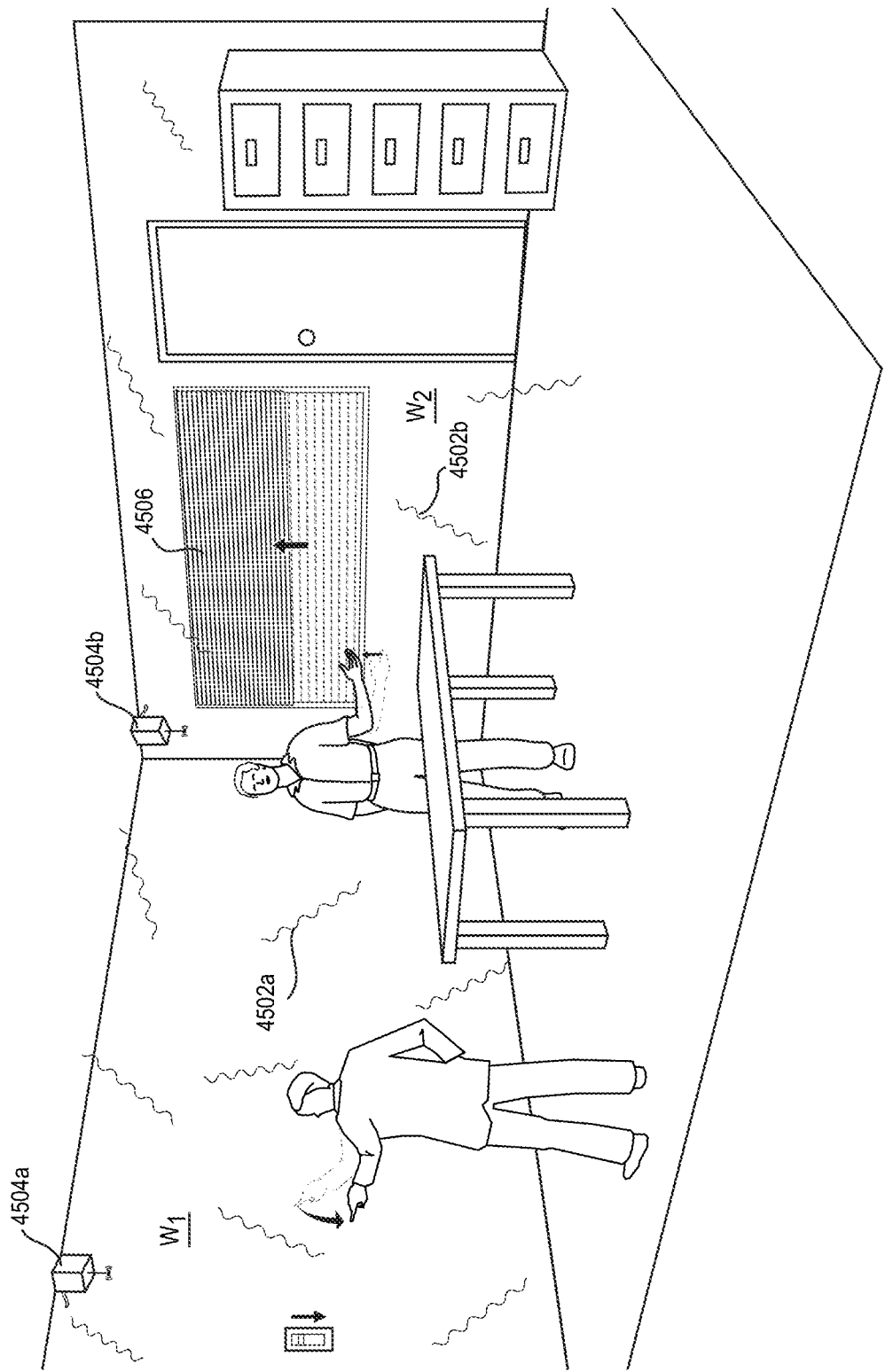
FIGS. 45A-45F are examples showing how the technology disclosed herein can be used in connection with workplace related systems, in accordance with certain example embodiments.
Figure 45B:
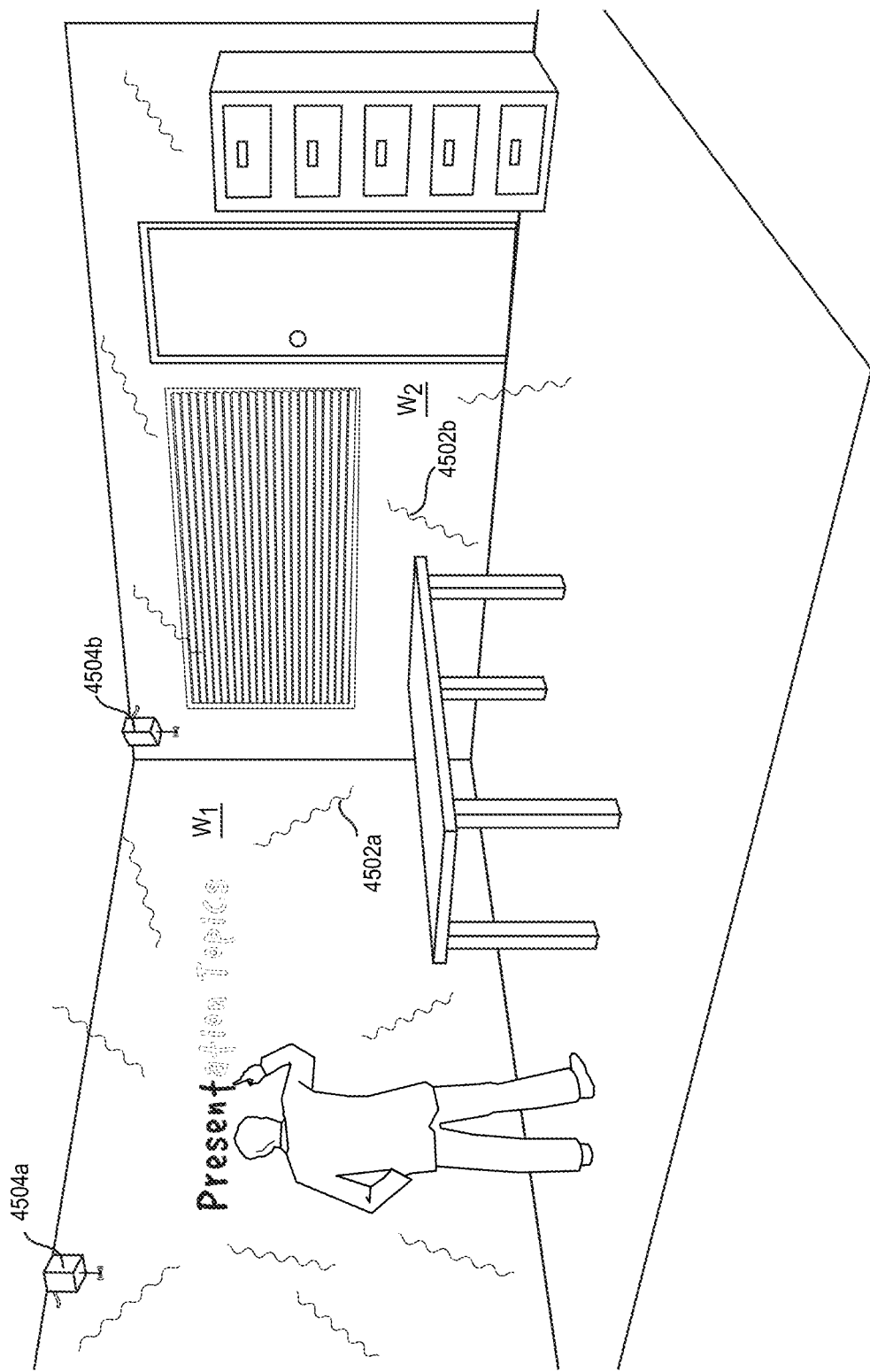
Figure 45C:
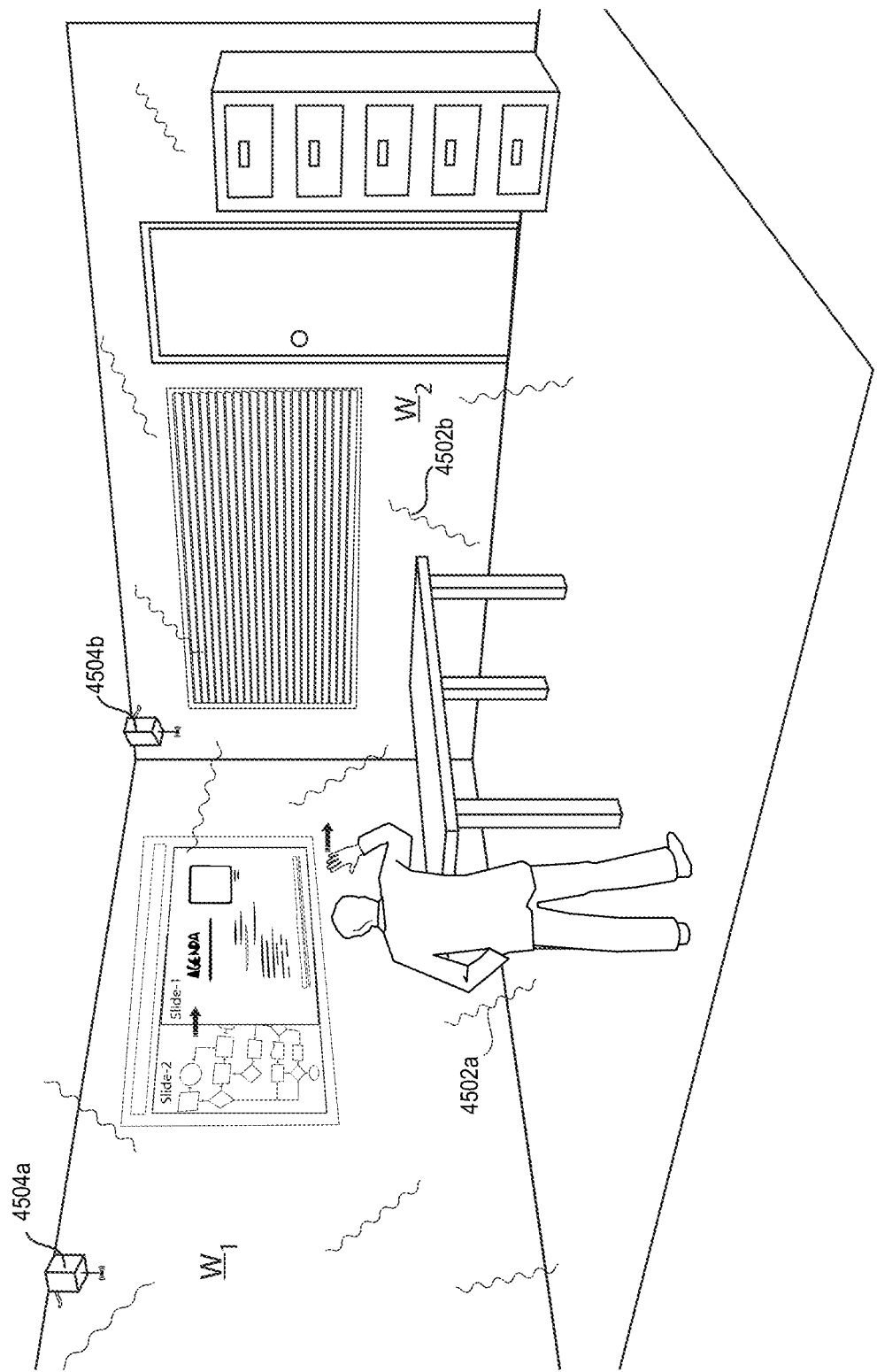

Other possible interaction types involve interfacing with elements in a room, e.g., as shown in FIGS. 45A-45C. In FIG. 45A, for example, a first sensing field 4502a is created via a first sensing system 4504a proximate to a first office wall $W_1$, and a second sensing field 4502b is created via a second sensing system 4504b proximate to a second office wall $W_2$. A first user may be able to control lighting by using one finger to gesture or actually slide down the first office wall $W_1$. A second user may gesture in an upwards direction with the whole hand proximate to the second office wall $W_2$, e.g., to cause shades 4506 to retract. Different office effects related to technology components including lighting, projectors, video conferencing, and/or the like, may be provided in different example embodiments, based on gesture and/or other interactions with the field(s) created.

FIG. 45B is similar to FIG. 45A, except that it shows a user touching (or possibly gesturing) near wall $W_1$, in a free-writing mode where the written text is displayed on a glass or other surface. The tracking of the user's finger may be used as if the user were using a dry-erase marker on a whiteboard.

FIG. 45C also is similar to FIG. 45A, except that it shows a user gesturing to advance slides in a presentation mode.

Figure 45D:
Figure 45E:
Figure 45F:
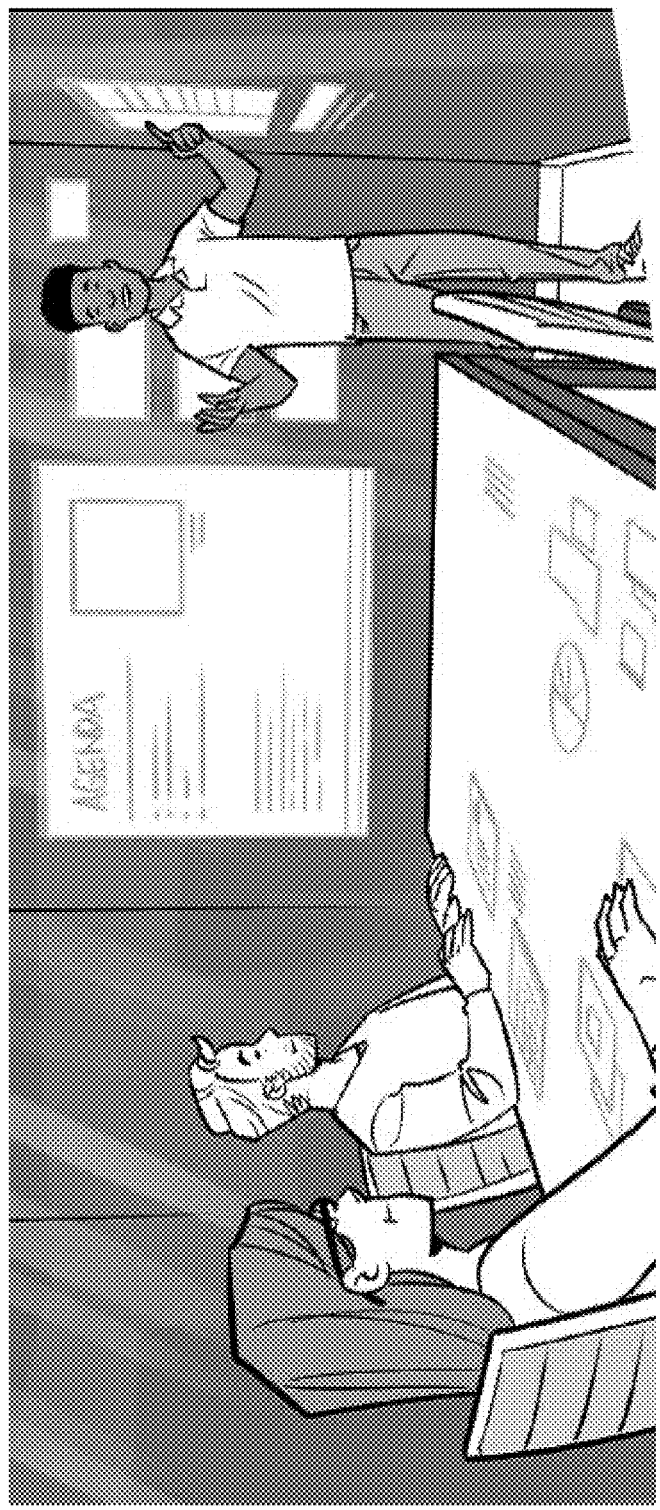

FIGS. 45D-45F show how glass or other transparent surface inclusive workstation and/or conference room facilities can benefit from the technology disclosed herein. The surface can react and/or shift based on accessories that trigger different states (e.g., markers that trigger whiteboard functionality, keyboards that trigger a display, etc.). In FIG. 45D, placing the keyboard on the desk can enable typing features, the gesture can be used to unlock functionality for display on the far wall, etc. The form of the surface can be changed based on context, including use, e.g., among and/or between collaborative, private, available, transparent, or the like. Interactions likewise can be defined to personalize colors, patterns, feedback, etc. In FIGS. 45E-45F, the surface is transparent because the meeting has not started and it becomes opaque in FIG. 45F. This may be accomplished using switchable glass based on polymer-dispersed liquid crystal (PDLC), polymer-assembled liquid crystal (PALC), electrochromic, organic light emitting diode (OLED), and/or other technology. The surfaces can display different items using projected or other imaging.

Certain example embodiments can implement a sensor function, e.g., including a sensing system functioning as a sensor on a ceiling of a room. The sensing system in such cases can sense people walking into and out from a room (e.g., to turn on/off lights or indicate to an office scheduling system that the room is in use, etc.), detect whether a person in inside a room (e.g., and determine with reference to a reservation system whether the room is in use beyond a scheduled period, etc.), determine where in the room the person is (e.g., and adjust internal and/or external blinds to block out the sun based on the time of day or provide privacy), etc. Certain example embodiments can replace motion sensors by detecting presence and optionally location in a room. The techniques of certain example embodiments can be advantageous compared to motion sensors, which can indicate false absences (e.g., if a person is still for a period of time or is outside of a viewing area) as well as false detections (e.g., caused by a movement of a spider or other pest in front of a sensing system). The sensing system of certain example embodiments need not rely on movement, and detections (field disturbances) related to pests like spiders or even rats are easily distinguishable from detections (field disturbances) caused by humans.

It will be appreciated that the technology disclosed herein can be used for monitoring usage and activity-sensing and tracking for a variety of other purposes. For example, the techniques can be used for wellness/health purposes (e.g., understanding sentiment, whether people are collapsing or coughing, moving around spaces a sufficient amount to have good mental health and blood circulation, etc.), space optimization purposes (e.g., understanding what areas of an office or other structure might not be used, or what other areas might be overused to, for example, inform leasing activities, how to better organizing tools, operations, or other goods, etc.), servicing and housekeeping purposes (e.g., to indicate what areas need to be cleaned and potentially how heavily based on, for example, number of people present throughout the course of the day, dwelling time of people present, and so on), etc. Data collected by the sensing system regarding usage and activity-sensing can be sent to a management system where it can be interpreted for the purpose and, for example, transmitted to people with a need to know (e.g., a cleaning or servicing company, sanitation provider, etc.).

Although certain example embodiments have been described in connection with office walls, it will be appreciated that the techniques disclosed herein can be used with a variety of different dividers including, for example, cubicle walls, movable partitions in a conference room or the like, etc. Indeed, the technology disclosed herein can be used to trigger the movement of movable partitions, e.g., via gesture or other control near a designated surface.

Example Public Information Display Related Systems

The sensor technology described herein can be used in connection with a wide variety of different public information display related systems. The technology disclosed herein can be particularly useful in large-format multi-touch or multi-interaction applications. In this regard, one where the technology disclosed herein can be used relates to providing more interactive digital signage of a variety of different types. For example, a public information display may be provided on a storefront. In such cases, the technology disclosed herein can be used to provide an interactive window display or a "smart window." A person who is "window shopping" could use touch, hover, or other functionality to interact with a display to, for example, browse a product catalog; cause information about a selected product to appear; see simulations of selected or otherwise displayed products to indicate different prices, colors, sizes, and/or the like; check product availability or inventory; make orders, etc. In a sense, the technology disclosed herein can be used with these public information displays to provide a more "live" and interactive window shopping experience.

The sensor technology described herein cab be used in connection with maps and/or ways finders in a variety of locations such as, for example, subway or rail stations, airports, shopping malls, public areas, casinos, hotels, office buildings, resorts, and/or the like. Touch, hover, and/or other controls can be used to interact with maps, make selections or provide other inputs (e.g., store categories, virtual keyboard, etc.), and/or the like.

In a restaurant-type application, a kiosk for ordering food and/or drinks can be provided. The sensor technology disclosed herein can be used to browse a menu, make selections, etc., in connection with a digital display provided, for example, via an LCD or other display. Also in a restaurant-type application, a more "static" paper or other menu could be laminated or otherwise provided to a table, bar top, or the like, and the technology disclosed herein could be used to detect selections on the table. The position of the selection can be mapped to a menu item and reported to a server, kitchen, bartender, or other person. In a similar manner, bar games like trivia can be played on a table, e.g., by having a person select an entry from a list, "write" an answer, etc.

The technology disclosed herein also can be used for ticketing kiosks, e.g., where it is possible to purchase tickets for subways, trains, or airplanes; entertainment venues like movie theaters and musicals; etc.

The technology disclosed herein also can be used on merchandizers including, for example, shelves, refrigerators, and freezers. For the latter, the sensing system can be used to detect an approach person or person's hand, e.g., to trigger a defrost system in anticipation of a door opening. If the sensing system determines that the person is interacting with (e.g., picking up, examining, or even lingering over) a particular product, a display connected thereto could provide information related to the product. For example, once it is determined what product is being interacted with, a database could be consulted to retrieve and display nutritional facts, stock/sell-by dates, suggested recipes, recommendations for what other food or drinks to pair with the item, etc.

In still other applications, the technology disclosed herein can be used in connection with museum displays, scenic overlooks or lookouts, etc. The functionality disclosed in U.S. Provisional Application Ser. No. 62/786,679 filed on Dec. 31, 2018 (and WO 2020/141446) may be provided in such contexts, e.g., with the interactive engagements being mediated by the technology disclosed herein. The parallax-related solutions disclosed in U.S. Provisional Application Ser. No. 62/786,679 filed on Dec. 31, 2018 (and WO 2020/141446) can be implemented in connection with certain example embodiments.

In educational settings, for example, one or more children, teachers, and/or others can interact with an object like an oversized map, model, or the like. Different touch or non-touch interactions can be detected by the sensing system and reported to a controller, e.g., to cause some action to be taken (e.g., information to be displayed on a display device, sounds to be made, an orrery to be rotated, etc.).

Example Vehicle Related Systems

The sensor technology described herein can be used in connection with a wide variety of different vehicle-related systems. For example, sensing areas may be arranged for inside and/or outside of the vehicle. Inside of the vehicle, sensing areas can be used to control vehicle systems such as, for example, heating/cooling, radio and/or other media, window and/or sunroof control, defrosters, etc. Interior detections also can relate to whether the driver is falling or has fallen asleep (e.g., by detecting swaying, nodding off, hands dropping off of a wheel, etc.), whether there are persons, pets, or objects in a backseat or trunk, etc. Outside of the vehicle, sensing technology can be used to assist with parallel parking, prevent unsafe lane changes, provide blind spot detections, detect ongoing or suddenly appearing "obstacles" like a child running in front of a car or a shopping cart rolling through a grocery store parking lot, etc.

Figure 46A:
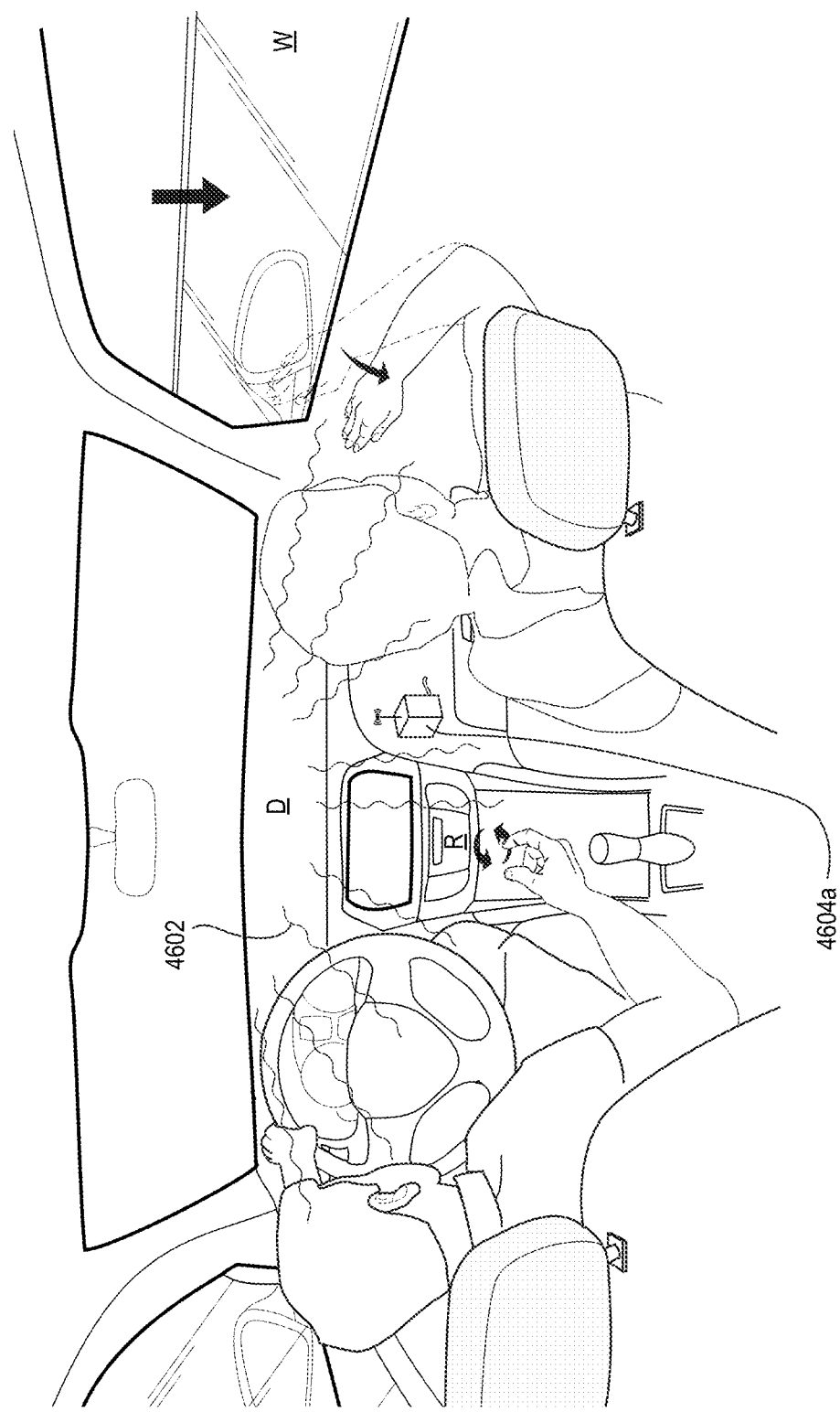
FIGS. 46A-46B are examples of how the sensing technology disclosed herein can be used in different vehicle-related systems, in accordance with certain example embodiments.
Figure 46B:
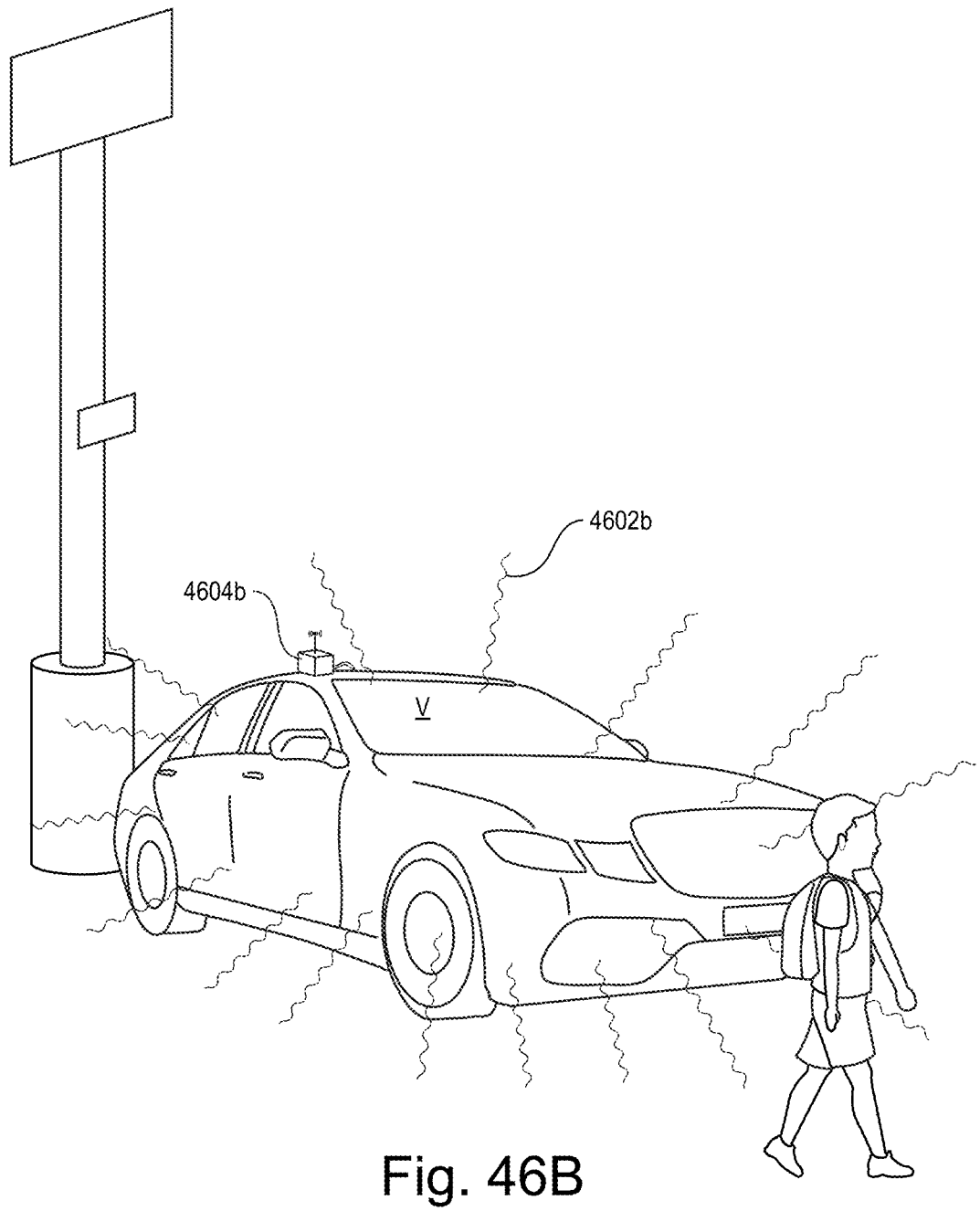

FIGS. 46A-46B are examples of how the sensing technology disclosed herein can be used in different vehicle-related systems, in accordance with certain example embodiments. In FIG. 46A, a first electrical field 4602a is defined in relation to a dashboard D via a first sensing system 4604a. The first sensing system 4604a is tied into a control system of the vehicle. Commands are mapped out so that different actions or interactions can be associated with different vehicle-related functions. In FIG. 46A, for example, the passenger makes a downward gesture near window W to case window W to lower, and the driver is able to gesture as if twisting a knob to cause the radio to change stations.

In FIG. 46B, a second electrical field 4602b is defined in all directions around the car via the second sensing system 4604b. As the car moves, it is able to detect the presence of the child in front of the car and/or the light pole behind the car. If the driver moves too close to the child, or the child suddenly veers towards the car, the second sensing system 4604b can interface with the control system of the vehicle to cause it slow and potentially even stop. Proximity based detection may be used for this purpose, e.g., with multiple thresholds being defined. The thresholds may be defined in terms of absolute distances and/or as a function of speed and expected braking distance (e.g., so that longer "runways" are provided for faster moving vehicles assuming a constant braking distance, etc.). In a similar manner, a driver can be alerted before backing up into a light pole, e.g., by a beeping sound, a visual warning, and/or the car slowing or stopping entirely.

Although certain example embodiments have been described in relation to cars, it will be appreciated that the technology disclosed herein can be used for other vehicles including, for example, trucks, motorcycles, boats, airplanes, mowers or tractors, trains, and/or other machines.

Example Unattended Retail and Vending Related Systems

The example techniques disclosed herein can be used for unattended retail and vending related systems. For example, with vending machines, a person can simply touch a selection rather than having to key-in an alphanumeric combination to make a selection. A sensing system can be disposed in a vending machine and monitor for touch or other interactions. For instance, a touch could indicate a selection, trigger a visual confirmation (e.g., lighting up an area around a selection), and a further touch or gesture (e.g., a check mark) could confirm the selection. As noted above, the same or similar approach can be used with kiosks where food and/or drinks are ordered, at tables or bars, etc. The ability to have touch and/or gesture control may render physical keypads and associated hardware obsolete or redundant, thereby enabling the product display area to be enlarged.

In certain example embodiments, a first sensing system can be provided in connection with a merchandizer, a store's shelving, or the like. In such cases, the first sensing system can detect when an item is removed (e.g., especially if the item has a characteristic pattern as might be expected with aluminum, tin, and other canned goods). The first sensing system can track removal of items and communicate with inventory management systems, e.g., for restocking, reordering, and/or other purposes. In certain example embodiments, a second sensing system may be provided in connection with a grocery cart, handbasket, or the like. In such cases, the second sensing system can track unique items placed into a cart for automating checkouts, theft deterrence, and/or other purposes.

In a like manner, a sensing system can be provided in connection with a hotel's mini-bar or the like. In such cases, the system can determine when a particular item is removed from a refrigerator. The sensing system can be tied into a billing system to automatically bill the guest for the purchase. Likewise, the sensing system can send messages to room service or the like, e.g., to indicate that there is a need to restock the mini-bar or the like.

The technology disclosed herein also can be used in casino and other gaming environments. For instance, a person could interact with a slot machine using gestures for pulling a lever or pressing a button. A user also could interact with player tracking modules (PTMs) to order drinks, room service, call a car, etc. In addition, the technology disclosed herein can be used in connection with table games. For instance, a display could be used to show cards, e.g., for a poker, blackjack, or other card game. Gesture functionality could be provided to flip over (wrist turn) or discard (flick) cards, "hit" (double tap), or perform other actions. The display could be mounted under a table or other surface, and a sensing system could be provided for each of a plurality of defined seats around the table. In another example embodiment, a more static or fixed physical table. In such cases, the technology disclosed herein could track the throwing of cards as in Pai Gow, rolling of virtual dice as in dice games like craps, etc.

Comparison to Existing Touch-Sensing Technologies

The example approaches set forth herein have a number of advantages compared to existing technologies, including existing EIT-based technologies. The following table summarizes several advantages that become possible through implementations of the techniques disclosed herein. It will be appreciated that some or all of these and/or other advantages may be present, depending on the implementation. At least some such advantageous aspects may flow naturally from implementation of the techniques disclosed herein. That said, it will be appreciated that the claims set forth the invention and these advantages should not be read therein automatically and completely.

| Feature | Disclosed Technology | Existing Technology |
| --- | --- | --- |
| Processing Method | Parallel programmed multi-threaded processing with N-parallellization; process capacity = 1/(N × Process Time) | Single-threaded processing; process capacity = (1/Process Time) |

-continued

| Feature | Disclosed Technology | Existing Technology |
|---|---|---|
| Interface | Multi-unit connection, listening, reading capability (system hardware can be connected with more than one object with the disclosed embedded algorithms and hardware architecture) | Single-unit connection and reading |
| Current Regulation | Adjustable for low-resistance and high-resistance surface materials to improve SNR | Surface-specific user control |
| Multi-Channel Control | Controllable current and mux/demux arrangement that is highly precise and accurate | Low current and non-controllable mux/demux arrangement that has low precision and accuracy |
| Hardware amplifiers and filters (BPF, LPF, HPF) | High-quality measurements and control based implementations (e.g., SBPF, etc.) reduce the requirement for amplifiers and filters, thereby making it possible to increase speed and decrease hardware cost and complexity | Weak and noisy signals require amplifiers and filters to increase the measurement quality by improving SNR |
| Measurement Algorithm | Two-dimensional (extensible to three-dimensional) algorithm suite with unique high-speed continuous segmented measurements and sub-pixeling | One-dimensional 2-Pole or 4-Pole continuous full surface measurement approach, processing with existing library modules (e.g., Matlab) |
| Decision Logic | Hybrid (ML for complex tasks and Trained Models for simple tasks) reproducible approach | Complex and non-reproducible ML training and decision approach |
| Efficiency | Low processor and power consumption, e.g., in that none of the three example algorithmic approaches described herein re-create the whole electrical field for the entire substrate. Moreover, the divider loop has more "on demand" functionality for the electrodes, as will be appreciated from the detailed description herein. | Higher processor and power consumption |
| Speed | Specific to the algorithm, >>35 FPS (frames per second), >>5-7 PFS (processed frames per second). A direct comparison here is not possible because the approach of certain example embodiments involves fewer steps to obtain each frame, which reduces the overall processing time. Moreover, existing techniques obtain and process frames in serial whereas the approach of certain example embodiments can perform these functions continuously and in parallel. | App. 35 FPS acquisition, 5-7 PFS |
| Resolution | App. 3 × N measurements with 16 electrodes (more measurements possible by increasing the sub-pixeling rate) | App. 1 × N measurements with 16 electrodes |
| Platform | Specific to the application, controller or PC based with multi-client capability | PC based, single client |
| Controlling Units | Adaptive (e.g., for the power supplied via the ACRC, which helps in understanding leakage and control current level applied) | Non-Adaptive |
| Electrode Types | Can be optimized for surface applications with conductive adhesive between the electrode and the conductive surface | Standard electrode types typically used in medical applications |

| Feature | Disclosed Technology | Existing Technology |
| --- | --- | --- |
| Wiring Technique | Low resistance wiring | High noise and inconsistent wiring |
| Noise Level in Acquired Data | Low noise with filtering at MUX/DEMUX and controller (software) levels. Additional filters at the hardware level are optional. | High noise which must be filtered at the hardware and software levels. The acquired data after multi-filtering has still non-ignorable noise (SNR) that affects the signal processing results. |
| Signal Quality for Calculations | Acquired signals at electrodes generate meaningful ratio relative to the shunt distance, making the calculation faster and more accurate. | Acquired signals at electrodes relative to the shunt distance does not show a good ratio, making the calculation more complex, slower, and inaccurate. |

In certain example embodiments, the algorithmic approaches described in detail above can be used individually. In different example embodiments, they can be combined to increase accuracy and repeatability. The divider loop approach has been found to be the fastest of the first three described approaches. It can be used to track the touch position based on activated electrodes in each division (hence the term "divider loop"). Thus, not all electrodes need to be used all the time. For example, initially only six electrodes are used for the first touch, and so on. That is, in certain example embodiments, at the first measurement, two electrodes in the middle are used to apply current, and then a left pair of electrodes and a right pair of electrodes are used to measure the voltage to decide which area to select as the new active area (e.g., further examine the left half or further examine the right half)—and this process continues after the new half is selected. This algorithm has advantages, such as lower energy consumption, longer lifetime, etc.

The discrete loop algorithmic approach works differently compared to the divider loop algorithmic approach because all electrodes are active in the discrete loop algorithmic approach, and because measurements can be forwarded for tracking purposes which may be useful in gesture detection. The sensitivity and accuracy for the discrete loop algorithmic approach may be higher than the divider loop discrete loop algorithmic approach, but the speed may be lower.

The four-loop algorithmic approach is in a sense similar to the discrete loop, where all electrodes are active for continuous measurement. This algorithm typically will be the slowest when compared to the other two algorithms Because the four-loop does not necessarily involve region segmentation, sub-pixeling need not be used and instead a center of gravity or other image processing approach can be used, which can be quite fast. Moreover, it may be the most straightforward to implement in connection with repositionable electrodes or electrodes that can be positioned upon delivery; complicated substrate geometries and/or topographies; etc.

Certain example embodiments using machine learning algorithms have been described as using XLD contours and/or paths in connection with "IS" and "SHOULD" models, and that cluster-based approaches also have been discussed. It will be appreciated that any suitable ML technique may be used in different example embodiments. For instance, models built by regression, nearest neighbor (NN), k-nearest neighbor (KNN), convolutional neural network (CNN), support-vector machine (SVM), decision tree, and/or other techniques may be used in different example embodiments. Decision trees are particularly useful for understanding simple feature requirements, and neural networks are particularly useful for understanding complex feature requirements, although as mentioned any ML model approach can be used in different example embodiments.

It will be appreciated that more or fewer electrodes may be provided in different example embodiments, the electrodes may be provided along only some edges (e.g., the top and bottom edges only, the left and right edges only, etc.) in different example embodiments, the spacing between electrodes may or may not be uniform in different example embodiments, and/or the like. Having electrodes along a partial subset of the edges, such as only the opposing edges of a substrate, may be advantageous for particularly large interfaces. The algorithmic approaches discussed above may be adjusted to account for this different arrangement. In example embodiments where there is a non-uniform electrode arrangement, more current may be applied on the surface compared to an arrangement in which there is uniform spacing in order to help deal with the non-uniformities. Different calibration, stabilization, and/or training data may be collected in such circumstances.

Certain example embodiments have been described in connection with electrodes that are regularly spaced and/or oriented around the periphery of the substrate, e.g., on all four sides thereof. Symmetric electrode positions with equal distances have advantages for reducing algorithmic complexity. However, it will be appreciated that asymmetric electrode positions with irregular spacing(s) and optionally with electrodes on only a partial subset of the sides of the substrate may be used in different example embodiments. The calibration for such asymmetric electrode positioning may be more complex but can be handled by adaptation of algorithms, calculation of stabilization and grid characteristic values, ML model training after such electrode placements have been established, etc.

In this regard, it will be appreciated that understanding the touching and tracking the touch position is enabled through reading electrode values and using them in the algorithms set forth here. One task that makes this possible is measuring voltages for the electrodes (in accordance with the techniques specific to the algorithms set forth above) and converting these values into at least one touch position. In symmetric (equal-distance) electrode placements, the conversion of measured values into the touch position may be based on the distance, which is equal in between all electrodes and thus can be straightforward to track, especially if pre-calibration is performed based on surface size, number of electrodes, etc., and a factor to be used in the conversion function can be acquired. This can become more complicated for asymmetric electrode positions, although it still is possible.

It will be appreciated that the segmentation approach outlined in connection with FIG. 4 may be used in connection with certain example embodiments. That is, in certain example embodiments, each electrode may be connected to multiplexers for task management (e.g., to apply current or measure voltage). Moreover, tasks may be performed for different predefined and potentially overlapping sub-regions of an interface. Any one of more of the algorithms described above may be used for each sub-region in certain example embodiments. The segmentation approach may be advantageous when there is a desire to increase the speed of recognizing an interaction, which may be particularly important for large interfaces. Certain example embodiments may, for example, take advantage of processors with multiple processing cores. In this regard, an overlapping segmentation approach may be straightforwardly implemented using the four-loop algorithmic approach outlined above. However, the other algorithmic approaches may need to be modified, e.g., to custom-define regions for divider and discrete loop algorithms, as would be understood by those skilled in the art. Thus, an approach such as that described in FIG. 4 may be used in certain example embodiments, e.g., to increase system speed and/or accuracy by using an architecture with multiple processing cores or the like.

Although certain example embodiments have been described in connection with the movements of humans, it will be appreciated that the same or similar techniques may be applied with respect to animals. For instance, it may be desirable to detect the movements of livestock on a farm (e.g., in an open environment, pen, processing facility, or the like), service or companion animals in any setting, etc. This may be useful for tracking and inventorying, attempting to avert accidents in areas where animals may encounter machinery, etc.

Certain example embodiments have been described as including one sensing system per sensing area. However, in different example embodiments, multiple sensing systems may be provided for a single sensing area. These multiple sensing systems for the single sensing area may project differently composed fields, e.g., in manners that are perpendicular to one another and/or otherwise span a desired space. The ability to use multiple sensing systems for a single area may be beneficial in providing increased accuracy and/or precision in a 3D or other space.

Although certain example embodiments have been described as relating to EIT technology, other tomographic techniques (including ECT techniques) can be used in different example embodiments, e.g., based on surface conductivity. In such implementations, the need to create a complete image of the substrate is alleviated similar to as described above. It will be appreciated that the techniques disclosed herein may create an electrical field and monitor for changes to the field. However, the monitoring for changes, and the determination of the "interaction" with the field, need not rely on a full reconstruction of the (changed) field. Thus, tomographic techniques according to certain example embodiments should be understood to create an electrical field but should not be determined to require the subsequent (re)construction of the entire field, unless specifically stated and/or claimed.

Although certain example embodiments have been described in connection with glass substrates, different materials may be used for the conductive surfaces of the technology described herein. Plastics and other transparent materials may be used, as may non-transparent materials. It will be appreciated that different example applications may use transparent or non-transparent conductive surfaces. Where non-transparent surfaces are used, or where aesthetics matter less (e.g., less than, for example, a transparent touch application), it electrodes may be located in the center or other area of the surface, rather than restricting their positioning to peripheral areas.

It will be appreciated that, as used herein, gestures can refer to provided movements that are either contact or non-contact gestures. In a touch system, for example, gestures can be contact gestures or hover-related gestures. In different use cases, gestures that may be detected may be intentional or unintentional, and the term "gestures" can be used to cover either or both scenario.

While the invention has been described in connection with what is presently considered to be the most practical and preferred embodiment, it is to be understood that the invention is not to be limited to the disclosed embodiment and/or deposition techniques, but on the contrary, is intended to cover various modifications and equivalent arrangements included within the spirit and scope of the appended claims.

What is claimed is:

1. An industrial safety system for guarding a defined area, the system comprising:
   an electrically-conductive surface;
   a plurality of field-defining electrodes electrically connected to the electrically-conductive surface, the surface and the electrodes cooperating to create an electrical field in relation to the defined area, the created electrical field functioning as a passive sensor for the defined area; and
   a controller operably coupled to a memory, the memory having stored therein a plurality of defined templates corresponding to respective industrial safety system safety events related to the defined area, the templates having corresponding actions defined therefor, the controller being configured to perform program logic to perform operations comprising:
   monitoring for changes with the electrical field based on data derived from output from at least some of the electrodes, the derived data being indicative of an interaction with the defined area, the interaction having characteristics including three-dimensional spatial and timing characteristics;
   determining whether the interaction matches one of the defined templates without relying on a multi-dimensional electrical field reconstruction; and
   responsive to a determination that the interaction matches one of the defined templates, selectively triggering the corresponding action based on one or more of the characteristics of the interaction.

2. The system of claim 1, wherein the electrically-conductive surface is a mat, film, or tape.

3. The system of claim 1, wherein the electrically-conductive surface includes a sprayed-on conductive material; a thin film coating; an applied conductive tape; and/or conductive particles laminated, molded, or embedded therein.

4. The system of claim 1, wherein the field-defining electrodes are configured as wire leads provided around at least a part of a periphery of the defined area.

5. The system of claim 1, wherein the defined templates are structured to distinguish between different detectable disturbances to the electrical field, and
   wherein the detectable disturbances include a human or object passing by the defined area, coming within one or more predefined threshold distances of the defined area, and/or entering into the defined area.

6. The system of claim 5, wherein the object is a contaminant that will affect the electrical field.

7. The system of claim 5, wherein the object is a machine.

8. The system of claim 5, wherein the detectable disturbances further include electromagnetic field disrupters.

9. The system of claim 1, wherein the actions are selected from a set of programmable actions, including activating a light, sign, and/or siren; slowing down an object or equipment; shutting down an object or equipment; de-energizing an object or equipment; sending a phone, SMS, email or other electronically-mediated message or alert; and causing an object or equipment to move relative to the defined area such that the object or equipment moves into or out of the defined area or to a designated location.

10. The system of claim 1, wherein the controller is further configured to perform further operations comprising:
determining whether multiple interactions with the defined area are occurring in close and/or overlapping temporal proximity to one another;
determining whether each of these multiple interactions match one of the defined templates without reconstructing the entire electrical field; and
responsive to a determination that more than one of the multiple interaction match one of the defined templates, selectively triggering the corresponding actions based on one or more of the characteristics of the interaction.

11. The system of claim 10, wherein the templates have different severity levels assigned thereto and the actions are triggered in accordance with the different respective severity levels.

12. The system of claim 1, wherein possible characteristics of the interaction used in selectively triggering the corresponding action include proximity, location, trajectory, and speed related to the interaction.

13. The system of claim 1, wherein the area is definable in X, Y, and/or Z dimensions, with or without a rectilinear or regular shape.

14. The system of claim 1, being provided with a glass, plastic, wire, or other barrier.

15. The system of claim 1, wherein the defined area takes the place of at least a bottom, side, lower, and/or upper portion of a glass, plastic, wire, or other barrier.

16. The system of claim 1, wherein the defined area includes: a portion of a machine, a prohibited space, a defined path, and/or a control or operator area.

17. The system of claim 1, wherein the defined area includes an interior and/or exterior to a control or operator area; and
wherein at least one of the templates determines whether a human is present and/or alert in the control or operator area, and the corresponding action deactivates machinery if the human is not present and/or alert.

18. The system of claim 1, wherein the electrically-conductive surface is provided on a first plane, and at least one of the field-defining electrodes is provided on a plane other than the first plane.

19. The system of claim 1, wherein at least some of the templates are machine-learned while the industrial safety system is guarding the defined area.

20. The system of claim 19, wherein the defined area is on a mobile machine.

21. The system of claim 1, wherein the electrically-conductive surface is a skin of a machine.

22. The system of claim 21, wherein the detection system is operably coupled to a control system of the machine.

23. The system of claim 1, wherein at least some of the detection system events relate to an unplanned and/or unexpected disturbance to the electrical field caused by a perturbation emanating from a human, other machinery, a structure, a recognizable electronic signal, pest, or debris.

24. The system of claim 23, wherein the recognizable electronic signal emanates from a placed marker.

25. The system of claim 1, wherein at least some of the events relate to an identification of stored energy.

26. The system of claim 1, being provided in duplicate for redundant detection of the same events.

27. An industrial safety system for guarding a defined area, the system comprising:
an electrically-conductive surface;
a plurality of field-defining electrodes electrically connected to the electrically-conductive surface, the surface and the electrodes cooperating to create an electrical field in relation to the defined area, the created electrical field functioning as a passive sensor for the defined area; and
a controller operably coupled to a memory, the memory having stored therein a plurality of defined templates corresponding to respective industrial safety system safety events related to the defined area, the templates having corresponding actions defined therefor, the controller being configured to perform program logic to perform operations comprising:
monitoring for changes with the electrical field based on data derived from output from at least some of the electrodes, the derived data being indicative of an interaction with the defined area, the interaction having characteristics including three-dimensional spatial and timing characteristics;
determining whether the interaction matches one of the defined templates without reconstructing the entire electrical field; and
responsive to a determination that the interaction matches one of the defined templates, selectively triggering the corresponding action based on one or more of the characteristics of the interaction,
wherein the interaction is detected by performing operations including:
for each electrode disposed horizontally along the electrically conductive region, applying a current thereto and measuring a voltage drop at an opposing electrode so that current is applied and measured with respect to different vertically-opposed electrode pairs;
determining a first electrode pair from the different vertically-opposed electrode pairs that is associated with the largest voltage drop in the vertical direction;
for each electrode disposed vertically along the electrically conductive region, applying a current thereto and measuring a voltage drop at an opposing electrode so that current is applied and measured with respect to different horizontally-opposed electrode pairs;
determining a second electrode pair from the different horizontally-opposed electrode pairs that is associated with the largest voltage drop in the horizontal direction;
defining a sub-region based on at least the first electrode pair and the second electrode pair;
calculating a horizontal position of the interaction from within the defined sub-region based on a horizontal distance from a vertical equilibrium path using characterized horizontal reference voltage values, wherein for the vertical equilibrium path, horizontal reference voltage values are characterized for areas between the vertical equilibrium path and electrodes disposed vertically along the electrically conductive region; and calculating a vertical position of the interaction from within the defined sub-region based on a vertical distance from the horizontal equilibrium path using characterized vertical reference voltage values, wherein for the horizontal equilibrium path, vertical reference voltage values are characterized for areas between the horizontal equilibrium path and electrodes disposed horizontally along the electrically conductive region.

28. The system of claim 27, wherein:

the horizontal and vertical equilibrium paths are non-linear, and wherein the horizontal and vertical equilibrium paths are defined to cross at a center of gravity of electrical fields generated by provided current to different electrode pairs.

29. The system of claim 27, further comprising:

a multiplexer controllable to provide current to the electrodes;

an adjustable current regulator circuit (ACRC) connected to the controller and the multiplexer, the ACRC being configured to control the amperage of the current that the multiplexer is controllable to provide to the electrodes, the ACRC being operable in at least a first mode in which the ACRC dynamically adjusts the amperage of the current such that the amperage is increased until current leakage between multiplexer channels exceeds a threshold level and then is reduced such that the current leakage between multiplexer channels is less than the threshold level; and a demultiplexer configured to receive voltages from electrodes and provide corresponding signals to the controller.

30. A method of guarding a defined area using an industrial safety system, the system comprising an electrically-conductive surface and a plurality of field-defining electrodes electrically connected to the electrically-conductive surface the method comprising:

using the surface and the electrodes to create an electrical field in relation to the defined area, the created electrical field functioning as a passive sensor for the defined area;

monitoring for changes with the electrical field based on data derived from output from at least some of the electrodes, the derived data being indicative of an interaction with the defined area, the interaction having characteristics including three-dimensional spatial and timing characteristics;

determining whether the interaction matches one of a plurality of defined templates without relying on a multi-dimensional electrical field reconstruction, the defined templates corresponding to respective industrial safety system safety events related to the defined area, the templates having corresponding actions defined therefor; and responsive to a determination that the interaction matches one of the defined templates, selectively triggering the corresponding action based on one or more of the characteristics of the interaction.

* * * * *